(12) United States Patent
Fukushima

(10) Patent No.: US 7,831,697 B2
(45) Date of Patent: Nov. 9, 2010

(54) MAPPING NOTIFICATION SYSTEM FOR RELATING STATIC IDENTIFIER TO DYNAMIC ADDRESS

(75) Inventor: Hajime Fukushima, 2-62-3, Nagata Nakano-ku, Tokyo, 165-0025 (JP)

(73) Assignee: Hajime Fukushima, Tokyo (JP)

( * ) Notice: Subject to any disclaimer, the term of this patent is extended or adjusted under 35 U.S.C. 154(b) by 1230 days.

(21) Appl. No.: 10/540,633

(22) PCT Filed: Dec. 24, 2003

(86) PCT No.: PCT/JP03/16538

§ 371 (c)(1),
(2), (4) Date: Jun. 23, 2005

(87) PCT Pub. No.: WO2004/059925

PCT Pub. Date: Jul. 15, 2004

(65) Prior Publication Data

US 2006/0101026 A1 May 11, 2006

(30) Foreign Application Priority Data

Dec. 24, 2002 (JP) .............................. 2002-371448

(51) Int. Cl.
*G06F 15/173* (2006.01)
(52) U.S. Cl. ..................................... 709/223
(58) Field of Classification Search ............ 709/220, 709/201, 219, 217, 218, 249, 238, 232, 224, 709/226, 203, 245; 707/501, 505, 506, 530, 707/513; 715/215, 735, 736, 740; 370/230, 370/231, 232, 352, 389, 229, 254, 360; 705/5, 705/6, 1, 28, 26, 27, 56, 35, 37, 44, 10, 14, 705/30, 7

See application file for complete search history.

(56) References Cited

U.S. PATENT DOCUMENTS 6,621,798 B1 * 9/2003 Krishnan et al. ............ 370/256

(Continued)

FOREIGN PATENT DOCUMENTS

JP   H7-200502   8/1995

(Continued)

OTHER PUBLICATIONS

Tago, Toshikatsu. Ima Kara Demo Maniau UNIX & Linux Nyumon Dai 5 Kai Network no Settei (Sono 2). DB MAgazine. Jan. 2002.

*Primary Examiner*—Nathan Flynn
*Assistant Examiner*—Mark O Afolabi
(74) *Attorney, Agent, or Firm*—Michael A. Glenn; Glenn Patent Group

(57) ABSTRACT

A1 A communication system comprises obtaining a corresponding dynamic address by sending an identifier to a mapping notification system which stores a pair of an identifier and a dynamic address; and determining whether or not a dynamic address stored in the mapping notification system is correct by accessing other communication node to which the dynamic address obtained by the obtaining means is assigned. The system also compares the identifier sent to the mapping notification system and a reply for the access to the communication node. If the system determines that the address is not correct, the obtaining process and determination process are executed again, an execution of a process to be executed after the determination process is stopped, or a control process for preventing from sending back a reply of the address from the mapping notification system is executed.

14 Claims, 28 Drawing Sheets

U.S. PATENT DOCUMENTS

| | | | |
|---|---|---|---|
| 7,069,320 B1 * | 6/2006 | Chang et al. | 709/225 |
| 7,085,814 B1 * | 8/2006 | Gandhi et al. | 709/208 |
| 7,359,987 B2 * | 4/2008 | Stahura | 709/245 |
| 7,613,811 B1 * | 11/2009 | Bhalla et al. | 709/227 |
| 2003/0103482 A1 * | 6/2003 | Van Bosch | 370/338 |
| 2003/0204619 A1 * | 10/2003 | Bays | 709/238 |
| 2004/0136358 A1 * | 7/2004 | Hind et al. | 370/352 |

FOREIGN PATENT DOCUMENTS

| | | |
|---|---|---|
| JP | 11-122283 | 4/1999 |
| JP | 2002-135301 | 5/2002 |
| JP | 2002-281032 | 9/2002 |
| JP | 2002-318737 | 10/2002 |
| WO | WO99/18515 | 4/1999 |

* cited by examiner

```
date >> $LOG
echo -n "result od DIG :" >> $LOG
dig @209.69.32.137 bsdguru.dyndns.org | grep bsdguru.dyndns.org | -->
 grep "IN A" | cut -f4 >> $LOG
ping -c 2 bsdguru.dyndns.org >> $LOG
sleep 1
```

1
Thu Sep 12 23:59:36 JST 2002
result od DIG :210.159.30.63 a
PING bsdguru.dyndns.org (210.159.30.63): 56 data bytes
64 bytes from 210.159.30.63: icmp_seq=0 ttl=246 time=70.996 ms
64 bytes from 210.159.30.63: icmp_seq=1 ttl=246 time=83.131 ms
              b --- bsdguru.dyndns.org ping statistics ---
2 packets transmitted, 2 packets received, 0% packet loss
round-trip min/avg/max/stddev = 70.996/77.064/83.131/6.067 ms 2
Thu Sep 12 23:59:39 JST 2002
result od DIG :218.218.1.196 c
PING bsdguru.dyndns.org (210.159.30.63): 56 data bytes
64 bytes from 210.159.30.63: icmp_seq=0 ttl=246 time=84.041 ms
64 bytes from 210.159.30.63: icmp_seq=1 ttl=246 time=98.320 ms
              d --- bsdguru.dyndns.org ping statistics ---
2 packets transmitted, 2 packets received, 0% packet loss
round-trip min/avg/max/stddev = 84.041/91.180/98.320/7.139 ms 3
Thu Sep 12 23:59:41 JST 2002
result od DIG :218.218.1.196
PING bsdguru.dyndns.org (210.159.30.63): 56 data bytes
64 bytes from 210.159.30.63: icmp_seq=0 ttl=246 time=91.660 ms
64 bytes from 210.159.30.63: icmp_seq=1 ttl=246 time=87.170 ms --- bsdguru.dyndns.org ping statistics ---
2 packets transmitted, 2 packets received, 0% packet loss
round-trip min/avg/max/stddev = 87.170/89.415/91.660/2.245 ms

FIG. 20

```
4
Thu Sep 12 23:59:43 JST 2002
result od DIG :218.218.1.196
PING bsdguru.dyndns.org (210.159.30.63): 56 data bytes
64 bytes from 210.159.30.63: icmp_seq=0 ttl=246 time=87.492 ms
64 bytes from 210.159.30.63: icmp_seq=1 ttl=246 time=70.174 ms --- bsdguru.dyndns.org ping statistics ---
2 packets transmitted, 2 packets received, 0% packet loss
round-trip min/avg/max/stddev = 70.174/78.833/87.492/8.659 ms
```

~

```
15
Fri Sep 13 00:00:37 JST 2002
result od DIG :218.218.1.196
PING bsdguru.dyndns.org (210.159.30.63): 56 data bytes
64 bytes from 210.159.30.63: icmp_seq=0 ttl=246 time=98.655 ms
64 bytes from 210.159.30.63: icmp_seq=1 ttl=246 time=81.907 ms --- bsdguru.dyndns.org ping statistics ---
2 packets transmitted, 2 packets received, 0% packet loss
round-trip min/avg/max/stddev = 81.907/90.281/98.655/8.374 ms 16
Fri Sep 13 00:00:39 JST 2002
result od DIG :218.218.1.196   e
PING bsdguru.dyndns.org (218.218.1.196): 56 data bytes
64 bytes from 218.218.1.196: icmp_seq=0 ttl=52 time=111.375 ms
64 bytes from 218.218.1.196: icmp_seq=1 ttl=52 time=117.394 ms
                             f
--- bsdguru.dyndns.org ping statistics ---
2 packets transmitted, 2 packets received, 0% packet loss
round-trip min/avg/max/stddev = 111.375/114.385/117.394/3.010 ms
```

FIG. 21

```
% dig @ns1.dyndns.org bsdguru.dyndns.org

; <<>> DiG 8.3 <<>> @ns1.dyndns.org bsdguru.dyndns.org
; (1 server found)
;; res options: init recurs defnam dnsrch
;; got answer:
;; ->>HEADER<<- opcode: QUERY, status: NOERROR, id: 6
;; flags: qr aa rd; QUERY: 1, ANSWER: 1, AUTHORITY: 5, ADDITIONAL: 5
;; QUERY SECTION:
;;      bsdguru.dyndns.org, type = A, class = IN ;; ANSWER SECTION:
bsdguru.dyndns.org.     1M  IN A     218.46.105.100

;; AUTHORITY SECTION:
dyndns.org.             1D  IN NS    ns4.dyndns.org.
dyndns.org.             1D  IN NS    ns5.dyndns.org.
dyndns.org.             1D  IN NS    ns1.dyndns.org.
dyndns.org.             1D  IN NS    ns2.dyndns.org.
dyndns.org.             1D  IN NS    ns3.dyndns.org.

;; ADDITIONAL SECTION:
ns1.dyndns.org.         1D  IN A     66.37.215.43
ns2.dyndns.org.         1D  IN A     209.69.32.137
ns3.dyndns.org.         1D  IN A     64.71.191.26
ns4.dyndns.org.         1D  IN A     212.100.224.171
ns5.dyndns.org.         1D  IN A     66.37.215.44

;; Total query time: 231 msec
;; FROM: open.names4commerce.net to SERVER: ns1.dyndns.org  66.37.215.43
;; WHEN: Fri Sep 13 23:24:31 2002
;; MSG SIZE  sent: 36  rcvd: 222
```

FIG. 25

```
% dig @hhh.dyndns.org bsdguru.dyndns.org

; <<>> DiG 8.3 <<>> @hhh.dyndns.org bsdguru.dyndns.org
; (1 server found)
;; res options: init recurs defnam dnsrch                    stderr
;; res_nsend to server hhh.dyndns.org  66.183.188.16: Operation timed out
% echo $status
9
```

FIG. 26

```
% dig @ns1.dyndns.org bsd2guru.dyndns.org

; <<>> DiG 8.3 <<>> @ns1.dyndns.org bsd2guru.dyndns.org
; (1 server found)
;; res options: init recurs defnam dnsrch
;; got answer:
;; ->>HEADER<<- opcode: QUERY, status: NXDOMAIN, id: 6
;; flags: qr aa rd; QUERY: 1, ANSWER: 0, AUTHORITY: 1, ADDITIONAL: 0
;; QUERY SECTION:
;;      bsd2guru.dyndns.org, type = A, class = IN ;; AUTHORITY SECTION:
dyndns.org.           10M IN SOA    ns1.dyndns.org. hostmaster.dyndns.org. (
                                    2057409667     ; serial
                                    10M            ; refresh
                                    5M             ; retry
                                    1W             ; expiry
                                    10M )          ; minimum ;; Total query time: 215 msec
;; FROM: open.names4commerce.net to SERVER: ns1.dyndns.org  66.37.215.43
;; WHEN: Thu Sep 26 22:56:13 2002
;; MSG SIZE  sent: 37  rcvd: 88

% echo $status
0
```

FIG. 27

```
% snmpget 218.46.105.100 public system.sysName.0
system.sysName.0 = bsdguru.dyndns.org
% echo $status
0
```

FIG. 28

```
% snmpget 218.46.105.101 public system.sysName.0
Timeout: No Response from 218.46.105.101.    ~stderr
% echo $status
1
```

FIG. 29

```
% snmpget 218.46.105.100 wrongcommunity system.sysName.0    stderr
Error in packet
Reason: (noSuchName) There is no such variable name in this MIB.
Failed object: system.sysName.0

% echo $status
2
```

FIG. 30

```
% snmpget 218.46.105.100 public system.sysLocation.0
system.sysLocation.0 = TEST
% echo $status
0
```

FIG. 31

```
options {
directory "/etc/namedb";
// forward only;
forwarders {
127.0.0.1;
};
version="Hyper-Rturner-BOX";
// query-source address * port 53;
// dump-file "s/named_dump.db";
};
```

FIG. 32

```
% dig @218.46.105.100 txt chaos version.bind

; <<>> DiG 8.3 <<>> @218.46.105.100 txt chaos version.bind
; (1 server found)
;; res options: init recurs defnam dnsrch
;; got answer:
;; ->>HEADER<<- opcode: QUERY, status: NOERROR, id: 6
;; flags: qr aa rd ra; QUERY: 1, ANSWER: 1, AUTHORITY: 0, ADDITIONAL: 0
;; QUERY SECTION:
;;        version.bind, type = TXT, class = CHAOS ;; ANSWER SECTION:
VERSION.BIND.           0S CHAOS TXT    "Hyper-Returner-BOX"

;; Total query time: 76 msec
;; FROM: open.names4commerce.net to SERVER: 218.46.105.100
;; WHEN: Thu Sep 26 22:37:43 2002
;; MSG SIZE  sent: 30  rcvd: 73

% echo $status
0
```

FIG. 33

```
% dig @218.46.105.101 txt chaos version.bind

; <<>> DiG 8.3 <<>> @218.46.105.101 txt chaos version.bind
; (1 server found)
;; res options: init recurs defnam dnsrch          stderr
;; res_nsend to server 218.46.105.101: Operation timed out
% echo $status
9
```

FIG. 34

```
% dig @ns.korai.or.jp txt chaos version.bind

; <<>> DiG 8.3 <<>> @ns.korai.or.jp txt chaos version.bind
; (1 server found)
;; res options: init recurs defnam dnsrch
;; got answer:
;; ->>HEADER<<- opcode: QUERY, status: NOERROR, id: 6
;; flags: qr aa rd ra; QUERY: 1, ANSWER: 1, AUTHORITY: 0, ADDITIONAL: 0
;; QUERY SECTION:
;;      version.bind, type = TXT, class = CHAOS

;; ANSWER SECTION:
VERSION.BIND.           0S CHAOS TXT    "4.9.7-REL"

;; Total query time: 2 msec
;; FROM: open.names4commerce.net to SERVER: ns.korai.or.jp  202.217.175.5
;; WHEN: Thu Sep 26 22:40:57 2002
;; MSG SIZE  sent: 30  rcvd: 64

% echo $status
0
```

FIG. 35

```
Trying 202.217.175.5...
Connected to po.korai.or.jp.
Escape character is '^]'.
220 ns.korai.or.jp ESMTP Sendmail 8.8.8/3.6W-99062802; Tue, 5 Nov 2002 02:14:35
+0900 (JST)
```

FIG. 36

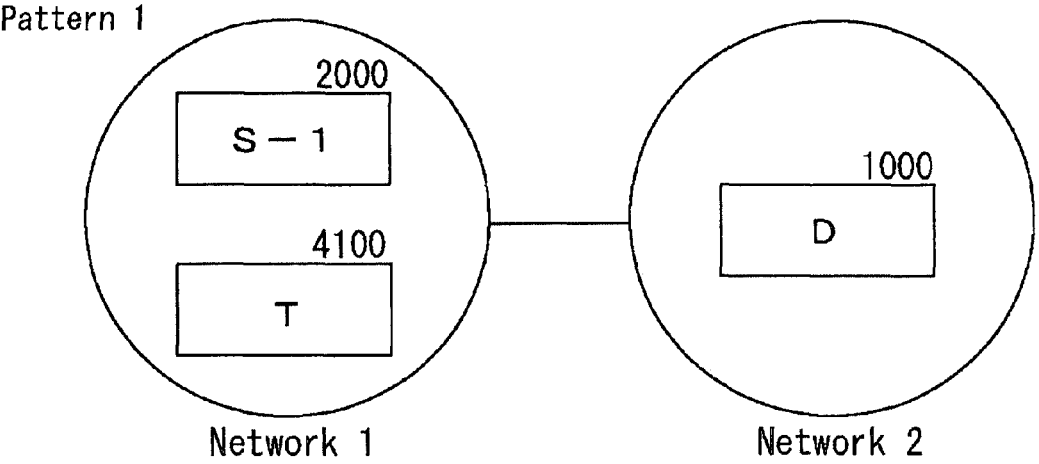
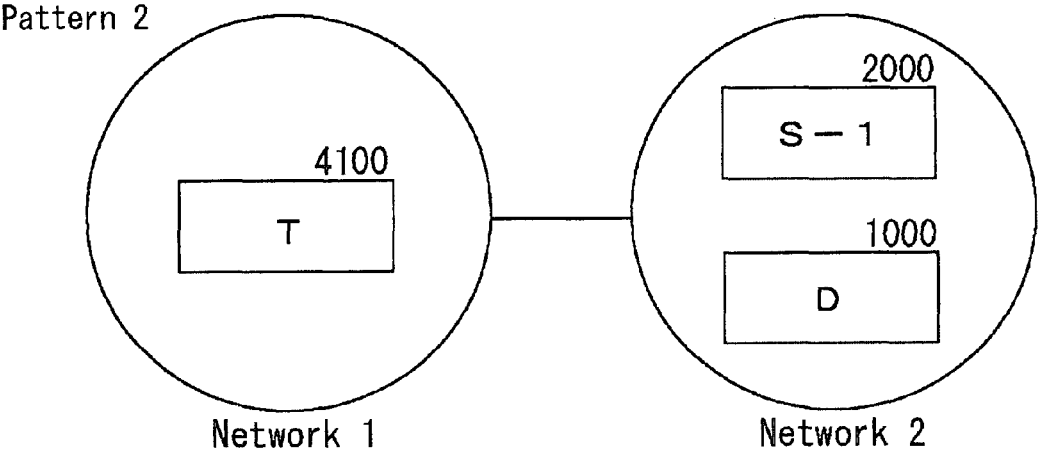
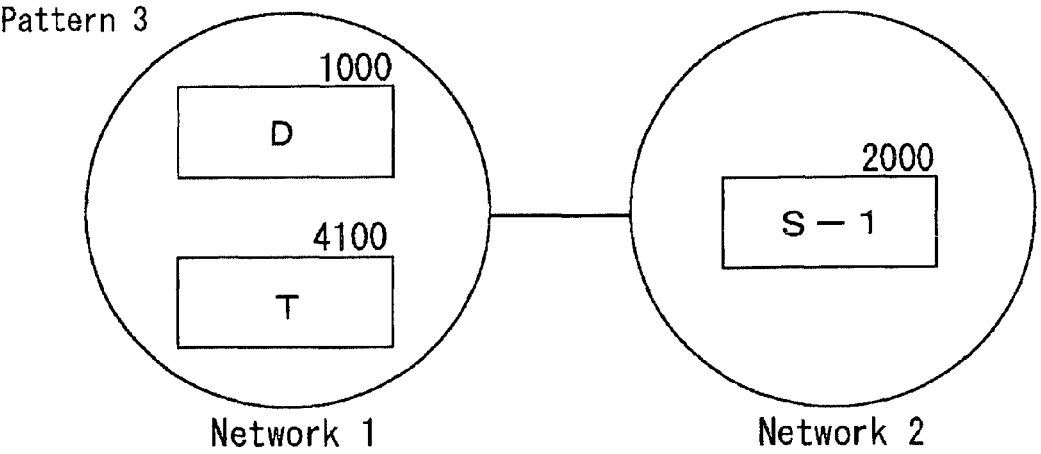
FIG. 38

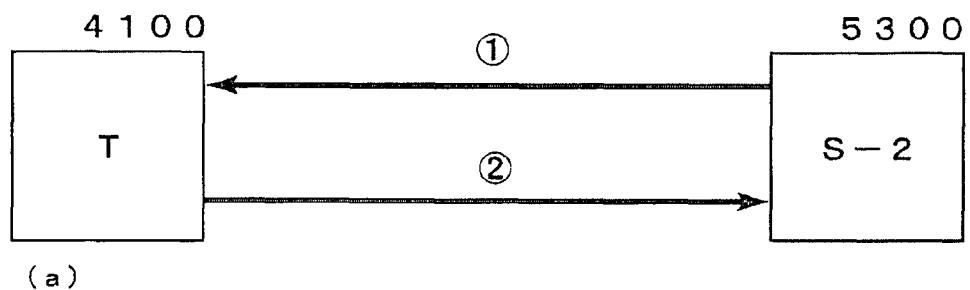
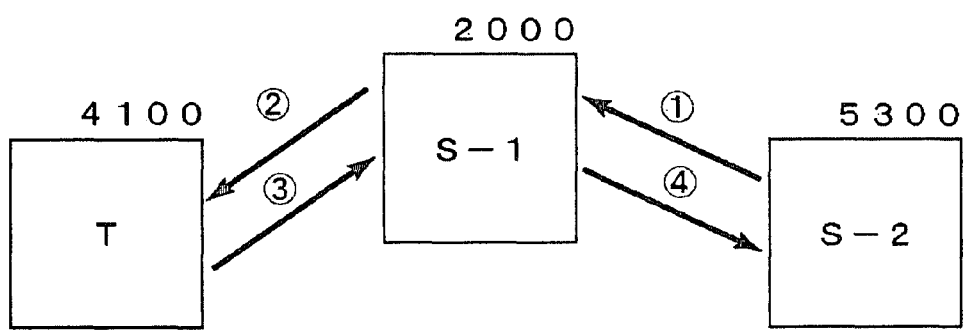
FIG. 39
```
/usr/sbin/nsupdate -k $KEYDIR:$KEYNAME << EOF || $ERRFLG=ERROR
update delete $TARGETHOST A
EOF
```
FIG. 40

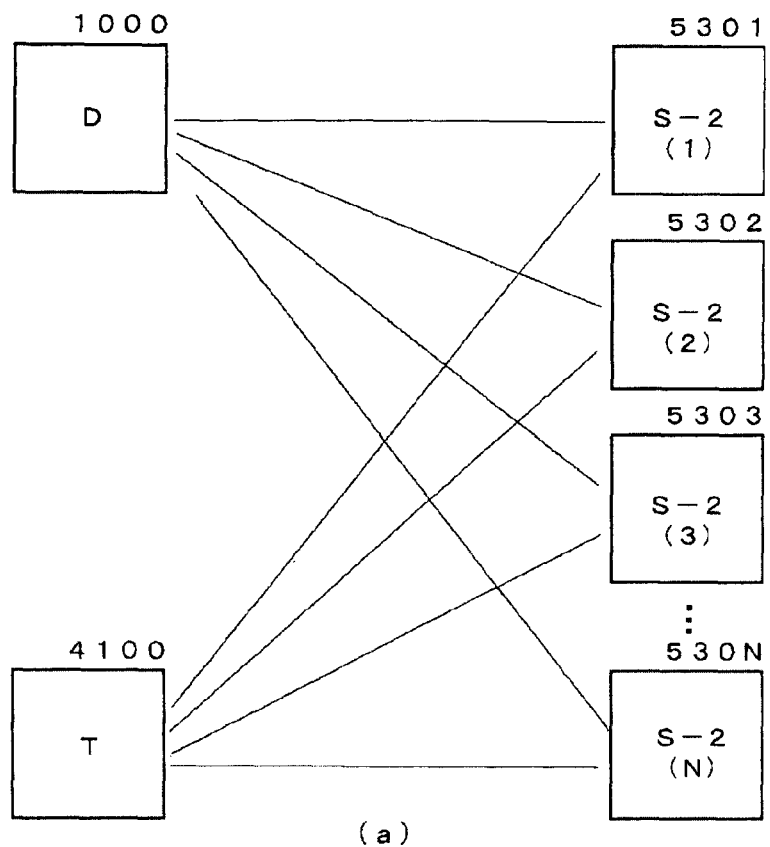
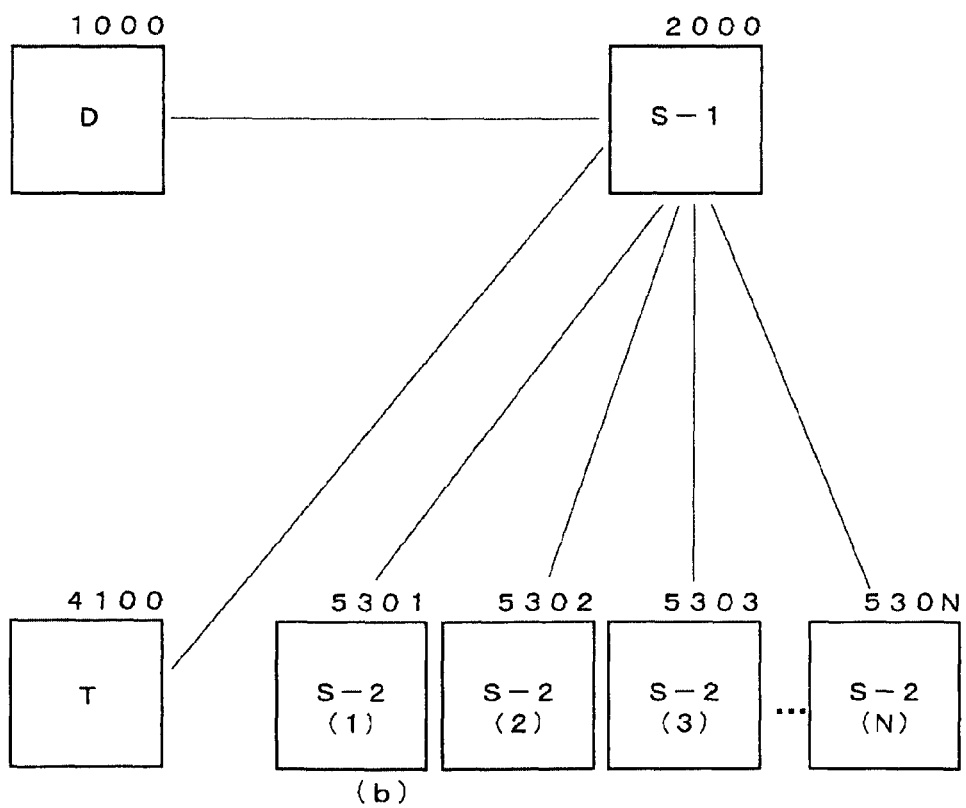
FIG. 41

MAPPING NOTIFICATION SYSTEM FOR RELATING STATIC IDENTIFIER TO DYNAMIC ADDRESS

TITLE OF THE INVENTION

A communication model, signal, method, and device for confirming reachability in a network in which host reachability is obtained by associating a static identifier and a dynamically assigned network address with each other

FIELD OF THE INVENTION

The present invention is related to a communication model, signal, method, and device to solve inadequacies in the process of discovering the destination terminal in a store-and-forward communication network.

Specifically, reachability to the destination terminal is provided to the originator by translating a static identifier to a dynamically assigned network address; a clear distinction is made between the case when the originator has wrong reachability to the destination terminal and the case when the originator has correct reachability to the destination terminal.

BACKGROUND ART (Patent document 1) Patent National Publication 2001-519607 or WO99/18515 (Intel Corporation, USA): Method and device for translating a static identifier to a dynamically assigned network address (Patent document 2) Patent Kokai 2002-135301 (NTT): IP address information notification method, IP address information notification device, and storage media storing this program (Patent document 3) Patent Kokai 2002-318737 (Index): Management server (Patent document 4) Patent Kokai 2002-281032 (Toshiba): Monitoring target switching program/method, and monitoring system (Patent document 5) Patent Kokai H7-200502 (Omron): Redundant device for transaction processing system The Internet consists of many computers and many networks of computers ("network" hereafter). These computers are interconnected on a global scale via communication links using TCP/IP protocols. The interconnected computers exchange information using various services such as e-mail, Gopher, and the World Wide Web (WWW).

A host on the Internet is identified using a unique IP address assigned by an organization tasked with assigning network addresses. The IP address is represented as fixed-length numbers for easy processing by computers; the long numeric IP address is difficult for people to remember without making input errors. An IP address is needed at a minimum to identify a host on a TCP/IP network but identifying a host using a numeric IP address is difficult for people; to solve this problem, hosts are identified using the domain name system ("DNS" hereafter).

DNS is not based on numbers like the IP address; instead it uses a meaningful character string supplied by a database system to identify hosts on the Internet. DNS configures hierarchical name spaces where a character string called domain name is registered and a host on the Internet is identified by associating the domain name with an IP address. This is called forward name resolution. Meanwhile, searching for a domain name from the IP address is called reverse name resolution. A feature of DNS is a tree-structured distributed database with the root server placed at the top. The IP address is subjected to routing restrictions (the IP address is position information in the IP address system), but a name in DNS can exist irrespective of the position of the host on a network.

Generally, each user organization connected to the Internet permanently and assigned IP addresses registers domain names via a domain name registration organization which operates the domain names for the user organization. The domain operation server is called a DNS server. To register a DNS server, an IP address and a host name are specified via the domain name registration organization.

The root server transfers domain operation authority to the first-level DNS server, which in turn transfers domain operation authority to the second-level DNS server, and finally the DNS server at the immediately preceding level transfers domain operation authority to the DNS server for the said user organization assigned IP addresses. FIG. 17 shows the DNS search sequence. The DNS server for each user-organization-assigned IP address performs actual setting, such as association of host name and IP address with domain name and specification of the mail routing.

With a conventional DNS, the setting file is set and updated manually. However, it has recently become difficult to statically associate a single host name and a single IP address with each other, because the IP addresses of PCs on in-house LANs change each time Windows (registered trademark) is restarted, due to popularization of the dynamic host configuration protocol (DHCP). Dynamic DNS provides a mechanism by which the DNS server's records are updated automatically by an update request from a client. The practicality of dynamic DNS is presently being verified both in networks not directly connected to the Internet, such as in-house LANs, but also in the Internet's global services.

When dynamic DNS is used in the Internet's global services, it is possible to provide Internet services at a (dial-up) host not assigned a network by the network assignment organization or not assigned a permanent assigned IP address by a provider.

Conventionally, dial-up connection involves the act of making a call to connect to the Internet, but recently, the dial-up connection does not necessarily require making a call because of widespread use of access lines (such as cable TV, digital subscriber lines, optical fibers, satellite links) using a fixed IP connection called permanent connection. This means that accounting based on connected hours is no longer prevalent. However, permanent connection is different from connection using leased lines because the IP address may change when reconnecting after the connection is disconnected due to faults such as router power failure, line fault, etc., or maintenance, or line disconnection by provider or timeout at dial-up host. Also, the IP address may change when a mobile terminal moves (handover) through wireless base stations. For convenience, this is also called dial-up because the terminal IP address changes.

By comparing connection made by assignment of a permanent network by a network-assignment organization (typically using conventional leased lines) with connection made by assignment of a permanent IP address by a provider (or by each user organization assigned IP addresses), the present invention calls making a connection by being assigned a IP address by a provider (or by each user-organization-assigned IP address) (including connection made via DHCP or PPPoE not involving calling through a modem) a "dial-up connection". The assignment of a transient IP address is called "perform transient connection" and the transient IP address assignment itself is called "dial-up".

PROBLEM PECULIAR TO DYNAMIC DNS

Known DNS technology cannot enable a host with a changing IP address to provide Internet services, but dynamic DNS enables hosts to provide limited Internet services. (Global DNS is excluded because it needs a fixed IP address). However, dynamic DNS has a unique problem explained in FIGS. 1-12.

FIG. 1. The management target equipment ("T" or "destination terminal" hereafter) (4100) dials up the provider ("P" hereafter) (4000) (including dial-up via PPPoE, etc.)

FIG. 2. T (4100) is dynamically assigned an IP address (e.g. 172.16.100.100) by P (4000).

FIG. 3. T (4100) requests the dynamic DNS server ("D" or "mapping notification system" hereafter) (1000) to update the DNS. Then, D (1000) associates the IP address (172.16.100.100) assigned to T (4100) with the host name of T (4100) and sets.

FIG. 4. T (4100) can accept access requests from general Internet users ("S-2" hereafter) (5300) (normal state).

FIG. 5. Some failure occurs causing connection loss from T (4100) to P (4000).

FIG. 6. Reconnection is made from T (4100) to P (4000) (including reconnection via PPPOE, etc.).

FIG. 7. T (4100) is assigned dynamically a new IP address (172.16.200.10) by P (4000). A different IP address than assigned until an IP address change has occurred, is assigned.

FIG. 8. T (4100) issues an update request to D (1000). Then, D (1000) sets the IP address (172.16.200.10) assigned to T (4100) and the host name of T (4100).

FIG. 9. In FIG. 7, now T (4100) is assigned a different IP address (172.16.200.10) from the previously assigned IP address (172.16.100.100) which is re-assigned to another user T' ("T'" hereafter) (4200) at the same provider. In this case, viewed from S-2 (5300), the host seems to have been switched.

FIG. 10. On the Internet, referenced DNS cannot be to D (1000); it is the provider's DNS server (such as 4500 or 5500) connected directly to each user. Consequently, even if D (1000) is updated correctly, name query is not performed from the provider's DNS server (such as 4500 or 5500) connected directly to each user to D (1000) within the cache TTL, so some time is required for the IP address (172.16.200.10) of T (4100) to be reflected at these DNS servers.

The DNS server (such as 4500 or 5500) stores queried resource records locally for some period. This storage is called cache. The resource record in cache is only stored for the specified TTL (time to live) period and is discarded when this period has elapsed. This period is called the cache TTL. During the cache TTL, the DNS server (such as 4500 or 5500) performs name resolution in response to queries from the resolver (such as 4100 or 4200, or 5300) by referencing the local cache storage. This cache method was devised to improve efficiency by suppressing repeated name queries. However, D (1000) suffers from an inadequacy, because the cache cannot follow changes in the IP address of T (4100) as explained below.

FIG. 16 shows how DNS is searched for from S-2 (5300) to reach the target host, T (4100).

(1): A forward name query for T (4100) is performed from S-2 (5300) to P-2 DNS ("P-2-D" hereafter) (5500).

(2): First, P-2-D (5500) checks whether it "knows" the target domain name; if it does, it immediately returns the IP address of T (4100)—the target host—to S-2 (5300). When P-2-D (5500) "knows" the target domain name, there are cases in which name is being managed by P-2-D (5500) and the IP address of T (4100), the target host, is cached in P-2-D (5500). FIG. 17 shows the case when P-2-D (5500) does not "know" the target domain name.

(3): In step (2) above, S-2 (5300) could determine the IP address of T (4100). S-2 (5300) accesses T (4100) using this IP address.

FIG. 17 shows the DNS search sequence when P-2-D (5500) is not managing the domain for T (4100) and when P-2-D (5500) has no IP address cache (at first name query) (step (2) in FIG. 16).

(1): A forward name query for T (4100) is performed from S-2 (5300) to P-2-D (5500).

(2): P-2-D (5500) performs a name query to the root DNS when it is not managing the domain for T (4100)—the target domain name—and also cannot find the IP address in cache.

(3): The root DNS returns the location of the JP DNS, for example, when the domain name of T (4100) is a JP domain. (If the domain name of T (4100) is not a JP domain, the root DNS returns the location of a name server managing ccTLD or gTLD to P-2-D (5500).)

(4): P-2-D (5500) performs a name query for the domain name of T (4100)—the target domain name—to the JP domain DNS obtained in step (3) above.

(5): The JP domain DNS returns the location of the server (here D (1000)) managing the domain name of T (4100)—the target host—to P-2-D (5500). (The said location is returned immediately because domains under JP are tree-structure registered at JPNIC and member servers, and are not divided for second-level DNS.)

(6): P-2-D (5500) performs a forward name query for the IP address to D (1000) obtained in step (5), using the name of T (4100) as the key.

(7): D (1000) returns the location of T (4100) to P-2-D (5500).

(8): P-2-D (5500) returns the location of T (4100) obtained in step (7) to S-2 (5300).

(9): S-2 (5300) accesses T (4100).

FIG. 18. Setting is generally performed so that the DNS (such as 4500 or 5500) is cached by the first name query, and then when the cache TTL has elapsed, the cache is invalidated. The correct IP address of T (4100) is obtained when the cache is invalid (FIG. 17) and name query is performed to D (1000). However, when the IP address of T (4100) changes while the cache is valid (FIG. 16), the IP address cached without performing name query to D (1000) is returned. In other words, the returned IP address (cached) is the address before the update shown in FIG. 18 is performed (172.16.100.100). As described in step (2) in FIG. 16, no cache problem occurs when P-2-D (5500) connected to S-2 (5300) is operating the T (4100) domain.

FIG. 11. Consequently, seen from the Internet, T' (4200) can be misidentified as T (4100) when the cache is referenced.

Also at this time, even when T (4100) is a host with mail or www server functions, T' (4200) is a host in which no mail server or www server is set (or even if T' (4200) is a host in which it is set), the setting for T' (4200) is different from that for T (4100), so T (4100) seems abnormal state (failure state).

FIG. 12. This problem is solved when the DNS server (such as 4500 or 5500) of each provider on the Internet performs name query to D (1000) again when the cache TTL has elapsed. Consequently, a normal state occurs as time passes as shown in FIG. 12.

Next, FIGS. 1-5 and FIGS. 13-14 show the case when T (4100) does not reconnect (remains disconnected). As with the normal case, it returns to the normal state over time (FIGS. 1-12).

Possible reasons for this problem include line or program failure (performing transient connection or dynamic DNS update).

Explanation given in FIGS. 1-5 are the same as the one given earlier. (Skip FIGS. 6-12 as explanation given in them is on cache problem.)

FIG. 13: At this time, T (4100) is not connected to the Internet, so P (4000) assigns the IP address (for example, 172.16.100.100 ) that has been assigned to T (4100) until an IP address change has occurred, to T' (4200) when T' (4200) performs transient connection.

FIG. 14. Update cannot be performed for the IP address of T (4100) set to D (1000), so the IP address (for example, 172.16.100.100) of T (4100) before T (4100) was disconnected remains set. Consequently, in this case, T' (4200) is also misidentified as T (4100).

Incidentally, line disconnection is a detectable event at T (4100) and, at the same time, is also a change in the external environment.

Table 01 below shows the patterns of failure that occurs at T (4100) from relationship between its state and its assigned IP address.

Pattern 3 shows the case when the line is reconnected after being disconnected. The shaded part is affected by the cache TTL; other parts show the case when name query is performed correctly because caching is not performed. S-2 (5300) accessing T (4100) is a general Internet user. Whether or not a case is included in the shaded part depends on whether or not S-2 (5300) has previously performed name referencing, and if so, whether or not it was performed while caching is being performed.

The shaded part in Table 01 shows that although T (4100) operates correctly (T (4100) reconnects after line disconnection, and updating to D (1000) is performed correctly), T (4100) seems to be in a temporary failure state because a DNS server (such as 4500 or 5500) is caching the IP address of T (4100).

The above explanation shows that D (1000) has an inadequacy where the cache mechanism cannot follow changes in the IP address of T (4100).

This occurs because the dynamic DNS mechanism is an extension of conventional DNS.

As described earlier, conventional DNS was set and updated manually. The above explanation shows that when D

TABLE 01

| | | State of IP address | | |
|---|---|---|---|---|
| | | IP address before line disconnection ≠ IP address after reconnection | | IP address before line disconnection = IP address after reconnection IP address assigned |
| State of T (4100) | | When no hosts using IP address assigned to T before line disconnection | When another host using IP address assigned to T before line disconnection | to T before line disconnection re-assigned to T |
| Line remains disconnected (pattern 1) | | Not accessible | Misidentification (FIG. 14) | — |
| Failure to perform dynamic update to DNS (pattern 2) | | Not accessible | Misidentification | OK |
| Reconnection after line disconnection (pattern 3) | Within cache TTL | Not accessible | Misidentification (FIG. 11) | OK |
| | No cashing performed | OK | OK (FIG. 12) | |

Pattern 1 shows when the line remains disconnected. When T (4100) cannot make reconnection after line disconnection, misidentification occurs when the IP address assigned to T (4100) before line disconnection occurs is assigned to T' (4200). When the IP address is not assigned to any host, T (4100) is not accessible. Not accessible means the state in which T (4100)—the target host—is lost sight of and cannot be reached. When line remains disconnected, T (4100) naturally cannot perform re-update to DNS servers (such as 4500 or 5500).

Pattern 2 shows the failure to perform dynamic update to DNS caused by program failure for dynamic update to T (4100) or by failure at D (1000). In this case, the line is either assumed to be connected, or to be reconnected if disconnected. In pattern 2, misidentification occurs when the IP address assigned to T (4100) before line disconnection is assigned to T' (4200) as with pattern 1, in which T (4100) cannot make reconnection after line disconnection and remains disconnected.) T (4100) is not accessible when the IP address is not assigned to any host. When the assigned IP address does not change, there is no problem with communication from S-2 (5300), so T (4100) seems to be in the normal state.

(1000) is used and T (4100) performs updating to D (1000) at short intervals, sometimes the IP address of T (4100) obtained by performing (normal) referencing to D (1000) is incorrect.

S-2 (5300) always misidentifies T' (4200) as T (4100) when T (4100) line disconnection intervals and T (4100) IP address update intervals are too short compared to the timing of name query to D (1000) after the cache TTL is exceeded. In such a case, which can also be caused by an unstable line, DNS should function, but D (1000) cannot function in this case, causing what appears to be a failure state. This problem is a DNS problem for the entire Internet that cannot be solved by individual implementations (at individual hosts).

Actual Example of Cache Problem

An actual example of a cache problem is explained below.

FIGS. 19-21 show an actual example in which the T (4100) IP address obtained by referencing the cached DNS (measurement made at 4500) during the cache TTL and the T (4100) IP address obtained by performing forward name resolution directly to D (1000) are different.

FIG. 19 shows the program used at actual measurement. The program is a UNIX shell script. The arrow (→) at the line end indicates that the line is returned for only display convenience; the actual line continues.

FIGS. 20-21 show the measurement results. At each trial, the first line indicates trial number, the second line indicates trial time, the third line indicates the T (4100) IP address (a, c, e) extracted by performing string processing for the result obtained by referencing D (1000) using the dig command of the ISC BIND, which is standard implementation for DNS, and the fourth to sixth lines indicate the T (4100) IP address (b, d, f) obtained by referencing the P DNS server, cached DNS ("P-D" hereafter) (4500) using the ping command. (Note: P-D (4500) is the DNS server usually referenced by T (4100). Here, the test is conducted at T (4100), so P-D (4500) is referenced, but when conducting the test at S-2 (5300), P-2-D (5500) should be referenced. The DNS referenced at each terminal is determined by the resolver.) The seventh to tenth lines indicate the ping command incidental output.

The DNS server D (1000) used in the trial is DynDNS.org, which already hosts dynamic DNS. At the trial, the server cache TTL is 1 minute, a quite short time.

An update request is sent from T (4100) concurrent with the first trial, and the update is completed between the first and second trials. Consequently, from the second trial, the dig command's output (T (4100) IP address indicated by D (1000)) and the ping command's output (P-D (4500) is referenced at this test but P-D (4500) is affected by the cache TTL) indicate different IP address respectively ("underlined part a=underlined part b" is changed to "underlined part c≠underlined part d").

This problem is solved ("underlined part e=underlined part f") at trial 16 performed just 1 minute after the second trial.

As described, cache TTL affects the referenced DNS server, causing address disagreement. However, the problem is solved as times passes. The cache TTL at D (1000) is short (1 minute), but address disagreement occurs nevertheless.

Common Misunderstanding

This problem is unique to dynamic DNS, but is generally not well known and even some patent applications contain misunderstandings.

For example, paragraph 0047 in patent document 3 says "reply to nslookup becomes abnormal."

However, this is not true for two reasons: 1. because the reply to nslookup is not an error. (Patent document 3 shows no grounds for being able to determine that the reply is abnormal although it is not an error.) 2, the data that DNS returns in response to the nslookup query is the final updated IP address even if it is assumed that T (4100) is lost (or that the data is being used by T' (4200)). (The IP address may be a cached address or depend on the queried DNS server. Either case is a problem.) In this case, it cannot be simply determined that the reply is abnormal; such a determination requires application-wise comparative judgment. In other words, to detect that the IP address returned by DNS is abnormal, reachability confirmation must be performed to determine whether the IP address pointed at by DNS is used by T (4100) itself or by a host other than T (4100), such as by T' (4200).

The same applies to the case when explicit offline processing is performed by T (4100). This case has the effect of causing T' (4200) to not appear. However, because the nslookup reply is not an error, this case requires application-wise comparative judgment about the set IP address. Also, note that generally no offline processing is performed at failure (including line failure) at T (4100).

Assuming that S-2 (5300) or management server (S-1 hereafter) (2000) stores the previous IP address of T (4100), the IP address is known to be updated by comparing the previous IP address and the IP address returned as the nslookup reply. However, it cannot be determined whether or not the updated IP address reflects the current state for the reason described in reason 2. In other words, this case is also affected by the cache problem; when T (4100) cannot perform update processing for D (1000) (for example, when line disconnection continues or a failure occurs in the update program), the value returned by D (1000) as the IP address of T (4100) is unreliable. In other words, an IP address no longer used by T (4100) might be returned.

However, patent document 3 also seems to state that T (4100) itself compares the reply to nslookup with the IP address of the own host (T (4100) (distribution server 3 in patent document 3). In this case, it is possible to determine that the nslookup reply is abnormal, because T (4100) simply compares the own host IP address and the nslookup result. (However, this compare operation is only possible for connection configurations 1 to 3 described later). However, hosts other than distribution server 3 cannot determine whether or not the reply is abnormal. In other words, only distribution server 3 can determine this. However, it is obvious that T (4100) corresponding to distribution server 3 can determine its own IP address. The object of the present invention is to make it possible for S-2 (5300) to confirm whether the originator reaches T (4100) correctly.

It is considered better for distribution server 3 to send an IP address update request to the dynamic DNS server using a change in the IP address assigned to itself as a trigger, than to perform nslookup.

Moreover, paragraph 0048 in patent document 3 says "for example, the reply to ICMP (Internet Control Message Protocol) is lost". However, the reply cannot be said to be lost; in this case, the reply is undefined. ICMP is considered to be an ICMP echo request. It is derived from the command implementation, usually called ping.

Timing Problem:

When, for example, P (4000) receives a connection request from a host other than T (4100) immediately after T (4100) enters the line disconnection state, there is a high probability that the IP address assigned to T (4100) until just before is assigned to that terminal. Then, T' (4200) appears and the ping command shows that T (4100) is alive. Consequently, a reply may be returned.

For example, when the trial count is 2 (FIG. 20 shows an example of the cache problem) note that the values c and d in FIG. 20 are different.

During the time from trial count 1 and trial count 2, T (4100) changes from the normal state shown in FIG. 4 to the disconnection state shown in FIG. 5 and then makes reconnection to go into the state shown in FIG. 8. When the another user shown in FIG. 9 dials up, T' (4200) appears, because T (4100) is switched to T' (4200) and forward name resolution to the DNS server shows no change in IP address. Naturally, "a ping reply is returned" from T' (4200). If the timing matches, a ping reply will be passed continuously to T' (4200).

Moreover, "a ping reply is returned" does not mean that T (4100) (distribution server 3 in patent document 3) is in a normal state. In this case, since DNS is updated when T (4100) returns to the normal state, the problem is soon solved, even considering the cache problem. However, the biggest problem is that T (4100) remains in the state shown in FIG. 5, and cannot change to the states shown in FIG. 6 or later (meaning that a failure occurs). Unlike the cache problem, once T' (4200) of another users appears, (FIGS. 13 and 14), T (4100) continues to appear to be in the normal state, receiving the ping reply from T' (4200).

Therefore, even if it is assumed that the size of a moving object shot by a video camera is recognized, machine cannot identify whether the object is a dog, a child, or a ball. But the human viewer can identify the image (the moving object) as soon as he/she. Similarly, nslookup or ping cannot solve this problem, and the state is regarded as normal (patent document 3 says this state is abnormal).

Specifically, if a webpage for Mr. B is displayed when someone visits the webpage for Mr. A, the human viewer immediately recognizes this as an error, but the DNS servers and other machines cannot.

Consequently, without confirming reachablity, machines cannot distinguich between T(4100) having correct reachability and T'(4200) that is a host misidentified as T(4100).

Therefore, a host that is transiently assigned a dynamic IP address has a problem of appearing to be in the failure state even if the host is operating correctly, so identification of the other communication end (from where a call should originate), which seems to have been completed with the advent of dynamic DNS, is inadequate.

Summary of Problem Unique to Dynamic DNS

The problem peculiar to dynamic DNS are summarized here.

Summary 1. D (1000) continues announcing the final updated resource record even after T (4100) has ceased to be connected. If T (4100) performs explicit offline processing, D (1000) will never continue announcing information on T (4100) that does not exist. However, when T (4100) is faulty or the line is disconnected, it cannot perform offline processing.

Summary 2. When the IP address of T (4100) changes, misidentification occurs during the cache TTL.

Scope of Extended Related Art

We have discussed the inadequacy of dynamic DNS for discovering the destination terminal. However, a similar problem also occurs in systems other than dynamic DNS. Examples are described in patent document 1, patent document 2, and ENUM.

ENUM is an extension of dynamic DNS that maps the telephone number system in the conventional telephone network (PSTN) onto DNS.

Patent document 1 adds the concept of user location server, but can be considered to be similar to ENUM.

Patent document 2 proposes a specific mapping notification system for a static identifier and dynamic assigned address that locate hosts (DNS is not used).

As stated in said summary 1, since misidentification occurs because "D (1000) continues announcing the final updated resource record even after T (4100) is no longer connected", patent documents 1 and 2 disclose a specific method to solve the problem. In patent document 1, the fact that a terminal is alive is notified by sending a keep-alive signal to DNS from the terminal. In patent document 2, a health check is performed from the equivalent of DNS to the equivalent of T to detect the state that the equivalent of T is not connected occurs.

In both cases, when a destination terminal is not on the network, the appropriate record in the mapping notification system is deleted so the originator terminal never discovers the destination terminal.

However, in both cases, the correctness of reachability from third-party terminal S to T (4100) is not verified (end-to-end accessibility is not verified).

PROBLEMS TO BE SOLVED BY THE INVENTION

Even when S-2 (5300) recognizes a host as T (4100), the actual host could be some other host. The present invention provides a means to confirm that the host recognized as T (4100) is actually T. In other words, that the originator reaches destination terminal T (4100) correctly and not T' (4200).

In addition, the invention proposes how to use the result of the said reachability confirmation.

Effect of the Invention

Usually, the ping command can be used to monitor whether a host that is assigned a fixed IP address on a TCP/IP network is alive or dead. However, the IP address of a dial-up host changes, so if another host (other than T (4100)) replies to ping command, the ping command appears to determine that T (4100) is operating normally. The present invention checks that T (4100) is a host with the correct reachability, making it possible to manage a host with a changing IP address, something that has not been possible previously. Conventionally, normal management has also not been supported previously for hosts with changing IP addresses, but the present invention permits normal and more advanced management (such as CPU load and traffic monitoring).

[Overview]

The following method confirms that the originator reaches the other communication end recognized as T (4100), correctly. The result of communication from S-1 (2000) to T (4100) is used by S-1 (2000) to determine whether or not T (4100) is a host with correct reachability.

The method consists of two steps (external inter-host communication) as follows:

The first step is address verification, and the second step is sign and countersign.

FIG. 23 shows the operation performed when S-1 (2000) performs reachability confirmation of T (4100) in the first and second steps.

Address verification forms one of a pair of parameters needed for reachability confirmation (see communication mode described later).

At S202, forward name query is performed from S-1 (2000) to D (1000) to avoid the problem of cache TTL.

At S204, the IP address of T (4100) is obtained from the reply from S202.

Verification of the IP address of T (4100) can be omitted when S-1 (2000) and D (1000) are the same host, the resolver at S-1 (2000) is set to D (1000), and TTL (cache Time-To-Live) of D (1000) is quite short.

D (1000) may be redundant, but it is OK to consider a redundant group as equal to a single server here.

The second step is sign and countersign.

Since address verification may be omitted, this step is also narrowly defined as reachability confirmation.

When the IP address of T (4100) is obtained at S202 and S204, it is unclear whether the T (4100) recognition is actually correct T (4100). When line disconnection occurs between T (4100) and P (4000) or when T (4100) cannot perform an update to D (1000), the reachability of a host thought to be T (4100) can only be found through the reachability confirmation process. Moreover, when the service at T (4100) is known in advance but that service cannot be accessed correctly, it cannot be concluded that this is caused by cache and it cannot be determined that T (4100) is disconnected from the network, because, for example, even when T (4100) is connected to D (1000) correctly, updating to D (1000) is being performed correctly, and there is no cache problem, a failure can occur in the program providing service. From the network administration viewpoint, we need to determine whether T (4100) has an interface failure, network failure (basic failure) such as a line disconnection, or a service failure (application-level failure). When troubleshooting a network failure, it is customary to start at the lower layer by attempting to communicate with the host thought to be T (4100) and to use the result to determine whether or not T (4100) is actually the correct T (4100). (For details, see the later design concept. Here we just want to confirm whether or not the originator can reach the interface of T (4100).)

Communication is performed at S206 using the previously agreed method from S-1 (2000) to the IP address of T (4100) obtained from the result of address verification (S202 and S204). (This communication is called a "sign.")

S208 determines whether or not there is a reply from S206. (The reply is called the "reply that should be made," and carrying the reply is called "countersign.") If present, the reply is passed to S210; if the reply is not present, processing passes to S216 which displays that T (4100) has been lost sight of.

S210 receives the reply from S206 and performs string processing to obtain a string with an unnecessary string removed.

S212 performs comparison between the character string extracted at S208 and the reply that should be made from T (4100) responding to the communication using the previously agreed method stored at S-1 (2000).

The reply that T(4100) should make and the reply that S-1 (2000) should receive are the same.

When the extracted character string matches the reply that ought to be made in response, T (4100) is determined to have correct reachability.

When they do not match, it is determined, independently of the problem of cache TTL, either that T (4100) is not connected to the Internet, or that updating to the DNS server on the Center side cannot be made for some reason.

The comparison result is displayed. Determination at S212 shows either that T (4100) is operating correctly and has correct reachability (S214), or that T (4100) is in a failure state (S216). The response to the comparison should be based on the contract between the person responsible for T (4100) and the person confirming reachability, so the result is just displayed here. When T (4100) is operating correctly and reachability is correct (S214), normal monitoring, such as traffic monitoring, can be performed as subsequent processing for hosts with changing IP address that cannot be monitored conventionally. Generally, in the case of S214, it is best to write a message indicating that T (4100) is normal state to the log. When S216 (T (4100)) is not normal, notification processing, such as issuing an alert is performed. For S216, when the timing at which S executes the process shown in FIG. 23 overlaps the timing of updating to D (1000) by T (4100), there may be a delay in reflecting the update at D (1000). Based on this, this process should be performed again after a short interval and if failure is still detected, either an alert is issued, or a decision is made about which alerts are issued to whom.

Essence of Countersign

Next, "reachability confirmation" is described. For example, a person viewing a webpage published at T (4100) can easily identify whether the page belongs to Mr. A or Mr. B. If B's webpage at T' (4200) is displayed when visiting A's webpage at T (4100), the reachability is incorrect. (The same is true if a timeout error occurs.) If A's webpage is displayed when visiting A's webpage, the other end has correct reachability. A person can make this judgment instantly but, as described earlier, a computer cannot. Reachability confirmation enables machines (=communication nodes) to make such identification.

The result of reachability confirmation is expressed as true or false. When the result is true, the host has correct reachability. The host is also expressed as a true host. When the result is false, the host does not have correct reachability.

Here, suppose that T (4100) is assigned a permanent assigned IP address.

1. As described above, a person can identify the host visually. If a person cannot identify the host, he/she checks to identify the host, roughly as follows:
2. The nslookup and ping commands can also identify the host.
3. The host itself gives its identity. However, "The host itself gives its identity" means that the host identifies itself via a communication service program ("daemon" hereafter). Conventionally, the other communication end takes no special action after listening to the identification reply. For example, special action here means determining whether to allow or reject the connection.
4. If an account is provided, password authentication can also be used.

Turning to the case where T (4100) is a dial-up host, which is the premise of the present invention.

Item 1 above is not considered here, because reachability confirmation aims at enabling machines to make the said identification.

With nslookup and ping described in item 2, it is not known whether or not the other communication end is truly correct.

Item 4 is a server account problem. The present invention does not assume that there is an account at the other communication end (or host). So, authentication assuming that an account is provided is not discussed here.

With respect to item 3.

The daemon is a resident process to open a communication port, wait for it to be connected, and give the host, program, and version names.

So, item 3 can be used.

When T (4100) has a permanent assigned IP address, the daemon is executed naturally at start of communication. (However, conventionally, it is not determined whether or not to perform communication using the given information)

The daemon gives the said information in response to access to the host name; this simply means giving identification information about itself.

This is not included in the authentication concept.

Moreover, when T simply gives its identity, S can confirm reachability.

In other words, reachability confirmation means:
The host is asked "Who are you?" as a sign.
"I am so-and-so" is answered as the reply.

Consequently, the essence of countersign is to act as a carrier giving identification information about itself that should be naturally given and sign is an arrangement specifying how to ask T (4100) to give its identity.

Next, we explain the unfamiliar new network characteristics until dynamic DNS or association of static identifier and dynamically assigned network address becomes common.

Unidirectionality in Association of Static Identifier and Dynamically Assigned Network Address Generally, only forward name resolution can be used at D (1000).

When reverse name resolution is used, the host name that should be dynamically updated is not returned to the IP address. So, what is returned?

Generally, the host name set by the network operator operating the network containing the relevant address block (including CIDR block) assigned to the IP address is returned. This expression is difficult to understand. A typical example is the host name of an Internet Service Provider (ISP); the ISP is a form of P (4000)).

An example is given below.
Forward name resolution: host.customer.co.jp→192.168.0.99
Reverse name resolution: 192.168.0.99→ppp000099.otemachi.provider.com
Forward name resolution: ppp000099.otemachi.provider.com→192.168.0.99

As can be seen, host.customer.co.jp is isolated. In other words, when ppp000099.otemachi.provider.com is a misidentified host, ppp000099.otemachi.provider.com cannot know the host name "host.customer.co.jp".

host.customer.co.jp is the host name that T (4100) performs updating to D (1000), and 192.168.0.99 is the IP address assigned to T (4100) at that time, and ppp000099.otemachi.provider.com is the host name obtained by performing reverse name resolution for the said IP address; the host name is given by the ISP.

The reason for this phenomenon is described below.

Non-isolation of host.customer.co.jp goes against a prerequisite of DNS delegation that disallows setting of reverse name resolution for networks managed by other people (other organizations) (RFC2050, 2317, 3152). For example, when a network that D (1000) belongs and a network that P (4000) belongs to are managed by different organizations, D (1000) cannot set reverse name resolution for P (4000). However, host.customer.co.jp is widely announced by the owner of T (4100) to accept access from S-2 (5300).

That is, host "host.customer.co.jp" cannot be known for reverse name resolution although it is a widely known keyword used when performing forward name resolution.

When T' (4200) receives a sign, it cannot know what host name is specified as the destination by the originator, due to the network characteristic that host reachability is obtained by associating a static identifier and dynamically assigned network address with each other.

Impersonation

However, this does not apply in some cases. For example, when the destination port is HTTP, naturally the host name is not included at session establishment, but the destination host name (which the web surfer wishes to see) may be included in the subsequent GET statement. In such a case, when implementing a program that extracts the host name included in the GET statement and thereafter and returns it as is in a host that might be misidentified, the reply that should be made and the countersign to carry it can be impersonated. This is a passive attack.

Effect Range of Impersonation

However, this is not realistic because when an impersonation attempt is made, the impersonation must wait for access to the misidentified host T' (4200), and even if such an impersonation succeeds, when the IP address assigned to T (4100) changes, the impersonation can no longer follow the change. Consequently, impersonation is established only for the period while the IP address assigned to T (4100) does not change.

Therefore, there is very little effect unless update processing to D (1000) is taken over. (Even if impersonation can be made, it does not last long.) That is, impersonation can be made completely and without causing misidentification only when update processing is taken over. However, this case is no longer impersonation and countersign is not relevant to the password used at updating. Consequently, update processing to D (1000) must be guarded.

Impersonation is Made in the Following Case:

First, misidentification must occur; impersonation cannot be made unless the host T' (4200) is a misidentified host.

Upon receiving a sign, the misidentified host T' (4200) performed impersonation by returning a countersign carrying the "reply that should be made" giving T's identity.

Now, as with T (4100), T' (4200) is assigned an IP address by P (4000). Moreover, as with T (4100), the IP address of T' (4200) could change. From this, we can say the following:

As with T (4100), T' (4200) belongs to the address range under P (4000). In other words, the range where misidentification could occur is limited in advance by the IP address range of P (4000). However, the limitation is determined by the network state and is not man-made limitation.

As with T (4100), T' (4200) cannot continue using the IP address assigned to it transiently by P (4000). Consequently, even if T' (4200) makes a successful impersonation, it cannot remain impersonated for long.

Impersonation is established in the following case:

Basically, impersonation is only possible when T (4100) enters a failure state excluding the cache problem. Moreover, impersonation is established during the following periods:

Period while IP address of T' (4200) does not change

Period from when T (4100) returns to normal state until update performed again From the above, impersonation is possible, but its effect range is assumed to be permissible.

However, a sign, such as "Who are you?" that simply prompts the other communication end to reply is recommended; a sign, such as "Are you so-and-so?" is not recommended because it causes a situation facilitating impersonation. The said "so-and-so" is assumed to be a specific name, etc.

Effect of Independent Reachability Confirmation

A comparison is made between reachability confirmation and update takeover. From the above, we can say that reachability confirmation need not be guarded.

Reachability confirmation and update are independent processes with no direct relationship. Moreover, reachability confirmation is not something like an account password.

This is the effect of independent reachability confirmation.

(Theory)

1. Communication Model

List of Characters

First, values with special meaning in the present invention are shown below.

A: Dynamically Assigned Network Address (=Network Address)

Value used by network; and address controlling actual reachability to terminal

Assigned transiently by P

B: Static Identifier

Value used by man; and identifier to locate destination terminal

Next, Functions are Shown Below.

D: Mapping Notification System

When the originator attempts to start communication, the system provides reachability to the destination terminal, to the originator by associating the destination terminal's static identifier and dynamically assigned network address.

Notifies a pair of A and B, on behalf of T

T: Destination Terminal
  Destination terminal in this model
  Sets a pair of A and B associated, for D
  Need not be computer; only need be communication node S: Originator Terminal
  Terminal to confirm correctness of reachability to T, with T being destination
  Verifies correctness of reachability for T
  Need not be computer; only need be communication node P: Function to Assign A, Transient Address, to T
  Generally, P is a network or a specific server.
  Network itself containing T, from viewpoint of telephone company
  (For example, at a telephone company, DCE is viewed as the clock sending side; DTE is the clock receiving side. That is, the clock is received from the network itself. Accordingly, for example, at the ISP providing Internet service, the IP address is assumed to be assigned by the ISP's network, not by the network access server (e.g. Livingston Portmaster and Ascend MAX) or RADIUS server.)
  From the LAN viewpoint, the IP address is assumed to be assigned by DHCP server.

A pair consisting of A and B is expressed as "a pair of A and B".

Real Image of Pair of A and B

At T, B is an identifier to make T itself public. A is an address assigned transiently to T by P. With B alone, network-wise reachability is not obtained from S, a third party viewed from T. With A alone, network-wise reachability is obtained, but since A is an address that T borrows from P and uses transiently that terminals other than T also use, a third party cannot associate T and A. However, B is information notified to indicate T, and at this time, A is the address assigned to T. With this fact, T is assumed to have the pair of A and B entity ("real image" hereafter).

Mapped Image of Pair of A and B

D (mapping notification system) is notified by T that A and B are associated, stores the fact, and notifies it to S (third party) of it. Specifically, when D is queried about either A or B, D replies to either A or B that is not queried. From another viewpoint, when either A or B is an input, D is also regarded as a system that outputs the remaining one of the pair. Uniquely, since T cannot make a notification, D makes it on behalf of T. Therefore, a mapped image of the pair of A and B is notified at D.

Incidentally, when incorrect reachability is obtained, it is often said that T is wrong and D is correct. However, this is incorrect because S cannot reach T unless the pair of A and B mapped at D reflects the actual situation. The actual situation means the real image of the pair of A and B at T; each element of the pair of A and B cannot be described as correct or wrong individually. S cannot reach T unless the pair of A and B in its entirety reflects the actual situation correctly.

In other words, when S does not reach T correctly, it cannot be said that T with a real image of the pair of A and B is correct, nor that D announcing the mapped image of the pair of A and B is wrong; neither can the opposite be said. What is important is that they—the real and mapped images of pair of A and B—match each other, meaning the mapped image of information about T stored by D, and the real image of information consisting of B (held by T) and A (conditions for being accessed at that point which P gives T) match.

Hereafter, the terms "real image" and "mapped image" are assumed to be followed by the term "of the pair of A and B".

Now, see FIG. 22.

Steps (1) to (5) are a process sequence.

In step (1), the pair of A and B is mapped from T to D.

In steps (2) and (3), the pair of A and B between D and S is checked.

In steps (4) and (5), the pair of A and B between T and S is checked.

Hereafter, numbers (1) to (5) refer to FIG. 22.

What must be emphasized is that unless the mapped image of the pair of A and B at D and the real image of the pair of A and B at T match, the third-party S cannot reach T.

This happens because although the real image of the pair of A and B is undoubtedly at T, the third-party S viewed from T or D, cannot reference T directly in the first place, so S references the mapped image of the pair of A and B at D to obtain reachability to T.

In other words, T maps the real image only to D, and is never referenced by third-party S because T is a destination as viewed from S, so S references D first in order to discover T and cannot reference T when S cannot discover it.

Access from S to T is made possible after S has discovered T.

Therefore, it is verified that S, the originator, reaches T, the destination, correctly as follows:

Reachability from originator S to destination T is correct when the pair of A and B between D and S (mapped image of the pair of A and B entity), checked at (2) and (3) and the pair of A and B between T and S (real image of entity of pair of A and B), checked at (4) and (5), match.

2. Sequence

So how do we determine whether or not the real and mapped images of the pair of A and B match?

This requires discussion based on a sequence.

The relationship between values A and B is explained using a sequence from FIG. 22.

(1) T creates the mapped image of the pair of A and B at D.
(2) S performs a query to D using B.
(3) D returns A to S in response to the query.
(4) S performs a query to T (or a destination that is believed to be T) using A obtained in (3).
(5) T returns B to S in response to the query. If the destination that is believed to be T is actually not T, the destination returns an unknown response. When T returns no response, it is assumed that the "no response" response is returned. "no response" is included in unknown response. In other words, this is based on the concept of the existence of a null value. Hereafter, this specification is described based on such a concept.

Each Step in the Sequence is Explained.

(1) is a process where T maps the real image of pair of A and B to D. As a result, the mapped image of the pair of A and B is created at D. Normally, this requires authentication between T and D so that a third party cannot map a false pair of A and B to an appropriate T.

The real image of the pair of A and B can be not only mapped by T but also by a set, such as a device integrated with T (detailed in embodiment 8). The subject to perform mapping may be P (such as a DHCP server, ISP, operator ENUM).

(2) and (3) are regarded as a set of procedures. This process is equivalent to so-called name query.

At (2), S performs name query to D regarding static identifier B, a well-known keyword, taking advantage of the system whereby when D inputs either A or B, the remaining partner of the pair is output.

At (3), in response to (2), D returns A (dynamically assigned network address), the other half of real image of pair of A and B created at (1).

Operations at (1) to (3) described above use related art. Operations at (2) and (3) are regarded as a set of natural phenomena (external objects) that should be used.

At (4), S prompts T to reply using A (obtained at (3)) that should have reachability to T as the destination. A is used temporarily at (3) and (4), so it need only be assigned. In other words, S need not store A. (However, occasionally it may be best for S to store A as discussed later.) At (5), T returns B, the other half of pair of A and B, to S. When B is returned (that is, the reply that S receives from T), the originator reaches T correctly because B used at the first query at (2) and B returned from (5) are identical. This case is sharply distinguished from the case when T returns an unknown reply in response to the request at (4) (to return something as a response).

Then, S can know the mapped image of the pair of A and B at (2) and (3), and the real image of pair of A and B at (4) and (5).

After the sequence is completed, S compares between the mapped image of the pair of A and B at (2) and (3) and the real image of the pair of A and B at (4) and (5), to see if they match.

The timing is explained below.

At (1), the operation to create a mapped image from the real image is an operation unrelated to S, so S cannot know the operation timing.

At (2) and (3), the process of obtaining the mapped image of the pair of A and B is the responsibility of S, so it can execute the process at any timing.

Similarly, at (4) and (5), the query about the pair of A and B entity is also executed any timing. The process can be executed at the timing required by S or based on the internal timer of S. Moreover, the operation at (4) and (5) need not necessarily immediately succeed (2) and (3).

For example, at (second and subsequent) reachability confirmations after reachability is confirmed, the address of T (4100)—the destination of the sign performed at (4)—is stored; normally, steps (2) and (3) are usually omitted but after S becomes unable to reach T (after reachability correctness is no longer confirmed), steps (2) and (3) are re-executed.

The relationship between (2) and (3) and between (4) and (5) are the one between request and reply, respectively.

(5) is operation, and simultaneously a carrier of B; the relationship between the carrier and B is like the relationship between a bucket and the water it contains.

3. Extension

The theory can be extended to comparison of two mapped images.

However, note that if D is already made redundant based on the primary-secondary or master-slave model, it is inadequate to make a comparative judgment regarding two mapped images within that redundant group. In this case, only (2) and (3) are tried twice, and their result is compared; normally this is not a comparison.

So, normally, comparison of two mapped images is valid when they are separately mapped by T to the irrelevant mapping notification system. In other words, there must be two or more different non-redundant mapping notification systems equivalent to D. However, there should not be too many Ts meeting such a condition, so another method is used.

In this method, S also attempts to communicate to T at (4) and (5), but T returns something other than B as a response.

In this method, at (5), T can return—as a response—the character string (associated with T) stored at S, instead of B. Consequently, at (5), T can use every character string as a response, as long as S knows they are associated with T.

Similarly, the case where every character string translated based on some rule agreed between T and S should also be permissible. In other words, both a replaced character string and a translated string can be used as a substitute for B.

The relationship between every character string and B itself is delicate. Every character string is an extension of B, meaning it is derived from B. On the other hand, every character string naturally includes B when B is simply viewed as a character string.

Thus, it is difficult to define which (B or every character string) is the generic concept. In this specification, every character string is assumed to be a substitute for B. In this case, every character string is conditionally established; that is, the condition that S knows that every character string is associated with T, must be met. However, such a statement is omitted hereafter.

Summarizing the contents of character string that T returns at (5) to S as a response, when the response is B itself, S only needs to know the static identifier B of destination T. When the response is every character string, D needs to know the static identifier indicating T, and also needs to know either the character string associated with T, or the translation rule.

In subsequent description, when simply the symbol B is used, it is assumed to include a substitute for B; "B itself" and "a substitute for B" are explicitly stated only when it is important to distinguish between B itself and a substitute for B. Also, unless there is some special need to distinguish between the replaced substitute for B and translated substitute for B, the term "substitute for B" or "every character string" is simply used.

At (2), when S performs query using B and then B itself is returned as a response at (5), this situation may be expressed as a "parrot-fashion relationship". In this case, the returned response is B itself, not a substitute for B.

So far, we have described the communication model for implementing the present invention.

Specific devices for actually controlling specific functions are described below. There may be multiple devices depending on the situation or positional relationship of networks. These specific devices for controlling specific functions can be substituted, forming a specific set.

D Mapping Notification System

D normally often configures a redundant server group, so there is a substitution relationship within this group. Typically, D notifies mapping of B and A disclosed in dynamic DNS, ENUM DNS, and patent documents 1 and 2.

T: Destination Terminal

When T is within the LAN and communicates with D and S via a gateway and then via a public store-and-forward network, viewed from P, there is a substitution relationship between devices integrated with edge nodes. Practical role sharing in this case is detailed in embodiment 8.

S: Originator Terminal

S-2 and S-1 exist. (Basically, S may be either S-1 or S-2. S-1 and S-2 must be clearly differentiated only when they perform client-server type operation. S-2 performing client-server type operation may have no reachability confirmation function.)

In implementing the present invention, when a client-server model is adopted, S-2 performs query to S-1, and S-1 confirms reachability to the destination on behalf of S-2; S-1 is the originator.

S may be integrated with D on an exceptional basis.

P: Entity to Assign A, a Transient Address, to T

When T is on a LAN and P is a DHCP server, normally, the DHCP server assigns A. However, this assumes that D and S can also be reached on the same LAN or via an inter-LAN connection. When transiting a public network to communicate to D or S, a network such as the ISP should be P. In other words, P does not assign transient address A to T; P simply assigns A to the edge node. As explained earlier, in this case T is a node reference that is integrated with an edge node that is a gateway. This is also detailed in embodiment 8.

A specific P and T should be selected from among substitutes depending on the network configuration (how networks are connected) and the positional relationship of these devices.

Operation is given the following names:
(1) This process maps pair of A and B from T to S. The process is a related art; and in DNS, it is equivalent to "update."
(2) In a DNS example, this process is "name query". For unification of terms, the term "name query" is also used for D other than DNS.
(3) In a DNS example, this process is "name resolution". As with (2) above, the term "name resolution" is also used for D other than DNS. Because (2) and (3) are a set, it is assumed that expressing one half implies the existence of the other half.
(4) Conventionally, there is no reachability confirmation process; ordinary communication such as web access is equivalent to this process. This process is called "sign". It is also called "communication using the method agreed upon in advance".
(5) This process is a response to sign, so it is called "countersign."

Real and mapped images of pair of A and B can be obtained using the above sequence ((2) to (5)). Confirming the reachability by comparing the real and mapped images of the pair of A and B thus obtained is called reachability confirmation.

At (4) and (5), the said comparison can be made even when character string is replaced or translated. So, the character string that can be used for a reply that should be made is every character string.

As explained earlier, processes (1) to (3) are executed conventionally.

When (4) is a general access, T returns a response appropriate to its access method.

However, therefore, at (5), T will never return B or return every character string agreed upon between T and S.

So, at (5), the said theory cannot be used unless an existing mechanism is diverted or a new mechanism to return a countersign is implemented.

Host that Performs the Process (5)

How the host that performs the process (5) should behave is explained below. Here, it is assumed that the host returns B itself as the reply that should be made.

1. In the standard state, T (4100) does not give its identity or gives an irrelevant name as its identity. Giving an irrelevant name as its identity means that PC, for example, returns an appropriate name given to it in advance, as its identity. (An appropriate name does not mean a host name including a domain name that is dynamically updated by T (4100) to D (1000); such a host name cannot be set unless it is intentionally set.)

2. Then, the name cannot be used as a reply that should be made, meaning that the name is not proper.

3. So, T (4100) must return a name that is used as a reply that should be made. A name that is used as a reply that should be made means a host name updated dynamically at D (1000). From 1 above, this means an explicit setting change. This is because S-1 (2000) obtains the IP address of T (4100) by referencing D (1000) that manages the domain of T (4100), and at this time, S-1 (2000) requires T (4100) to return the host name, a key used at name query, as is.

4. The above setting is a special setting; usually, T (4100) is not set as described in item 3 above.

Performing such a setting is needed to establish the sign-and-countersign operation performed in the present invention.

The same theory also applies to the case when the reply that should be made is a substitute for B.

The above explanation is summarized below.

Reachability confirmation is established by comparing the real and mapped images of the pair of A and B. To do so, four elements (values) concerning the real and mapped images of the pair of A and B must be obtained. Of these, only the value B for real image cannot be obtained by conventional methods. Consequently, we propose a carrier that we call "countersign". The carrier is obviously a signal, and means an entity to carry information.

"Reply that should be made" is information carried by "countersign". The said B itself and the said substitute for B are a type of information. Using an analogy, "countersign" is a bucket, and "reply that should be made" is water in the bucket. "Reply that ought to be made" is information associated with "reply that should be made" that is stored at S. On receiving the "reply that should be made" by T carried by "countersign" at (5), S compares the reply to the "reply that ought to be made" stored internally at S to determine a match. When they match, reachability is correct; when they do not, reachability is wrong.

The section entitled "Host that performs the process (5)" is appropriated for the explanation. The communication methods described in embodiments 1 to 7 are related art. However, by using the communication method differently from the conventional method, a new value called reachability confirmation can be created. Communication method only means which communication port is used. Consequently, regardless of whether something new is used or something old is appropriated, they must be within the range of communication port. Normally, it is better to use new ports, but this requires standardization established by a different procedure from the present invention. The reason for appropriation is simple; we wanted to clarify the ability to implement the inventions independently of communication ports.

The identity given for the host name is usually stored at the storage device of T (4100). In response to the communication request (=sign) from S, T returns a response (=countersign); at this time, the host name is read, embedded in the response, and returned. The response contents are called the "reply that should be made." Consequently, T (4100) must be explicitly set to return its host name (as its identity) that is updated, to D (1000).

However, the replaced or translated B is regarded as B itself. This is explained in the following section "Type of reply that should be made."

Type of Reply that Should be Made

The character string that can be used as a reply (that should be made by T) carried by countersign is typified. DNS is used as an example.

1. Host Name

In the case of B itself, host name is assumed to be FQDN.

It is best if the destination's host name is the reply's host name. But, when the only host name is returned is rather rare, and actually a fairly lengthy reply seems to be returned.

Consequently, a reply that should be made must be extracted from the returned lengthy reply.

In other words, this is a typical example of sign-and-countersign. When the said condition is met (that is, when T (4100) is explicitly set to return its host name (as its identity) that T (4100) uses as a reply that should be made), the host name is simply returned as is, so setting of a reply that ought to be made can be omitted at S-1 (2000). The algorithm is explained in embodiment 1 and setting is explained in embodiment 1 and Table 02.

In other words, at (2), the contents of the query that S performs to D (1000) are B; and at (5) after going through (3) and (4), the contents of a reply that should be made are also B. At S, B need not be stored twice. The reply can be omitted when the destination and a reply that should be made are the same (that is, the reply is B itself).

Multiple replies that should be made can be made.

Incidentally, when the mapping notification system is not DNS, the host name can be considered to be static identifier itself instead of FQDN. For example, In patent document 2, FQDN can be replaced by a handle name.

2. URI scheme (=uri_scheme)

In this concept that the protocol name is rather included in the reply, since there are many cases that the reply containing the host name is lengthy.

When different services are provided at a single host, even when each of these waiting services is associated with each of multiple host names, inclusion of protocol name enables reachability confirmation to be performed for each pair of a host name and a service individually. In other words, this is a case where service is provided using an alias host name (including one in a different domain) at a single host.

Uniqueness is provided.

Setting of a reply that should be made may be omitted at S-1 (2000) depending on the circumstance, such as when the following services are provided at a single host called user01.customer.co.jp and that reachability confirmation is performed for each of those services.

http://wwwhost01.customer.co.jp
   mailto:sales@customer.co.jp
   mailto:info-fax@faxsvr.customer.co.jp
   sip:info@customer.co.jp
   h323: info@customer.co.jp
   h323: info-fax@customer.co.jp
   tel:81-3-1234-5678
   enum:8.7.6.5.4.3.2.1.3.1.8. e164. arpa, etc.

The URI (Uniform Resource Identifier, RFC2396) features permanence and ability to be referenced without ambiguity. Here, URL is assumed to be a specialized form of URI; and URI is assumed to include URL (RFC1738). In the present invention, URI includes host name, so URI is treated as an extension of the host name.

In this case, a reachability confirmation port waiting at T (4100) may also be a well-known port, but a port dedicated to reachability confirmation (a port not for service) can also be provided separately as a non-well-known port.

The international public telecommunication number ("telephone number" hereafter) defined by the ITU-T Recommendation E.164 is converted to the host name (FQDN) called a reverse-sequential telephone number, e164. arpa to become input to dynamic DNS (RFC3263) to connect to existing telephone networks. This is commonly called ENUM. In this case, the telephone number (RFC2916) that the sender specifies for the receiver at translation of the character string can also be used as a reply that should be made. This is ideal like when the "destination's host name is the replied host name" (described in item 1 above) in the parrot-fashion relationship (B used at query and B returned as a reply are the same) is established, so reachability confirmation can be performed. (The telephone number or the said converted telephone number host name are normally included in the host name stated in items 1 above.) Of course, the URI obtained in the intermediate process of the said conversion can also be used as a reply that should be made.

The telephone number is obviously a static identifier. The reverse-sequential telephone number e164. arpa in ENUM is a host name, and simultaneously is a telephone number itself. (It is a telephone number itself because it is simply mapped onto DNS and is equivalent to a telephone number. Although some people disagree with this; it is only a matter of notational difference.) When it is a telephone number itself, it should be included in the host name as a type of reply that should be made, and not in the URI.

In other words, the final character string obtained as a result of name query (forward name query to T (4100)→IP address as the other communication end where sign is sent, query as sign→character string as reply that should be made) is associated with T (4100); of course, and reachability confirmation can be performed when T (4100) only returns identification information about itself as a reply that should be made.

Incidentally, when the URI form is used, not only T (4100) but also user (man) of T (4100) can be identified. To identify them, the character processing part only need be constructed to have multiple stages in the algorithm disclosed in embodiment 1 (those skilled in the art can easily imagine this).

That is, additional information can be included in a reply that should be made.

Also, because multiple replies that should be made are allowed to be made, a single T (4100) can let reachability confirmation be performed for each of multiple services and multiple aliases.

For the URI scheme, the character string is on the boundary between B itself and a substitute for B. When B itself is included in URI scheme, a reply that should be made by T (4100) is extracted from the returned lengthy reply, as described earlier in item 1 (host name), so the character string can be regarded as B itself, as with item 1.

However, when B itself is not included in the URI scheme or when the entire URI scheme instead of B itself is agreed upon, the character string should be regarded as a substitute for B.

3. When No Host Name Included in Reply

The character string is a substitute for B.

The explanation so far assumes that the host name is FQDN.

However, there is an implementation that returns a host name other than FQDN when T (4100) cannot be located from the reply that should be made.

The following three patterns are possible:

a. When only domain name included, and narrowly-defined host name not included This case is special. When the customer uses a domain name exclusively, the host name can be regarded as FQDN. When the customer does not use a domain name exclusively, no discrimination is provided (self identification information is insufficient).
b. When only narrowly-defined host name included, and no subdomain name and domain name included (non-qualified single label)
c. When host name and subdomain name included, and no domain name included (non-qualified multiple labels)

Unlike name search, S-1 (2000) never adds a suffix, to confirm reachability for T (4100). When the host name is USER01 or HOST01, no discrimination regarding man is also provided. Obviously, no uniqueness is provided. However, this is all right.

Having no uniqueness only means that T (4100) cannot be located from the reply received by S-1 (2000) that should be made by T (4100).

A character string registered at S-1 (2000) that is neither host name nor URI scheme is also a substitute for B. The character string can be an X509 certificate or simply a public key of T (4100), and need not necessarily be the host name. In other words, T (4100) need not necessarily return its host name; it only needs to return identification information about itself as its identity. More specifically, identification information only need to be agreed between T and S. Agreement between T and S here includes agreement about the character string that T (4100) determines on its own and announces publicly. So, unlike FQDN or URI, the character string need not be unique globally.

Moreover, S-1 (2000) naturally knows identification information about T (4100) and confirms reachability by comparing between identification information (=reply that ought to be made) of T (4100) stored at S-1 (2000) in advance and the reply (=reply that should be made) from the device (the other communication end) believed to be T (4100).

The above explains the case where no host name is included in the reply and the case where the character string replaces B itself. In the replacement case, the replaced character string is agreed directly between T and S, so replacement is static. In the translation case, the translation rule is agreed, so translation is just dynamic replacement.

Consequently, countersign is a signal that functions to let S confirm reachability to T (4100).

Feature of Reply that Should be Made

As explained in the Impersonation section, the reply that should be made is not password. That is, the reply that should be made is not a security risk and need not be kept secret.

Conventional individual identification is not used to identify T (4100). Reachability is determined by comparing between the value obtained from the network characteristics and the stored information.

In addition, S is not a specific single communication node. As seen from the description that S is given as S-2 (5300), S is assumed to include the general user (unspecified majority). In this case, the reply that should be made cannot be secret; it does not mean that the reply need not be made secret. To use a substitute for B, not only a static identifier indicating T (4100) but also the replaced character string and translation rule must be notified to S in advance. This may seem unrealistic but it is not necessarily the case. For example, it is not unusual to notify the URL and mail address instead of a domain name. Considering the same case as this example, it is not that burden on the T (4100) side and the S side increases.

But, there is a different case. For example, when a substitute for B is notified only to a specific S-1 (2000) and the substitute is used as a reply that should be made, the substitute is nearly secret. However, even so, the substitute should not be confused with a password. The substitute only means the present invention can be implemented flexibly.

From the above, reachability confirmation is made possible if T (4100) only returns a character string containing an expected reply stored at S-1 (2000).

Incidentally, DNS is defined as described below viewed from the resolver.

(Conventional)

In response to query from resolver, system where static identifier translated to static IP address and then output (Recent)

In response to query from resolver, system where static identifier (host name, telephone number) is translated to dynamic identifier (URI), translated to static or dynamic IP address and then output using multi-stage recursive query (intermediate processing)

The recent DNS includes conventional DNS.

As described, the positioning of DNS is changing.

The process in which DNS translates the identifier is described below.

Alias(=CNAME)→host name→IP address Telephone number→Host name→URI→IP address

A reply that should be made can be either a static identifier (IP address not included), first input to DNS, or an identifier (IP address not included) that can be obtained in the intermediate identifier translation process at DNS (see above).

A translation process starting with an alias may have a special meaning.

First, a host on another DNS has been referenced conventionally using an alias. In other words, recursiveness is used before ENUM appears.

Second, T (4100) pointed to at another DNS is updated dynamically. When the dynamic update is considered simply as an operation, ignoring translation of character string, the dynamic update can be said to be the same operation as ENUM.

When it is assumed here that multiple countersigns may be returned, reachability can be confirmed not only for end-to-end but also for the host (DNS in this case) in the intermediate process during the name search process. At S, a target reply that should be made just needs to be extracted from multiple replies returned that should be made.

In this case, two methods are available: one is return multiple replies that should be made, using a single countersign, and the other is return multiple countersigns, each of which carries only one reply that should be made.

Returning multiple countersigns has two merits:

It is possible to make multiple identifications at a single T (4100).

It is possible to increase traceability when a node in the intermediate process during the name transformation process returns multiple countersigns. In this case, S only need extract a reply that ought to be made indicating the target T (4100) from the reply made by the intermediate node. Consequently, like traceroute, it becomes possible to confirm reachability to the intermediate node, providing great help in locating failure locations.

Design Concept

Network Management

This explains the needs for network management. First, the term is explained. Network management itself is the concept of ordinary management including so-called configuration management and accounting management. Its target is the network. The relationship between management and monitoring is explained next. It is understood that the large category called network management includes a specific technique called host and network monitoring. (For example, traffic can be measured for both individual nodes and the entire network.) Because the network state is continually changing, monitoring the state is the first step to deal with failure, and the monitoring result should become feedback to network design or become materials indicating the grounds for future network expansion planning.

However, in the present invention, T (4100) is a boundary node in the customer network that is assigned a dynamic IP address, or a host integrated with a boundary node that is referenced; T (4100) is quite small. But, because T (4100) provides some TCP/IP service, Not noticing the state in which no service can be provided due to line disconnection or system failure is a problem. If some failure occurs, it should be promptly notified and recovered. To do so, network management is needed, even for a small-scale network. Network management makes it also possible to manage hosts with changing IP addresses that cannot be managed conventionally.

Meaning of Ping

The ping command implements the echo request of the ICMP protocol and is conventionally used to confirm reachability (host is alive or dead).

ping is like fish finder; if a response is returned, it is known that schools of fish (or hosts) are present.

However, when the destination host (T (4100)) has a changing IP address, ping indicates that the host (other communication end) responds even when reply is from T' (4200) instead of T (4100). In this case, host reachability cannot be said to have been confirmed.

Using ping, it is not known whether the other communication end is the real one. Consequently, the present invention asks "Who are you" and the response is "I am so-and-so." If this reply matches the expected name, T (4100) is known to be reachable.

The present invention is designed as a substitute for ping, which can no longer be used for hosts with changing IP addresses (different from conventional hosts). In other words, the present invention is not intended as 100% substitute for ping. (In fact, many ping functions are not implemented in the present invention.) The present invention is only used as a substitute for ping because cannot be verified using ping.

To facilitate understanding of the present invention, FIG. 39 shows an image of the present invention used as a substitute for ping (an image of the present invention that S-2 (5300) uses as means to confirm reachability to T (4100)). (Details are given in the practical application.)

Here, the case that reachability to T (4100) is confirmed means the originator reaches the other communication end and then a reflection is returned from that end, which is equivalent to reachability confirmation—the intended purpose of ping.

So, the present invention can be a substitute for ping in terms of reachability confirmation. The round-trip time included in the output from ping is not considered, but addition of calculation of the round-trip time to an implementation of the present invention is easy to those skilled in the art. However, note that when using the present invention shown in the practical application, a redundant output such as round-trip time is undesirable in an implementation as a filter.

The situations when there is network "cloud" when a ping is returned from the other communication end, or when the other communication end is on the same Ethernet (not connecting via network cloud) are transparent. Similarly, they are transparent to the present invention (this means end-to-end communication).

Design Considerations

The present invention aims to use the intrinsic autonomy of store-and-forward networks.

The present invention tries to be simple and clear. Regarding the simplicity, the invention tries to be self-explanatory structure by people.

Also, the invention aims at higher applicability, availability, flexibility and independence of scale.

Operability

People's have high psychological resistance to discarding related art.

An invention that cannot be implemented without changing social infrastructure has low chance of success. So, the present invention should be implemented to provide convenience and usability without changing related art and by adding new technology.

The present invention has a high possibility of becoming widespread because it can be started on a small scale, can be implemented independently of scale, and can be implemented by being highly consistent with related art and without discarding related art.

Scope of Application

The present invention can be used in Ipv4 and Ipv6 networks.

The operation model can be peer-to-peer or client-server. Also, the present invention can be applied to both portable and mobile IP addresses.

Here, IP address mobility means cases such as when a networked laptop is turned off, moved (e.g. hotel while on a business trip), and then powered on.

IP address mobility refers to a case where IP address handover occurs with communication being maintained (at a mobile terminal).

IP address portability tends to be confused with IP address mobility (=IP Mobility; RFC2002 to RFC2006).

However, they are different in purpose. IP Mobility is a technology aimed at ensuring that it receives a reply from communication whose call it made itself; providing discrimination of the called party's (mobile) terminal to the calling party's terminal is not the primary purpose.

Moreover, the mobile IP concept is different from that of the present invention in that dynamic and static addressing are associated. In that sense, the expression "Mobility of IP address" is not appropriate; the present invention verifies a pair of the static identifier and dynamically assigned network address regardless of address mobility.

Implementation

The present invention operates at the application layer, and is independent of the transport layer. However, the said application layer includes the session layer, presentation layer, and application layer defined by the OSI (=Open System Interconnection) reference model; a standard developed by ISO/ITU-T). As can be seen, this specification is described according to the successional UNIX-like standard. When describing the specification according to other standards such as OSI, a note to that effect is written clearly. Also, the said statement that the present invention operates on the application layer is not restrictive; even when, in the future, a protocol such as ICMP, where the present invention operates on the network layer, is proposed, the said proposal shall be within the scope of the present invention in the sense that the first implementation of the present invention operated on the application layer.

(Implementation)

The implementation of the present invention is explained using drawings. In each drawing, locations with the same function have the same sign. The following embodiments are examples, not restrictions.

In the embodiments, the explanation uses S-1 (2000), but this can be replaced with S-2 (5300). The explanation uses dynamic DNS as an example, but as explained earlier, ENUM, patent document 1, and patent document 2 are also applicable.

Embodiments 1 to 7 exemplify the kind of communication used to perform the sign. The sign is expressed as a communication method agreed in advance. In this case, normally, communication ports shall conform to the protocol using them. In embodiments 1 to 7, explanation is given using existing (well-known) ports as communication ports.

In embodiment 1, the assumed concept and algorithm are shown.

In embodiments 1 and 2, T (4100) is a network boundary (=edge node). Typically, T (4100) is a terminal itself.

In embodiments 3 and 4, T (4100) is a network connection equipment; typically, it is NATBOX.

In embodiments 5 and 7, it does not matter what kind of equipment T (4100) is.

In embodiment 8, the configuration and position of the network are shown.

In embodiment 9, an example of implementing the present invention for a device such as NATBOX is given (this is a new implementation).

In embodiment 10, an example of implementing the present invention for a terminal itself, typically a mobile terminal, is given.

Embodiment 1

Embodiment 1 uses SNMP for the communication method agreed in advance.

T (4100) is a computer connected directly via dial-up. An SNMP agent is implemented, and the usual setting is performed. Embodiment 1 is the connection configuration 1 shown in FIG. 37 detailed in embodiment 8.

S-1 (2000) is running a monitoring program via a timer.

At S-1 (2000):
1. The Internet uses many UNIX (registered trademark; "UNIX" hereafter) servers, so we assume that the present invention would often be implemented on UNIX.
2. On UNIX, major Internet services using well-known ports are introduced in advance, or they can be introduced at lesser cost and labor.
3. On UNIX, the string processing environment is provided as part of the OS from the outset, etc.

Consequently, we performed experiments on UNIX (an experimental environment can be created by implementing only the present invention).

For OSs in the Windows family, the existing DNS is replaced with ISC BIND (the Internet standard DNS since it was adopted in Berkeley UNIX as the first DNS implementation). Or, the existing DSN is replaced with a substitute for ISC BIND. The said substitute is something like the dig command included in ISC BIND, which can closely examine DNS server information from outside. For the SNMP manager, the Microsoft product can be used, or a product such as OpenView (registered trademark; "OpenView" hereafter) can be introduced. The string processing environment, it is not fully included in Windows OSs, so it may be best to prepare the environment separately or to build it into a program during development of the program to implement the present invention. (However, in this case, a program interface with output of the dig command included in ISC BIND is troublesome; labor might be saved by creating a substitute for the dig command.)

When T (4100) is PC, for Windows OSs, it can be used as is, because an SNMP agent is included in Windows NT or Windows 2000.

Therefore, the present invention can be implemented regardless of the OS type.

For communication methods such as SNMP, waiting port numbers shall be the same as well-known ports defined by RFC1700 ASSIGNED NUMBERS, or shall be something similar, unless otherwise stated. RFC originated from the document published as "Request For Comments" to agree on (or improve) a communication method during ARPANET development. It presently functions as a standard convention set for communication over the Internet or TCP/IP.

SNMP (=Simple Network Management Protocol) is a standard network management protocol that is not simple. During communication using SNMP, the community name, and the object ID that should be used for confirming of reachability to T (4100), are agreed as the communication method; the value of the object ID set at T (4100) is agreed as a reply that ought to be made. For example, PUBLIC, initial value, is used for the community name, and sysName representing the host name is used for the object ID.

When setting the SNMP agent, in most cases, sysName is not something that is set explicitly, and it simply quotes the system's host name as is. Here, the explicit setting change described in the section entitled "Host that performs process (5)" and the description given in the section entitled "Type of reply that should be made" shall apply. For the host name set at T (4100), the Fully Qualified Domain Name (consisting of host name, sub-domain name, and domain name; "FQDN" hereafter) that is registered at D (1000) shall be set. In a few devices, there may be a case where FQDN cannot be set and only a host name not including a domain name can be set. In such a case, when daring to use B itself as a reply that should be made, see embodiment 2. In such a case, it is simpler to use a substitute for B as a reply that should be made.

Here, since the object ID can be regarded as a variable assigned the contents (=identifier) of a reply, the following is established:

Value of object ID (sysName)=FQDN=Contents of reply=Host name of T (4100)

Table 02 shows the items required for communication setting, such as name of T (4100) registered at S-1 (2000) and a reply that ought to be returned.

TABLE 02

| | S-1 (2000) or S-2 (5300) | | Direction | T (4100) | |
|---|---|---|---|---|---|
| Setting item | Static identifier indicating T, destination | (Value) | Sign → | How to receive sign | (Receiving communication port) |
| | How to perform sign | (Destination communication port) | | | |
| | Reply that ought to be made | (Value) | ← Countersign | Reply that should be made | (Value) |
| | — B itself | Setting not needed because T assigned | | — B itself | B itself |
| | — Replaced B | Replaced string | | — Replaced B | Replaced string |
| | — Translated B | Translation rule | | — Translated B | Translated rule |

As seen from Table 02, the setting items are common to S and T except that, at S, a static identifier indicating T (4100), destination, is added. When the reply that should be made by T (4100) is B itself, this setting can be omitted on only the S side.

At S, the sequence in the communication model is completed by receiving a countersign. After this, at S, the reply stored internally at S that ought to be made is read for comparison to the reply that should be made by T (4100) that is carried by a countersign. Whether the result of the comparison is true or false makes a sharp distinction between the case that the originator has correct reachability to T (4100) and the case that originator has wrong reachability to T (4100). A variable that temporarily stores a reply when the reply is received is needed, but since the variable is self-explanatory in computer engineering, and also since the variable itself is not so important in the present invention, the variable is expressed as a reply that should be received.

At S-1 (2000), setting items required for reachability confirmation can be stored in a storage device as sequential file records or can be a database accessed via DBMS. Alternatively, a program is prepared at each T (4100) and setting information can be input to the program. An appropriate method can be selected from these methods, depending on the volume of T (4100) managed at S-1 (2000). The method of directly embedding setting information in the program is convenient when the number of T (4100) hosts is relatively small (several hundreds at most). Contents set here need only include the items required for each T (4100), but they can also include additional information, such as the address of D (1000) managing the domain name used by T (4100). When applying patent document 2, the address of the IP address information notification server is stored. Also, the item arrangement sequence need not be as shown in Table 02; they need only be stored around T(4100) in such a manner that they do not become confused.

In the present invention, storage device means memory and external storage devices; it does not refer to registers or cache. Also, an external storage device need not be a local device incorporated in the appropriate equipment at S-1 (2000) or T (4100). For example, a disk array accessed via fiber channel and a NFS-mounted shared disk are both simply treated as a hard disk drive. Temporary storage need not be retained at restart of the equipment and is deleted after being stored for a short time, but it can be deployed to memory or to a hard disk drive as a temporary file.

At T (4100), a few items are required for setting communication. These items are items required for the program part that responds to a communication request made by the agreed method, and items required for communication of the reply itself. If the program is already implemented, the amount of data that should be stored is less. Storage devices storing items required for communication setting include: non-volatile memory, memory cards such as CF card/smart card; hard disk drives with the PCMCIA interface; normal hard disk drives; diskette drives; MO drives; and tape devices. (Also, storage media readers using removable storage media such as DVD-RAM, CD-RW (using packet writing method), and CD-R (that creates image) can be used.) Further, since the rewrite frequency is extremely low, storage devices that use removal storage media such as CD-ROM, DVD-ROM, ROM cartridges where stored contents are modified by being replaced can be used. (These storage media are not directly written in the appropriate equipment.) Incidentally, the storage device's interface need not be separated; the USB interface and IEEE1394 interface need not be separated in the same way that the SCSI interface and IDE interface need not be separated for hard disk drives. In addition, for example, setting can be loaded at start of the system, using communications such as TFTP from the host specified in advance. In this case, the storage device is an external host via communication, and setting is stored temporarily in the internal storage device.

The appropriate usable storage devices can be selected depending on the environment (specific devices) to be implemented.

Incidentally, as shown in FIG. 15, name query must be performed to D (1000) that is operating the domain name used by T (4100). In other words, it is basically assumed that there are many Ds (1000), meaning the query destination is switched each time a query is performed. For example, when the DNS operating the domain name used by T1 (4101) is D1 (1001), and the DNS operating the domain name used by T2 (4102) is D2 (1002), S-1 (2000) performs name query by switching D1 (1001) and D2 (1002), which are different Ds. When the DNS operating the domain used by T3 (4103) not shown here is D1 (1001), name query regarding T1 (4101) and T3 (4103) should of course be performed to D1 (1001).

Consequently, the following algorithm (FIG. 23) is performed for each T (4100) or for each D (1000).

Address Verification

S202 and S204 are address verification processes. Address verification solves the "cache TTL" problem.

The "cache TTL" problem means that when an attempt is made to perform forward name query from a DNS server (such as 4500 or 5500) for the IP address of T (4100), if the second or later access is made during the cache TTL specified at D (1000) and T (4100) performs update during that period, a wrong IP address is obtained for T (4100), so access is made to a host other than T (4100).

At S202, to solve the "cache TTL" problem, name query (forward) is performed from S-1 (2000) to D (1000).

FIG. 25 shows an example output of name query. The underlined part is the IP address of T (4100) last updated to D (1000). When the output is subjected to string processing and only the underlined part is extracted—meaning that the IP address of T (4100) is obtained (S204)—the IP address is stored temporarily at the storage device. To be more precise, the IP address is assigned to the address indicating T (4100), the destination, to confirm reachability at the next step.

FIG. 26 shows an example output when error occurs at name query. In this case, the DNS server is not in the normal state or is down.

FIG. 27 shows another example of output where an error occurs at name query. In this case, T (4100) is not found (information indicating T (4100) does not exist in the DNS record).

As described in the actual example of the cache problem, verification of the IP address of T (4100) can be omitted when either the resolver at S-1 (2000) is set to D (1000), or the cache TTL of D (1000) is quite short.

At 204, it is best if the error check shown in FIG. 24 is performed as necessary. If failure occurs at D (1000), the reply received at S204 becomes irregular. When, at S402, it is detected that data indicating T (4100) is not included in the reply received at S204, this is handled as an error. Similarly, when no reply is returned from D, this is handled as an error at S402. In this case, it is best if switching is made to another D (1000) within the range of redundant Ds (1000) (S408 to S410); if the problem persists, processing is stopped. If processing is stopped, reachability to T (4100) is determined to be absent even if the state of T (4100) is assumed to be normal. Also, when the reliability of D (1000) is adequate, the error check can be omitted. In this section, we have explained the patrol within the redundancy range of D (1000).

Sign-and-countersign

At S206, communication using the method agreed upon in advance (sign) is performed to the IP address of T (4100) obtained at S204. When address verification can be omitted, the string need not be translated to IP address. (Even in this case, query is performed using the IP address obtained at forward name resolution to DNS). At S208, when a reply is returned from S206, the reply is stored temporarily; when no reply is returned from S206, the completion code at S206 is stored temporarily and then error handling at S216 is performed.

FIG. 28 shows an example output where the host name of T (4100) is obtained using the GetRequest instruction of SNMP.

FIG. 29 shows an example output where communication at S206 fails. Specifically, this means when either the host name is wrong due to the cache TTL problem (the other communication end (host) is not set to accept SNMP), or the other communication end (host) does not exist.

FIG. 30 shows an example output where communication at S206 fails. Specifically, this means when the other communication end accepts SNMP, but the community name is wrong.

At 208, as with the cases in FIGS. 29 and 30 above, error handling is performed when T (4100) does not accept the GetRequest instruction of SNMP from S-1 (2000). When an error occurs with the GetRequest instruction of SNMP shown FIGS. 29 and 30, the reply from S206 is only returned at error output; no reply is returned at standard output. In such cases, some action should be taken such as assigning a completion code (indicating error) as a flag.

FIG. 31 shows the case when the SNMP object ID is specified incorrectly. In this case, the value of the appropriate object ID is returned normally and no error occurs with the GetRequest instruction of SNMP, so determination should be made at S212. In this example, sysLocation is used.

Also, when communication at S206 is correct and a reply that does not match the agreed-upon reply is returned (reply is not reply that ought to be made), determination is made at S212.

String processing is performed at S210 in response to the reply from the communication to extract the host name (FQDN) of T (4100).

At S212, the reply is compared with the reply that ought to be made in response to the communication using the agreed-upon method and that should be a reply from T (4100) that is set at S-1 (2000) for determination.

At S214, when there is a match between the reply that ought to be made from T (4100) that is stored at S-1 (2000) and that is returned in response to the communication performed using the agreed-upon method and the actual reply that is made by T (4100) in response to the query (communication using agreed-upon method) from S-1 (2000), T (4100) is operating correctly and is a host with correct reachability.

Output

At S214 and S216, the result can either be output to an ordinary console or terminal device consisting of standard output, keyboard, and display device, or can be written as a log file stored at a storage device, or can be output to another host via a TCP/IP communication path such as Syslog, X, or SNMPTRAP. In addition, the output can be e-mailed as input to the SMTP server program, which may be useful in linking the output to maintenance described later. The said result can be output as a combination of two or more of these methods, and can be printed to paper too. In implementing the present invention, it is best to perform output using a method (selected from these methods) matching the environment or subsequent processing. The output classifies whether the result of reachability confirmation is true or false. True is represented as S214.

In this case, nothing need be output when the purpose is to detect failure.

When the output purpose is something else, only a message saying that reachability to T (4100) is correct need be displayed. In displaying the message, use the most suitable method selected from the said methods.

False is represented as S216.

When no match occurs (S216), either T (4100) is not connected to the Internet, or it is in a state in which it cannot perform updating to D (1000) due to some problem.

At S216, two cases can be displayed by being distinguished in terms of the reason for the inability to reached: one is when no reply is made (S208); the other is when no match occurs (S212). In this case, it is best that the reason for the inability to reached is included in the message and is written to the log file, etc.

Incidentally, when a failure seems to have occurred at T (4100) because the timing at which S executes the process shown in FIG. 23 accidentally overlaps the timing of an update request to D (1000) by T (4100), the system should be returned to the normal state by itself if the second monitoring timing is waiting to be reached. In such a case, the failure that seems to have occurred before the second monitoring timing is reached, should not be detected as a failure.

At S-1 (2000), the monitoring program is executed via a timer, so setting an error flag at the step (not shown in figure) immediately after S216, can be used to detect whether the pass via the S216 step is the first, second, or later pass. At a normal return, it is best to erase the error flag at the step (not shown in figure) immediately after S214.

When the pass via the S216 step is the second pass, there is no timing problem and it is obvious that T (4100) is lost sight of. So it is best if maintenance or recovery is notified by e-mail (issue alert or ring pager) instead of simply writing to a log file.

In this case, since it is impossible to notify T (4100) itself that it cannot be reached, notification should be made to the administrator of T (4100) using an available method. However, the expression "notification is made to T (4100)" is used hereafter.

When transition must be made to the maintenance or recovery stage, and when T (4100) is disconnected from the Internet for some reason, so T (4100) cannot be found or only T' (4200) is found, T (4100) is lost sight of by S-1 (2000), so generally, to access T (4100), its installation location must be physically accessed. However, this prevents quick failure recovery. It is better to recover T (4100) via a second maintenance path (such as a telephone line shown in FIG. 14 from S-1 (2000) to T (4100)) by providing a serial console at T (4100) or LAN connected to T (4100).

Embodiment 2

In this example, the environment is the same as example 1 and SNMP is used as the previously agreed communication method; instead of sysName, sysLocation can be used with fewer restrictions on the string compared to sysName. Generally, when sysLocation is used, the replaced string of B is used for the value of "reply that should be made". However, B itself can also be used. In this case, B itself is simply set for sysLocation.

See Table 02 for the setting items.

Since embodiments 1 and 2 both use SNMP for the agreed communication method, the SNMP usage cautions are given below.

When SNMP is in a communication state, it can 'know' almost everything about the state of T (4100) in the system. Also, the SNMP setting can be changed.

The present invention does not aim to use the powerful SNMP management function; instead it aims to verify whether or not a host assigned a dynamic IP address that tends to be lost sight of and cannot be located correctly, is actually the correct other intended communication end. Here, if an attempt is made to connect to subsequent conventional management, there is a high possibility that the subsequent management method will be SNMP. In this case, since SNMP should be previously available to T (4100), SNMP is used to determine that the result of reachability confirmation is true or false, assuming that this environment is used as is. (The cases when no subsequent management is required and when reachability is confirmed using a method other than SNMP are described later.)

The following points should be noted regarding security when using SNMP for the agreed communication method (sign). The present invention uses PUBLIC as the default experimental group name, but since anybody (including unwanted intruders) can access this environment, a default name of PUBLIC (or PRIVATE) must not be used in a production environment. Also, when the IP address of S-1 (2000) is known to T (4100), access must be controlled by refusing access requests from IP addresses other than S-1 (2000).

Embodiment 3

In embodiments 1 and 2, T (4100) performs dial-up directly. In embodiment 3, separately provided network connection equipment performs dial-up; T (4100) does not perform dial-up directly.

When dial-up is performed by network connection equipment (NATBOX hereafter) that can obtain IP addresses using a dial-up router (ISDN router, etc.) or PPPoE, PPPoA, DHCP (broadband router, etc.), and provides global services to multiple PCs on LAN using dynamic network address translation (NAT hereafter; including NAPT) such as IP masquerading, and T (4100) is connected only to the customer's LAN (see connection configurations 4 to 6 in FIG. 37), as in embodiments 1 and 2, S-1 (2000) can perform true/false determination by setting static NAT or port forwarding for network connection equipment even when T (4100) does not perform dial-up directly (even when it is not connected to the Internet directly).

The conditions for embodiment 3 are the same as for embodiments 1 and 2 (in that an SNMP agent is implemented and set in T (4100)), except that the dial-up function is network connection equipment, not T (4100), and static NAT or port forwarding is set for network connection equipment.

Embodiment 4

When, as in embodiment 3, a computer does not perform dial-up directly and network connection equipment performs dial-up, if SNMP is implemented in network connection equipment such as a dial-up router, SNMP can be used as T (4100).

According to the conventional UNIX concept, all devices to which IP address can be assigned are called hosts. The present invention uses this same concept and a device is called a host whether it is a router or NATBOX, as long as it is assigned an IP address (as long as it is a communication node). In embodiment 4, the router performing dial-up is a host, T (4100). T (4100) implements SNMP, so it is network connection equipment such as a dial-up router (connection configuration 2 in FIG. 37). Moreover, when this router has dynamic NAT functions, such as IP masquerading, the router can enable PCs on a LAN to update DNS even when it has no function for performing dynamic update to DNS (connection configuration 3 in FIG. 37).

In this case, when a name registered in D (1000) is the same as the host name updated dynamically and is set in the dial-up router, S-1 (2000) can determine whether T (4100) is true or false (as with embodiment 1). However, the configuration becomes smarter if a more flexible, arbitrary string is agreed as a reply that should be made by T (4100), using sysLocation (as with embodiment 2).

Embodiment 5

Embodiment 5 uses DOMAIN (DNS) for the previously agreed communication method.

It is assumed that T (4100) is a computer with BIND implemented and version information set (explicitly changed). Here, it is assumed that DOMAIN (DNS) is used as the previously agreed communication method and version information is used for a reply mutually agreed.

It is assumed that T (4100) is connected directly via dial-up or has static NAT or port forwarding set via network connection equipment.

S-1 (2000) is executing a monitoring program via a timer.

Other conditions and settings are the same as embodiment 1.

In the preparatory stages, it is assumed that the following is agreed and set.

The reply that should be made to the communication using the previously agreed method that is set at T (4100) is version information changed to an arbitrary string returned by BIND operating at T (4100).

T (4100) can provide DNS service for a local LAN environment even when it does not provide a global name service intended for the Internet.

FIG. 32 shows how to set version information for BIND at T (4100).

As the standard operation, BIND usually returns the version of the program itself as shown in FIG. 35 if version information is not set explicitly. If the program version information is known to a network attacker, the attacking method is also known, so version information is changed deliberately to try to foil any attacker. However, since version information can be set arbitrarily, the replaced string of B, for example, is set here as a reply that should be made.

See FIG. 23 again S202 and S204 are address verification processes. This is the same as embodiment 1.

At S206, communication using the previously agreed method is performed to the IP address of T (4100) obtained at S204.

At 208, when a reply is returned, it is stored temporarily; when no reply is returned, the completion code at S206 is stored temporarily.

FIG. 33 shows an example output where BIND version information is obtained using dig. The underlined part is the reply that ought to be made to the communication using the agreed method that is set at S-1 (2000) and that should be a reply from T (4100) (underlined part in FIG. 32).

Any string can be used here, but it conforms to the type of reply that should be made.

FIG. 34 shows the case when is no host currently assigned the IP address previously assigned to T (4100), and the case where there is a host T' (4200) currently assigned the IP address previously assigned to T (4100) and BIND does not operate at T' (4200).

Only an error that is output to the error output is enclosed with a rectangle; other errors are errors that are output to the standard output.

FIG. 35 shows the case when there is a host T' (4200) currently assigned the IP address previously assigned to T (4100) and BIND operates at T' (4200). In this case, no dig command output error occurs, so whether or not an error occurs should be determined at S212.

At S210, string processing is performed to extract version information of BIND operating at T (4100) in response to the reply to the communication.

At S212, comparison is made between this reply and the reply that ought to be made that is stored at S-1 (2000) for determination.

When a match occurs between the reply that should be made and that is carried from T (4100) using countersign and the reply that ought to be made and that is stored at S-1 (2000), T (4100) is a host with correct reachability at S214. At S214, as with embodiment 1, it is best that a message is written to the log file or processing proceeds to the subsequent ordinary monitoring.

When no match occurs (that is at S216), it is also best that the same processing be performed( as in embodiment 1.

Embodiment 6

Embodiment 6 uses SMTP for the previously agreed communication method.

It is assumed that T (4100) is a computer with an SMTP server implemented. It is also assumed that SMTP is used for the previously agreed communication method, and that the host name (FQDN) of T (4100) is used for the mutually agreed reply.

It is assumed that T (4100) performs directly transient connection or has static NAT or port forwarding set via network connection equipment.

S-1 (2000) is executing a monitoring program via a timer.

Other conditions and settings are the same as embodiment 1.

The reply that should be made to the communication using the previously agreed method set at T (4100) is the host name itself set at T (4100).

When a connection is made to the SMTP server, a message like that shown in FIG. 36 is often output. (The example is for SENDMAIL, the most popular SMTP server. However, in the case of QMAIL too (the second most popular SMTP server), the host name is or can be included in the message).

In this message, the host name is displayed in the FQDN format (underlined part in FIG. 36), so the host name can be used as an identifier determining whether or not T (4100) can be reached, or in other words as the reply that should be made.

Embodiment 7

Embodiment 7 uses HTTP for the previously agreed communication method.

It is assumed that T (4100) is a computer with an implemented web server. Here, HTTP is used for the previously agreed communication method. In other words, since the waiting service at T (4100) is a web server, any character string can be used as the mutually agreed reply.

It is assumed that T (4100) is directly connected via dial-up or has static NAT or port forwarding set via network connection equipment.

S-1 (2000) is executing a monitoring program via a timer.

Other conditions and settings are the same as embodiments 1 and 2.

The reply that should be made to the communication using the previously agreed method that is set at T (4100) is an arbitrary string embedded in the character string returned by the HTTP server operating at T (4100).

Since a web server is well known to people other than computer engineers, it is probably one of the services most provided at a server that provides TCP/IP service at T (4100) or at a customer network. Since HTTP can transfer any string, a character string can be used as the reply to the agreed communication. At many web servers, the index.html file is opened (transferred from web server to client) when no file name is specified. Only the string that should be the reply need be entered in the file. For example, the string at the third word in the text on the top page of the index.html file is agreed. However, in this case, the character string at the third word in the text may be changed accidentally at updating, so it is best to agree another file name, and a particular string in the file is agreed as the reply. Also, a character string can be embedded in an HTML <META> statement, or <TITLE> can be used as an agreed reply. In short, when HTTP is used, the border between the agreed communication method and intended reply becomes ambiguous. For example, when the URL contains a particular directory name and file name, this should probably be considered to be a communication method. Then, should the third word in the text in the HTML statement that is transferred here be considered a reply? The third word should also be agreed as the communication method, but note that more specific agreement is needed because there is no restriction due to protocol as shown in embodiments 1, 2 and 5.

Also, when HTTPS is used as the agreed communication method and an SSL server certificate is incorporated in T (4100), the serial number or fingerprint of the SSL server certificate can be used, or the organization name, company name, or server name can simply be used.

In embodiments 1 and 2, access other than from S-1 (2000) to verify T (4100) is restricted. However, unlike embodiments 1 and 2, using HTTP as the communication method is effective when more people want to verify T (4100) as a public server.

Incidentally, HTTP usually listens on TCP port 80, but it is often intentionally made to listen on another TCP port. Even in such a case, if the changed TCP port is agreed between S-1 (2000) and T (4100), the port can be used to confirm whether or not T (4100) is a host with correct reachability.

Also, when web access for changing the setting of a NAT-BOX itself is accepted at port 88 (for example), and a reverse proxy is operating at port 80 (no static NAT or port forwarding set and complex type of embodiment 3), communication agreed in advance in embodiment 7 can be implemented at the transfer destination web server with reverse proxy.

Embodiments 1 to 7 above have explained how to return a reply that should be made. In the embodiments, explanation is given using the existing Daemon to facilitate the understanding by the user. These are examples of diverting something old. As explained in the section entitled "Host that performs the process (5)", T (4100) should be implemented in these examples.

Embodiment 8

Connection configuration on the T (4100) side in embodiments 1 to 7 is explained.

In embodiment 8, regardless of whether T (4100) connects via dial-up router or NATBOX or whether T (4100) performs dial-up directly, as long as some information can be stored at a storage device at T (4100) as the reply that should be made, and the stored information can be read from the storage device in response to the communication using an arbitrary previously agreed method, and a reply including at least the said information can be returned, the reply can be used to confirm whether or not T (4100) is a host with correct reachability. In this example, a web server listens on a TCP port that is not usually used as already explained in embodiment 7. Or, a welcome message that is displayed when a client connects to the FTP server can also be used as the previously agreed communication method. Moreover, an unusual communication method (not well known) such as a unique protocol can also be used as the previously agreed communication method, if it is agreed between S-1 (2000) and T (4100).

T (4100) Can be Divided as Follows Functionally:
a: Host performing dial-up
b: Host performing dynamic update to D (1000)
c: Host having function of T (4100)

These functions can be broken up between different hosts (a function for each host) or can be united in a single host. This is affected by the network connection configuration.

FIG. 37 summarizes the connection configuration of the customer network for T (4100).

The line like a lightening flash above the modem means telecommunication lines, and the oval above the line means the network cloud. The small rectangle on the top is S-1 (2000).

Modem usually means a modem, but here it includes cable and ADSL modems (or TAs). (It also includes digital service units and optical network units if they exist.) It refers to devices forming a physical boundary on the communication path but that offer no routing function. In FIG. 37, the modem is drawn as an independent device, but actually a modem may be incorporated in network connection equipment or a computer. If functions similar to a modem are incorporated in network connection equipment or a computer, they shall be handled as network connection equipment or a computer. Consequently, in the present invention, although a modem is functionally needed for performing communication but does not form a TCP/IP-wise network boundary, a modem alone is not considered.

The object immediately below the modem in FIG. 37, always has the function of transient connection; it is network connection equipment and a computer.

"Network connection equipment" means a device that provides the routing function or protocol conversion function and that configures the TCP/IP-wise network boundary. In FIG. 37, network connection equipment is expressed as "router, etc."

"Computer" refers to a device that enables a user to run a program; in this respect, computer is distinguished from network connection equipment even if computer has the same function as network connection equipment. User terminals are also included in the definition of computer.

The form the T (4100) device is mainly explained in each connection configuration.

A typical example of embodiment 1 is connection configuration 1. In this case, a computer performs transient connection directly. The same is also true of embodiment 2. In this configuration, "b" (host that updates D (1000)) and "c" (host with function of T (4100)) are the same as "a" (host that performs dial-up). In this case, "a" (host that performs transient connection, or a computer) configures the network boundary. So, if NAT is implemented or VPN tunneling is performed, meaning that if the function of network connection equipment is provided or an application gateway is configured, it is also possible to provide network connection to the computer inside the broken lines.

In embodiment 4, the computer connected via network connection equipment is "c" (host with function of T (4100)). A typical example is connection configuration 2. Moreover, connection configuration 2 where network connection equipment cannot update D (1000) and "b" (host that updates D (1000)) is a computer, is an example of connection configuration 3.

Embodiments 3 and 5 to 7 show divided functions such as "a" (host that performs transient connection), "b" (host that updates D (1000)), and "c" (host with function of T (4100)), and these functions are distributed between a computer and network connection equipment. A typical example is shown in connection configuration 6.

For example, connection configuration 4 can be used when network connection equipment can update D (1000) and a host is not qualified to be T (4100) (function "b" is provided, but function "c" is not). In connection configurations 4 to 6, "a" (host that performs transient connection) is a router, but a computer can be substituted for the router; this is an application of connection configuration 1. Except for embodiments 3 and 4 that explicitly show network connection equipment performing transient connection, generally a computer can be used either as "c" (host with function of T (4100)) or as "b" (host that updates D (1000)) by adding software, so connection configuration 1 can be used for any embodiment. In other words, except for embodiments 3 and 4 (explicitly showing network connection equipment performing transient connection), a computer can be router "a." In this case, "a" (host that performs transient connection) shall have static NAT or port forwarding set for at least "c" (host with function of T (4100)). In FIG. 37, "a" (host performing transient connection) is present just "under" the modem, but it can be both a computer and also network connection equipment. This shows that the customer network LAN can be a multi-stage LAN.

Embodiments 5 to 7 can be used for all connection configurations. However, when applying embodiments 5 to 7 to connection configuration 2 or 3, they must be configured so that network connection equipment can return a countersign carrying the reply that should be made in response to the sign.

Assuming that "a" (host that performs transient connection), "b" (host that updates D (1000) dynamically), and "c" (host with function of T (4100)) are installed on the same LAN (or at same place), the LAN is present on the network side when viewed from the wide area network (WAN). When the WAN is the Internet (more precisely, when NAT is needed), communication via the WAN cannot distinguish "a", "b", and "c". Consequently, the LAN is a set of computers and network connection equipment appearing like a single communication node to the outside. (The same is true when there is LAN and only a single terminal performs terminal type dial-up to the ISP.) In the present invention, the LAN is called a customer network or an end site. An end site is considered to refer especially to the edge viewed from the WAN, but actually refers to the same thing as a customer network; it just focuses attention on a different point than the customer network. The end site is the part enclosed in dashed lines containing the modem, etc. Connection configurations 1 to 6 are a breakdown of customer network, and are common in that S-1 (2000) cannot distinguish "a", "b", and "c" regardless of whether the customer network belongs to any of connection configurations 1 to 6. Consequently, S-1 (2000) need not consider the configuration of the customer network nor where T (4100) is situated on the customer network (LAN).

The customer network assumes use of private IP addresses. As a result, direct routing is never performed from the Internet to the customer network. Host "a" (that performs transient connection) configures the contact between the Internet and the customer network. Routing stops at "a" (host that performs transient connection), so it cannot reach "b" or "c" directly from the Internet.

The foregoing described the case where the WAN is the Internet. However, the WAN may also be a TCP/IP network not connected to the Internet provided by a type I or type II carrier, or it may be a private TCP/IP network not connected to the Internet. In this case, NAT is not a prerequisite, and routing may enable access to T (4100) from D (1000) or S-1 (2000) on another network to reach T (4100) directly.

In embodiments 1 to 7, the WAN is expressed as the Internet for the sake of explanation. However, the present invention can be implemented both on the global Internet and on TCP/IP networks.

Table 03 shows the relationship between the customer network and the external network.

TABLE 03

| | | | | | In network boundary | |
| --- | --- | --- | --- | --- | --- | --- |
| | | | WAN | DNS (D) | Reachability via routing | Number of connected networks | I/F of management target equipment |
| | Internet | (1) | Present | Public | Up to WAN side | 1 (only WAN) | No choice |
| | | (2) | | | Up to WAN side | 2 or greater (LAN and WAN) | I/F on WAN side |
| WAN not connected to Internet | Service provided by telecommunications carrier | (3) (4) | Present | Private | Up to WAN side Up to WAN side | 1 (only WAN) 2 or greater (LAN and WAN) | No choice I/F on WAN side |
| | Private network | (5) (6) | | | Present Present | 1 (only WAN) 2 or greater (LAN and WAN) | No choice I/F on WAN side |
| | Only LAN | (7) (8) | Present | Private | Not needed Present | 1 (single-stage LAN) 2 or greater (multi-stage LAN) | No choice Upstream I/F |

(1) is the case when there is no LAN and only a single terminal is present to perform terminal type dial-up to the ISP. In this case, there is no LAN, but since the terminal is connected to the Internet, it is considered to be connected to a network (in other words, it is considered to be not standalone). Since there is no LAN, there is an argument that there is no customer network, but this case can be regarded as a customer network performing only loop-back and is WAN-connected.

(3) and (5) shall be similar to (1).

(2) is a case of representative Internet connection. The explanation so far has assumed that this pattern is used. The effect of differences between this pattern and other patterns is explained below.

(4) is the case where a TCP/IP WAN not connected to the Internet is provided by a type 1 or type 2 carrier. PC communication and FLET'S (registered trademark) Office fall under this category. There is no problem handing this case in the same way as (2). The fact that D (1000) is private does not affect the present invention; it only places a restriction on the naming rules for domain name used for conventional private networks.

(6) is the case of private network. Generally, a private network is configured and routed using a leased line (services such as ATM Mega Link or IP-VPN) for use within an organization. In the case of (4), if there is no IP-VPN, usually, routing is not provided to the customer network (to inside the customer network; it reaches to the end of the network). However, it is logical to include the case where routing is provided to the customer network by services provided by type 1 or type 2 telecommunications carriers in (6). In this case, an external network can access a host on the customer network directly via routing, going beyond the network border. In other words, even when T (4100) is not present just under the modem, "a" (host that performs transient connection) is assigned an IP address dynamically by a DHCP server (including DHCP relay service) on the customer network, not by an upstream network. Since the host is T (4100), this case is equivalent to the connection configurations 1 to 3 shown in FIG. 37. Incidentally, in some companies and universities operating private networks from long time ago, global addressing is used as the IP address system. Such private networks can be considered constituent elements of the Internet itself.

TABLE 03-continued

| | | | In network boundary | |
| | DNS | Reachability via | Number of connected | I/F of management |
| WAN | (D) | routing | networks | target equipment |

(8) is the case where the network consists of only a multi-stage LAN. An example is one business establishment divided into several parts, each of which is on one floor and each interconnected via the business backbone. This case closely resembles the case of a private network, except either there is no WAN, or the network is not connected to the Internet, or the network is not connected to a WAN not connected to the Internet, or even if the network is connected to the Internet, the connection can be ignored (in other words, there is a high wall when connecting to the Internet from an organization with a strong security policy). Here, the fact that the LAN is multi-stage does not mean just a multi-tier LAN using hubs; it means the network is divided into multiple logical segments and routing is performed to them. When the LAN that S-1 (2000) is connected to is different from the LAN that T (4100) is connected to, the latter LAN is considered to be a customer network, and can be considered to be the same as (4) or (6).
The foregoing assumes that both the physical and logical segments are divided. However, an exceptional case is a single physical segment with 2 or more logical segments. For example, a gateway device can be configured to assign and relay two or more IP addresses belonging to different networks to a single interface. This case is the same as a single LAN (single-stage LAN).
(7) is the case of a single LAN. The present invention can be implemented here, but when there is only a single-stage LAN—meaning no external network—each host can communicate directly and locally without requiring TCP/IP-wise relay, so there is no need to reference D (1000) even when a host is assigned a dynamic IP address; it would be more realistic to confirm reachability via a protocol other than TCP/IP.
As a matter of course, the present invention does not consider the case that T (4100) is standalone because there is no other communication end.
(2), (4), or (6) coexists with (8).
Thus, the present invention can be implemented for all patterns of (1) to (8). (But it is another matter whether or not the present invention is meaningful for pattern (7).)

FIG. 38 shows possible problems for mainly multi-stage LANs. It also shows a customer LAN analysis. The case of a private network and of a service that is not connected to the Internet provided by a telecommunications carrier are considered to be the same. In both cases, the customer network is considered to be the part where T (4100) is connected directly. Network 1 and network 2 are divided into LAN and WAN cases, respectively.

FIG. 38 shows patterns 1 to 3. Pattern 2 and pattern 3 are similar patterns to (4) and (6) shown in Table 03, and have no problem. Possible problems are with pattern 1 where network 1 is a LAN. As with a single LAN shown in (7) of Table 03, T (4100) and S-1 (2000) are on the same LAN, so it is feasible to confirm reachability using a protocol other than TCP/IP. However, even in this case, if it is assumed that T (4100) is on another network and S-1 (2000) also manages the said T (4100), implementing the present invention is significant because the present invention must be implemented when managing T (4100) on another network, and it is better to unify the management method in order for S-1 (2000) to perform centralized management. The case when devices in (8) of Table 03 are placed as shown in pattern 2 is equivalent to (2), (4), or (6) of Table 03 because S-1 (2000) and D (1000) belong to an external network when viewed from T (4100).

Protocols other than TCP/IP are assumed to be not subject to routing.

Since P (4000) is considered to be a network including T (4100), here, we explain the feature of the case when the function is complex from the viewpoint of P (4000). In FIG. 38, network 1 including T (4100) corresponds to P (4000). Even when P (4000) is DHCP, the latter explanation assumes that network 1 is a network including a DHCP server. Also, network 2 is simply a network that is not network 1.

Feature of Case with Complex Function

Case when S-1 (2000) and P (4000) integrated

This case is pattern 1 in FIG. 38. S-1 (2000) can confirm the reachability of T (4100) belonging to the P (4000) network, according to condition 1 described later without using the present invention. However, since T (4100) and D (1000) belong to different networks, S-1 (2000) cannot verify the correctness of the relationship between the actual and mapped images. In other words, reachability confirmation provided by the present invention is needed to provide host discrimination of T (4100) that D (1000) obtains.

Case when S-1 (2000) and D (1000) integrated

This case is pattern 2 in FIG. 38.

No address verification is needed. This case produces another effect explained in the third filter example in the practical application described later.

Case when D (1000) and P (4000) integrated

This case is pattern 3 in FIG. 38.

A network including T (4100) (P (4000)), which is the subject that assigns IP addresses, and D (1000), belong to the same organization.

As explained earlier, generally there is no problem with this case.

However, it is a boundary case when P (4000) updates D (1000), based on condition 1.

Condition 1

P (4100) is at a special position.

P (4000) here is a subject that assigns an IP address to T (4100). So, P (4000) naturally keeps track of the IP address of T (4100) and P (4000) can also naturally determine whether T (4100) is connected or not.

The above is condition 1.

In addition, reverse name resolution can be set at P-D (4500). This case contradicts the earlier statement that "DNS can perform both forward and reverse name resolutions, but dynamic DNS can perform only forward name resolution" in the section entitled "Unidirectionality in association of static identifier and dynamically assigned network address". As long as P (4000) and D (1000) are integrated, P-D (4500) is the same as D (1000), and in this case, since no management authority problem occurs, P (4000) can update P-D (4500), which is D (1000) in this case. However, when P-D (4500) and D (1000) are the same, it means only that P-D (4500) notifies the static identifier announced by T (4100). (In other words, P-D (4500) has the function of D.)

Thus, P (4000) can determine the change of the state of T (4100) and also can reflect the change to D (1000). So, at dynamic DNS, the host name itself has trackability and discrimination.

Here, referenceability from an external network via a static identifier is called host discrimination. For a host initially having host discrimination in the network, no reachability confirmation is needed to determine whether the host is true or false.

So, this is a boundary case.

However, very complex settings are needed to make P (4000) and D (1000) cooperate fully with each other. Consequently, it is best to use the present invention to confirm reachability.

Moreover, when D (1000) is DNS, access from external networks is affected by cache.

So far, we have explained each pattern, but it is complicated and difficult to understand. This is due to the difficulty in explaining exhaustively how networks are connected. Consequently, subsequent explanation uses rough classification based on where routing stops, irrespective of whether the network is a LAN or WAN.

When S-1 (2000) can reach T (4100) directly via routing, naturally it can identify individual T (4100) hosts. In this case, T (4100) must have the dial-up function (function of being assigned dynamic addresses), function of updating D (1000), and function of being T (4100). This case is relatively simple.

When routing stops at a host that performs dial-up, port forwarding must be set at the host so that access from S-1 (2000) on the external network can reach T (4100), or the host must be set as T (4100). This case is more complicated than the case where S-1 (2000) can reach T (4100) via routing; a specific example of this case has already been explained in detail as a embodiment. In this case, the dial-up function (function of being assigned IP addresses dynamically), function of updating D (1000), and function of being T (4100) (function of returning countersign or of allowing reachability to be confirmed) can be provided by three independent hosts or a single consolidated host. However, this case is characteristic because T (4100) is verified from outside as a representative of the customer network.

Embodiment 9

When there is network connection equipment, such as a router, and a web interface that performs setting changes, the service listens on port 80 a well-known port (same as or similar to the well-known port defined by RFC1700 ASSIGNED NUMBERS). At equipment such as a firewall, port 88 for example (a port other than 80) may listen for web access that performs a setting change. Recent network products intended for end-user sites provide a separate interface for the WAN and LAN sides, and in many cases, ports on the WAN side are subjected to access control.

Here, at network connection equipment (even if it is not a firewall), port 88 (a port other than 80) listens for web access that performs a setting change, and the port is subject to access control. In this case, port 80 listens for ordinary web access, and is not subject to access control. Another approach is where previously agreed communication shown in embodiment 8 can be implemented at the transfer destination server via a reverse proxy operating on port 80. The configuration is as follows: the host name is registered at the device (in many low-cost products intended for end-user sites, the host name cannot be set) and the host name is stored in a storage device such as nonvolatile memory. When a communication request is received at port 80, the stored FQDN (character string including host name) is read from the storage device and returned. (The host name is FQDN that is set at D (1000) notifying the mapped image.)

When S-1 (2000) attempts to communicate with T (4100), a combination of embodiments can be used. For example, HTTP is used as the agreed communication method (shown in embodiment 7) for network connection equipment (shown in embodiment 4), and FQDN is used as the agreed reply (shown in embodiment 1, but HTTP not SNMP sysName). As explained earlier, both any position in the connection configurations shown in FIG. 37 is allowed, and also the computer position shown in connection configuration 6 is also allowed on the customer network. When the device configured here is network connection equipment, there may be another network beneath it. Also, the device configured here need not necessarily be "a" (host that performs transient connection) shown in FIG. 37.

If the equipment here is "a" (host that performs transient connection) shown in FIG. 37, and the network requires NAT for reachability confirmation, when port 80 is used for sign-and-countersign stated above, port forwarding is requires to provide web service, so a port other than well-known ports must be announced. This reduces convenience when trying to provide web service over the customer network. Consequently, it is better for a similar port to be listed for the sign to provide web service. In other words, three types of ports can also be configured to wait for HTTP access: a port for equipment setting, a port for network management that uses sign-and-countersign, and a well-known port for providing web service provided for general browsing. (However, port forwarding can be set instead of the response by equipment described here.)

The above explanation describes embodiment 9, which is simplified by fixing the communication method to HTTP and using FQDN for the reply. Normally, network connection equipment is inferior to a computer in terms of extensibility. "Inferiority" does not mean merely implementing additional programs in order to add functions; it means that a firmware update is needed, which is not easy for some users. Consequently, in embodiment 9, it is also possible for network connection equipment to be implemented in advance, using a router or NATBOX with limited storage device capacity.

Not only can T (4100) be network connection equipment, it may also be a computer, and since it can be compact, it can also be a dedicated device just for returning the countersign. A dedicated device only needs a function for making S-1 (2000) confirm reachability and only needs a single interface. For example, if T (4100) is "c" in connection configuration 6 in FIG. 37 (although FIG. 37 shows that "c" is a computer, it is assumed that "c" is the said dedicated device), and a network outside the host that performs transient connection cannot reach T (4100) via Internet routing, the external network can reach T (4100) if static NAT or port forwarding is set for the host. In this case, if the system is just assigned an IP address on the LAN, it is referenced in an integrated manner by the external network, so when the dedicated device confirms reachability, S-1 (2000) can verify that the customer network and its border node have correct reachability. In other words, if equipment with a single interface is implemented in embodiment 9, reachability can be confirmed by just setting port forwarding for the host that performs dial-up. Such a device is simple and can be manufactured at a low cost, and could be provided either as a standalone unit or built-in board or kit. If such a device is implemented in software, setting can be curtailed even when it is used at a computer. In this case, it is best that such a device be removable storage media implemented in a storage media reader as explained earlier for storage devices.

Embodiment 10

This proposes and an effective method when T (4100) is a mobile terminal, for example.

Here, mobile terminal means, a cell-phone or PC. Here PC means a computer terminal used by a general user.

In such a case, the function of T (4100) can be implemented as an application program.

Application program here includes not only independent application programs but also conventional programs (for example, embedded browser software).

When using embedded browser software, it is best to use it to control the setting of the reply that should be made and to separately return the reply via waiting resident software called by the browser software.

In this case, if a web server is already implemented as shown in embodiment 7, it is OK to use it, but it is also OK to provide separately waiting resident software so that another port will listen for the sign.

Also, such resident software can be implemented so as to be stopped.

In fact, using resident software has another intention—it can be used as a user interface when S-2 (5300) shown in the practical application confirms reachability. In other words, browser software also displays the result of reachability confirmation performed by the separately called reachability confirmation program.

In short, browser software can be used as a user interface providing the function of both T (4100) and S, irrespective of whether the browser software is an external or internal program.

(Practical Application)

Reachability confirmation can be considered as displaying the result (S214 or S216 in FIG. 23) and then ending, irrespective of whether or not there are subsequent actions. Practical application is a use-wise classification showing the usefulness of the result of reachability confirmation.

The use-wise classification is based on the following viewpoints. From the operation- model viewpoint, the categories are peer-to-peer model and client-server model. From the viewpoint of what is S, which is the subject that confirms reachability, the following categories are S-1 (2000), S-2 (5300), and D (1000). They are expressed as the subject of S.

From the viewpoint of what is the other communication end displaying the result, the categories are: T (4100), S-1 (2000), S-2 (5300), and D (1000). They are expressed as the object. (Of course, the object of reachability confirmation is always T (4100). The object here means the person who benefits using the displayed result.)

From the viewpoint of the usefulness of the result of reachability confirmation, the categories are: failure detection, display, filter, and deletion of mapped image of pair of A and B (third filter example). They are expressed as the use.

The table below summarizes representative examples of the above descriptions.

TABLE 04

| Subject | Object | Category | Use |
| --- | --- | --- | --- |
| S-1 | T | Failure detection | Detection and notification of failure at T |
| S-1 | S-1 | Filter | Traffic monitoring for T |
| S-1 | S-2 | Display | Substitute for ping |
| S-2 | S-2 | Display | Substitute for ping |
| S-2 | S-2 | Filter | Preparatory processing to connect to subsequent communication program |
| D | D | Special example (Filter) | Deletion of mapped image of pair of A and B |

Failure detection performed for T (4100) and display performed for S-2 (5300) are similar concepts. They both use reachability confirmation as a substitute for ping.

Failure detection performed for T (4100) is a more limited concept, and as explained earlier in embodiment 1, it detects a failure at T (4100) and urges T (4100) to take action over the failure. T (4100) here is not T (4100) as a communication node; it is the human owner or administrator of T (4100).

Display performed for S-2 (5300) is a simpler and broader concept, and merely displays whether or not the originator reaches T (4100) correctly.

Filter does not merely perform display; it also utilizes the result of reachability confirmation for the subsequent action.

Failure detection and filter are similar in that the subsequent action is assumed to exist.

Failure detection assumes that the subsequent action is recovery processing performed by a person. Meanwhile, filter assumes that the subsequent action is a program and that the result of reachability confirmation is incorporated in a series of processing.

Now, should T (4100) be considered as having a failure or not when an inability to reach it is detected? For example, in patent document 2, when health check detects an inability to reach the equivalent of T (4100), the inability is detected as abnormal. Failure detection as defined by the present invention has a similar concept. However, other cases (such as filter or display) do not assume that T (4100) with intermittent connection and disconnection is normal only when it is connected and has correct reachability. In other words, they assume that T (4100) is also normal when it cannot be reached. In short, whether or not T (4100) is considered to have failed depends on the characteristics of T (4100). When T (4100) must always be accessible by other hosts, the state when it cannot be accessed is failure; when T (4100) is intermittently connected and disconnected so it need not necessarily be accessible, the state in which it cannot be accessed is not a failure.

In Failure Detection Case:

E-mail and pocket paging can be used to notify a failure to the owner of management target equipment. SYSLOG and SNMPtrap can be used to notify failure to administrators. These notifications are targeted at people, but they are actually assigned to a subsequent program, so it is also OK to include them in filter described later. Failure detection is detailed in embodiment 1.

In Display Case:

Display is used as a substitute for ping (that is, to determine whether or not reachability to the host is correct).

Public display means displaying to S-2 (5300) whether the result of confirming of reachability to T (4100) is true or false. The operation model where display is performed at S-1 (2000) is a client-server model. The operation model where display is performed at S-2 (5300)—a terminal used by the general user—is a peer-to-peer model.

S-2 (5300) in a client-server model is allowed to be an unspecified majority. S-2 (5300) in this case is just a communication node on a network, and need not have S's functionality (of confirming reachability) implemented. Consequently, in this case, display is public, not for S-2 (5300) itself.

In addition, S-1 (2000)—the subject that verifies reachability—need not be the same as the S-1 (2000) performing failure detection for T (4100). For example, even when the subject is S-2 (5300), it can be considered to be S-1 (2000) if it displays the result of reachability confirmation for another S-2 (5300). However, when S-2 (5300) is a subject, generally, it just confirms reachability for itself.

The explanation of S-2 (5300) is summarized below.

There are two types of S-2 (5300). One is a general user with the function of S. The other is a general user without the function of S. In this case, S-2 (5300) performs a client-server type operation, and is used with S-1 (2000) as a set.

Display as a method of using the result of reachability confirmation is nearest to conventional ping. However, ping is simpler and has more extensive application. Here, reachability confirmation has an advantage over ping in that it can determine reachability to the host assigned a dynamic address that ping does not know.

FIG. 39 shows the image when S-2 (5300) uses the present invention to confirm reachability to T (4100). Image (a) is for when ping is used; image (b) is for when reachability confirmation is used.

As shown in (a), for conventional ping, S-2 (5300) directly specifies the host name or IP address of the other communication end that it wishes to confirm.

On the other hand, for the present invention, when the user of S-2 (5300) wishes to confirm reachability to T (4100), it asks S-1 (2000) to confirm the reachability, specifying the host name of T (4100). This is (1) in (b) of FIG. 39.

Then, in place of S-2 (5300), S-1 (2000) confirms reachability to T (4100). This is (2) (=sign) and (3) (=reply that should be made is returned).

Then, the result is notified to S-2 (5300). This is (4) in (b) of FIG. 39.

A command can be used as an example, but a web page is used here because it can be easily used by a user of S-2 (5300) who has no knowledge of computers and communications.

Visualize a screen consisting of messages and buttons generated by CGI.

The first screen corresponds to (1) of (b) of FIG. 39, and is an example screen where S-2 (5300) enters a web page and on which T (4100) is specified whose reachability S-2 (5300) wishes to confirm.

A message like "What is the host whose reachability you wish to confirm" or "Enter the host name for which reachability is to be confirmed" is displayed, and the host name entry field is displayed under the message. A web page with buttons such as "Execute" and "Confirm" can be generated. When DNS is not used as in patent document 2, the system can enter a condition prior to generating the web page or as an option for the screen. The condition is, for example, address information corresponding to D in patent document 2.

The second screen is displaying the result ((4) in (b) of FIG. 39) when T (4100) has correct reachability. A message like "Online" or "Present" can be displayed in the instant messenger style, or like "Reachable" in the ping style.

The third screen is displaying the result ((4) in (b) of FIG. 39) for when T (4100) is not reachable. As with the second screen, a message like "Offline" or "Absent" or "Not reachable" can be displayed as a message content. It is kind to place a "Return" button on the second and third screens.

In this case, reachability confirmation that S-1 (2000) performs to T (4100) can be performed based on the internal timer of S-1 (2000) or when S-1 (2000) receives a reachability confirmation request from S-2 (5300).

Incidentally, since S-2 (5300) does not have the function of S in the client-server model, immediately after the address of T (4100) changes, S-2 (5300) may not be able to reach T (4100) due to the cache effect even when the screen displays "Reachable". This happens because when S-2 (5300) does not have the function of S, the cache is not disabled, and caching naturally causes misidentification. At this time, S-1 (2000) can determine the time when reachability is confirmed, and the D (1000) cache TTL for T(4100). By comparing the address of T (4100) to history information, S-1 (2000) can also determine that the address has changed. Consequently, S-1 (2000) can also display the latest time when access can be performed by S-2 (5300), which is derived from the time when reachability is confirmed. Or, S-1 (2000) can show the cache TTL and request S-2 (5300) to access T (4100) again.

In Case of Filter:

Filter is performed by S-1 (2000); filter is preparatory processing to connect the result to conventional management. The result of reachability confirmation is assigned as the input to conventional management.

Example: Assignment to traffic measurement of T (4100)
Method: The result is connected to ordinary SNMP management by letting the host with reachability confirmed be assigned.

This is an operation as a so-called filter. The filter concept is that output of the preceding program is used as input to the subsequent program. It is equivalent to the UNIX concept of pipe. An example of filter is a sort program, which rearranges some outputs and connects the result of the rearrangement to the next processing.

The first example filter is given below; here the present invention is used as a sensor. A change of management target is detected and the result (detected change) is connected to conventional management.

The subsequent action is obviously a program, which is ordinary management using, for example, MRTG or OpenView. Filter is effective whenever reachability to the other communication end must be confirmed prior to live communication. Filter is effective when processing is automated by a machine, not when a person, S-2 (5300), directly accesses T (4100) to perform processing.

When T (4100) is confirmed to be a host with correct reachability, the result can be connected to subsequent processing. An example is conventional monitoring processing using MRTG or OpenView (monitoring processing when T (4100) has a permanent assigned IP address and reachability confirmation is not specifically needed). As an example of conventional monitoring (=subsequent processing), ucd-snmp-4.2.1 and mrtg-2.9.17 are used. MRTG is a software tool to graphically display the present network traffic state, and information (for example, CPU load factor) that changes with time. MRTG includes the function of SNMP manager (and is therefore treated here as SNMP manager), but since it is specialized for generating traffic history files (has no user interface), usually it is used separately in combination with SNMP manager. The conventional management method is outside the target of the present invention, so is not explained here. However, the connection problem is explained below. The test result shows that MRTG cannot follow a change of IP address, so it cannot perform ordinary monitoring processing for a host with a changing IP address (even when T (4100) is specified using FQDN). Consequently, the result is connected to ordinary monitoring processing by adding a process that regenerates the MRTG setting file where the IP address of T (4100) at that point is assigned to the name of T (4100) specified by MRTG.

For example, patent document 4 proposes a system for following a changing subordinate monitoring target, but does not explain the method of detecting that the target has changed.

Consequently, the present invention is added as a preceding process (filter) for the invention disclosed in patent document 4, so it can detect that the subordinate monitoring target has changed. Based on the detected change, a list of subordinate monitoring targets is regenerated and then the list is used as the input to patent document 4. In this case, reachability is confirmed individually based on a list stating static identifiers showing subordinate monitoring targets, and a list showing host with correct reachability is regenerated; this list can be used as the input for patent document 4. The processing for regenerating a list is naturally performed by a program.

By so doing, it is possible for the system to follow the changing subordinate monitoring target without manual input.

At this time, in addition to the present IP address, the previous IP address can also be delivered as a parameter between programs. This disclosed invention does not disclose storing of the previous IP address. However, such a minor change in implementation does not affect the essence of the present invention, and can be imagined easily from disclosure of the present invention.

Clearly, a change such as holding the history information showing the change of IP address of T (4100) for the purpose of tracking belongs to the present invention; and a message to that effect need not be explicitly stated.

Incidentally, when S-1 (2000) performs filter, the object that inherits the result of reachability confirmation as processing can be S-1 (2000), or the owner or administrator of T (4100). The owner or administrator of T (4100) is assumed to separately operate a management system with reachability. See the case of failure detection when the owner or administrator of T (4100) is the object. In this case, it is best to include the static identifier and dynamically assigned network address at that point verified to have correct reachability in SNMPTRAP and then notify the owner or administrator of T (4100). Subsequent processing is the same as when S-1 (2000) is the object.

Incidentally, when using the present invention as a filter, subsequent processing is not limited to conventional management. This case is the second example filter, and is more filter-like usage than the first example filter. An example where S-2 (5300), a user terminal, performs filter is given below.

For example, the freeware "IP Messenger" operates on a PC as real-time message send/receive software that requires no server (peer-to-peer) and is implemented by directly specifying the IP address of the other communication end. (IP Messenger is not included in the category of instant messaging (RFC2778, RFC2779) even if its use is similar, because it needs no server.)

By implementing the present invention as preparatory processing in such a program, IP Messenger can become able to specify the other communication end by using a static identifier such as host name, instead of using a dynamically assigned network address such as an IP address.

In addition, the present invention can also be operated as preceding processing for any and all programs, just as the resolver operates as preceding processing for any and all communication application software.

The subject in this case can be both S-2 (5300) and S-1 (2000).

(Note: IP Messenger can now specify a host name as a destination, but the issue disclosed by the present invention does not seem to have been solved.)

The third example filter is given below.

When S and D (1000) are integrated (pattern 2 in FIG. 38), or rather when the function of S is implemented at D (1000), some special processing can be performed. The association of the notified pair of A and B is made to be not notified. This method is used to make the mapping notification system D (1000) to be not notified the mapped image of the pair of A and B to T (4100). For the DNS server, the resource record for T (4100) is deleted (hereafter, deletion of resource record at DNS is included in update, because it is considered a form of update). When the function of S is implemented at D (1000) and this results in S being unable to confirm reachability to T (4100), other hosts should also be unable to reach T (4100). In this case, as explained earlier, S might reach misidentified host T' (4200). At this time, misidentification can be made to not occur by making the mapping notification system D (1000) to be not notified the mapped image of the pair of A and B to T (4100).

This means that D (1000) performs offline processing, which normally should be performed by T (4100). Such a proposal is already made, and is disclosed in patent documents 1 and 2.

In patent document 1, a so-called keep-alive signal is sent from T (4100) to D (1000), and when D (1000) no longer receives the signal, it does not notify the pair of A and B. The idea is that the signal is sent from the terminal like a beacon or heartbeat. A similar example is described patent document 5.

Patent document 2 is a unique system using no DNS, but processing called health check is performed from D (1000) to S. The health check entity encrypts the password used when T (4100) sets the pair of A and B for D (1000) in a challenge-response format as a measure against password interception. When the challenge is sent from D (1000) to T (4100), the response is returned from T (4100) to D (1000). The processing is repeated at some time interval, and when the process ceases, T (4100) is detected as having ceased to be present on the network.

The problem here is how to detect that T (4100) has ceased to be present on the network; the present invention can solve this problem.

The proposal is similar to patent document 2 in terms of communication direction, that is, action is performed from D (1000) to T (4100). So, progressivity of the proposal may be denied, quoting patent document 2. The issue is whether or not the substitute for B is similar to password.

Regarding this point, consider that the fundamental idea of the present invention is entirely different from that of patent document 2.

First, the foundation idea of the present invention is not password. In the case of reachability confirmation implemented by the present invention, due to the network characteristics, only a value obtained automatically is sufficient in the first place. Since impersonation is permitted, the idea of the present invention is not like individual identification typified by password. The reason why the present invention allows substitution for B is described in the section titled Type of reply that should be made. In other words, it increases the flexibility incorporated in the fundamental concept. Therefore, the present invention is naturally different from patent document 2, which is based on a password that cannot be known unless D (1000) and S are integrated.

The following table shows the comparison between the present invention and patent document 2.

TABLE 05

| | Patent document 2 | The present invention |
|---|---|---|
| Name | Health check | Reachability confirmation |
| Basis | Password | Characteristics of network (Value determined automatically by network characteristics when reachability obtained by associating static identifier and dynamically |

TABLE 05-continued

|  | Patent document 2 | The present invention |
|---|---|---|
| Theory | Authentication by knowledge; authentication based on whether or not user knows matter only qualified users know | assigned network address) Comparison of real and mapped images of pair of A and B |
| Encryption | Mandatory Challenge-response format | Not mandatory* Encryption allowed by any method |
| Flexibility | No variation allowed | Value carried by countersign can be substitute for B |
| Structure | Complex | Simple |
| Security problem | Masquerading | Disguise |
| Extent of effect of security problem | Large | Small |
| Criteria for determination of effect extent | Since password based, update also performed when masquerading occurs Plaintext password used at update | Impersonation auto-converged Impersonation separated from update |

As indicated by the * symbol, encryption is not mandatory. As derived from the basis or theory, normally a reply that should be made need not be secret.

Since the reply that should be made is not a password, it is OK for the reply to be known by third parties. Instead, the present invention is characterized by reachability confirmation performed using an announced character string.

The fact that the reply is not a password does not cause any security threat for T (4100) because update and reachability confirmation are completely separated theoretically and functionally, as explained in section entitled Effect of independent reachability confirmation.

Therefore, even after B itself is replaced with a substitute for B or is transformed by the present invention, the present invention possesses more progressivity than patent document 2.

Consequently, unlike patent document 2 that uses a password as the basis of its idea and the challenge-response format as measures against password interception, the present invention makes a password unnecessary to simplify the system using a higher-level theory (=reachability confirmation) based on the network characteristics and to detect the fact that T (4100) is no longer present on the network.

Independent reachability confirmation offers another effect. There is a problem that the equivalent of T sending the keep-alive signal shown in patent document 1, or the equivalent of T responding to the health check shown in patent document 2, must be a terminal dedicated to the equivalent of D (not an ordinary dynamic update terminal). However, T (4100) in the present invention need not be a dedicated terminal because it is independent. This idea is in line with network autonomy, so it is superior to patent document 1 or 2, which is restricted by the fixed relationship between the equivalent of D and the equivalent of T.

Incidentally, a resource record can also be deleted at S-1 (2000) and S-2 (5300). Since S can detect that reachability to T (4100) has been lost, this can be used as a trigger to perform (deletion) update to D (1000). In this case, S-1 (2000) and S-2 (5300) must know the password when T (4100) performs update. This is not recommended because the fewer the number of persons knowing the password, the more the secure the system.

In this case, when the result of reachability confirmation is false, the shell script disclosed in FIG. 40 can be executed. FIG. 40 shows an example where TSIG in BIND is used. In this case, there are two methods: deleting the entry indicating B itself ($TARGETHOST in the above example script; in this case, B itself as the destination), and changing the address for B to an address with no reachability such as 0.0.0.0 or private address. The former method is used in the above case.

When using a package such as GNUDIP, it should be used at a host where it operates. In this case, even when D (1000) and GNUDIP operate at different hosts, they should be assumed to be integrated.

The update method can be implemented individually depending on the program operating on the host that accepts update. The update process should be a method that can cooperate with the dial-up function defined as "a" in FIG. 37. The update processing itself is related art. Reachability confirmation can be used to detect the absence of T (4100) on the network, which triggers the deletion update at D (1000).

When D (1000) confirms reachability implementing the function of S, processes (2) and (3) do not exist as external inter-host communication. However, in this case, D (1000) only need query itself internally. Consequently, it is untrue that the real and mapped images of the pair of A and B that should be compared are insufficient.

Summary 1 for the problem unique to dynamic DNS states: "D (1000) continues announcing the final updated resource record even after T (4100) has ceased to be connected. If T (4100) performs explicit offline processing, D (1000) will not continue announcing information about the missing T (4100). However, when T (4100) is at fault or the line is disconnected, it cannot perform offline processing."

The problems to be solved is described below.

When the following two conditions occur simultaneously, a misidentified host T' (4200) appears.

T (4100) ceases to be present on the network.

At D (1000), association of static identifier and dynamically assigned network address of T (4100) is notified. (To be more accurate, T' (4200) appears when the above two conditions occur simultaneously and another host performs dial-up to T (4100) at the same time. However, dial-up is not considered here.)

To solve the problem, initially T (4100) performs offline processing to D (1000) so that D (1000) does not notify the association of the static identifier and the dynamically assigned network address of T (4100).

Historically, it is known that there is no effect when T (4100) ceases to be present on the network without performing offline processing because of line disconnection of T (4100) or failure at T (4100) itself.

Consequently, we propose a method that enables the mapped image to not be notified without performing offline processing at T (4100). The problem in the method is how the fact that T (4100) has ceased to be present on the network is detected. In patent document 1, the fact that a terminal is alive is notified by sending a keep-alive signal to DNS from the terminal. In patent document 2, using DNS, a health check is performed from the equivalent of DNS to the equivalent of T, to detect a state in which the equivalent of T is not connected.

However, there is still a problem with the method because D (1000) cannot detect that T (4100) has ceased to be present on the network unless T (4100) is a terminal dedicated to D (1000). D (1000) identifies T (4100) based on the idea called individual identification that is only established between D (1000) and T (4100), and so T (4100) must be a terminal dedicated to D (1000).

However, the present invention solves this problem by making it unnecessary for T (4100) to be a terminal dedicated to D (1000).

The problem noted in summary 1 for the problem unique to dynamic DNS is actually an event-wise problem. It is a visible problem and approaches in patent documents 1 and 2 can solve the problem by correcting the notification of D (1000) since it is incorrect. However, the said problem is an event that has a cause, which (according to our insight) is the a disagreement between real and mapped images. Conventionally, there has been no viewpoint for S. The S viewpoint makes it possible for S to confirm reachability to T (4100). In this case, S obtains four elements as the network configuration requirement from T (4100) and D (1000), respectively, and separately without depending on the direct relationship between T and D, and S, verifies the correctness of reachability by verifying the correctness of the correspondence of the elements, that is, by verifying the agreement between the real and mapped images.

This conceptual point where D (1000) performs individual identification for T (4100) is not present in patent documents 1 and 2. And at this point, S is the communication node that can confirm reachability, meaning every communication node. Therefore, the present invention makes it unnecessary for T (4100) to be a terminal dedicated to D (1000).

Of course, reachability confirmation also enables S to detect when T (4100) is no longer on the network, which patent documents 1 and 2 also aim to detect. Consequently, D (1000) can naturally confirm reachability. As long as reachability confirmation has the advantage mentioned earlier, it cannot be denied that it has more progressivity than patent documents 1 and 2. The present invention is characterized by the fact that during communication, the originator and destination can confirm reachability on an end-to-end basis. This is the theoretical foundation of the present invention and the implementation that achieves reachability confirmation. Here, we present a new discovery where host reachability can be confirmed by comparing the real and mapped images on a network where host reachability is obtained by associating the static identifier and dynamically assigned network address.

In this case, by proposing a new carrier signal called countersign, it is possible to obtain an element among the said four elements that has not been obtainable conventionally (B in the real image).

Further Application

Closed connection (closed user group service) is made possible by confirming reachability on the Web server side when connecting T (4100) as the originator to the Web server. The closed connection is effective when wishing to publicize paid information targeting a specific group for example.

An example procedure is given below.

Step 1: The Web server side first registers T (4100) previously as a member of a specific group. A set of the registered T (4100) is called a database.
Step 2: Reachability is confirmed when access is received from T (4100). It is assumed here that T (4100) returns its host name (that is, B itself as the reply that should be made).
Step 3: The Web server side searches for a group matching the said host name obtained from the database.
Step 4: Access permission for the matched group is permitted to originator T (4100).
Step 5: Connection is rejected for access from T (4100) that does not match any group determined to be false by reachability confirmation, or a terminal where the function of T (4100) is not implemented.

Thus, closed connection is enabled.

This example shows that the view of T (4100), which is usually viewed as the destination, is reversed. That is, the reply that should be made is used as notification of the originator number.

In this case, unlike line switching, the incoming side cannot automatically receive an originator number, so reachability confirmation is used to receive the originator number. The countersign is a carrier signal carrying an originator number (that is, the reply that should be made). Note that originator number here is a different concept from the originator address in IP header, for example. The originator address in IP header is "Ab" which is a dynamically assigned network address, not "B," which is a static identifier. Consequently, reachability confirmation is needed to provide a function that substitutes originator number notification defined in line switching.

Just to be sure, although the above description covers a Web server, the processing that can perform closed connection after reachability confirmation is not limited to a Web server. Also, step 2 described a host name, but a substitute for B is also naturally possible.

The function of T and the function of S can also be performed mutually between T and S (see embodiment 10). Thus, a circuit more closed than the said closed connection can be made.

At line switching, the incoming side can selectively allow or reject the incoming from the originator, responding to the originator number notification. Similarly, by applying the present invention, S can also allow or reject the incoming from T (4100), using the reply that should be made from T (4100). As described earlier, note that the view of T (4100) and the view of S are reversed. It is also possible for such an application to become a substitute for access control. We assume that the method can be easily imagined from the explanation so far, because the method is just the reverse of a closed connection.

(Discussion)

Discussion of cache and traffic

In this section, only DNS applies as the mapping notification system.

To avoid misidentification occurring due to the cache effect, the only choice is to disable cache.

The cache mechanism is simply a contrivance to reduce the DNS traffic. Consequently, traffic might increase when cache is disabled.

Of the methods explained earlier to make the trade-off consistent, two methods are explained again. Traffic here only refers to DNS traffic. So, the cache mechanism only aims to reduce DNS traffic. Reduction of DNS traffic is a response to the social demand not to unduly increase the load of DNS. Traffic between T and S depends on the communication frequency between T and S.

Application-wise Solution

The following is written at the end of the communication model sequence:

"For example, the following is possible: at (second and subsequent) reachability confirmations after reachability is confirmed, the address of T (4100)—the destination of sign performed at (4)—is stored; usually steps (2) and (3) are omitted; after S becomes unable to reach T (reachability is no longer confirmed), steps (2) and (3) are executed again."

This is explained further.

S stores the dynamically assigned network address of destination T (4100) with confirmed reachability, and instead of performing name resolution or verifying address shown in embodiment 1, then sends a sign to the locally stored address indicating T (4100). The area where the address is stored locally can be allocated as a new dedicated storage area in the process of address verification at S, or a cache can be deployed on S.

The former method (a new dedicated storage area is allocated) is a solution via an application program. In this case, address verification shown in embodiment 1 can be performed again at the point when T (4100) returns an unknown response as the reply that should be made. At the second S216 shown in embodiment 1, S immediately returns to the address verification process instead of waiting for a certain period of time. In this case, a flag can be used to implement a function indicating whether reachability confirmation succeeded.

This is explained implementation-wise below using FIG. 23 (explanation not illustrated).

First, looking at the case when reachability confirmation succeeds.

The flag is set after S214. If the flag is set previously, it remains set. And, the address of T (4100) is stored and then an end occurs.

When reachability is confirmed next, it is determined before S202 whether or not the flag is set, to perform a branch. If the flag is set, the said stored address is assigned to the address indicating T (4100) (address at S204) and processing starting at S206 is performed. If the flag is not set, processing starting at S202 is performed as usual.

Next, looking at the case when reachability confirmation fails. If the flag is set after S216, it is turned off. If the flag is off previously, it remains off. If the address of T is stored previously, it is also erased and S immediately returns to S202 and performs processing again, instead of waiting for the next reachability confirmation timing to occur. However, in this case when S216 is the second or later client, an infinite loop can be avoided by using a temporary flag.

In this case, the flag is turned on when the result of reachability confirmation is true (S214), but reverse is also allowed. In other words, it is also OK to set the flag when the result of reachability confirmation is false (S216). In this case, naturally branch before S202 is also reversed.

With the latter method (cache deployed on S), name query is performed again after the cache TTL elapses. Of course, even in this case, when T (4100) returns an unknown response as a reply that should be made, S should perform processing again starting with address verification; since address verification is omitted, S should not immediately determine that T (4100) is not reached.

Both methods can reduce the inter-host communication frequency regarding name resolution, and have the effect of not causing misidentification due to caching. However, we recommend using the former method because the name resolution frequency is lower since name resolution is not performed until the time when T (4100) is no longer reached. Also, when S is a device with relatively poor resources, such as a network connection device, such a change as cache loading may be a burden; in this respect, the application-wise solution is best.

The application-wise solution allows S-1 (2000) and S-2 (5300) as S. The solution is similar to the third example filter (where D (1000) is S) shown in the practical application. When D (1000) is S, instead of being omitted, name query completes internally; this is virtually the same when inter-host communication is omitted. Internal name resolution is performed by storing the address of T (4100) reached correctly at S-1 (2000) and S-2 (5300), which cannot perform internal name resolution unlike D (1000).

Thus, address verification is performed while reducing the DNS reference count and traffic.

Client-server Model

For the client-server model, S-2 (5300) can be an unspecified majority without implementation of S's function. The reason for adopting the client-server model is because it makes it possible to provide reachability confirmation services to existing communication nodes where S's function is not implemented. However, another reason for adopting the client-server model is the consolidation effect.

The consolidation effect is explained using figures for easy understanding.

FIG. 41 (*a*) shows the case when the peer-to-peer model is adopted. S-1 (2000) and S-2 (5300) are the same, so S-2 (5300) in the figure can be replaced by S-1 (2000).

FIG. 41 (*b*) shows the case when the client-server model is adopted.

When a peer-to-peer model is used (FIG. 41 (*a*)) and every terminal is S-2 (5300), the need for a client-server model becomes apparent, explaining why the client-server model is proposed, although the end-to-end model (peer-to-peer model) can confirm reachability.

Conventionally, the peer-to-peer model is considered to be for small-scale communications, while client-server model is for large-scale communications.

The client-server model is not a contrivance only to reduce the traffic for name query, but contributes to making the relationship between cache disabling and increased traffic consistent.

Conceptual Discussion

During the process of the invention, the inventor considered the difference between the host and a person on the network in authentication terms.

On the network, a person is present on the other side of the host. In other words, the host and person layers are different. Although obvious, somehow the inventor could not clearly see the boundary separating the host and person.

Authentication by person is performed using password. The host can be authenticated using an X509 certificate or IPsec authentication header. Reachability confirmation for the machine (communication node) on the network is sign-and-countersign. In this sense, person/host authentication and host reachability confirmation are parallel concepts. Reachability confirmation for the machine (communication node) is a looser concept than authentication in that it is not a special authorization (for example, it is not authorization of access rights); it is a process of verifying that the host is the other correct communication end.

The present invention proposes a method in which the other communication end on the network is verified using the network characteristics, not a concept called individual identification such as conventional terminal authentication.

[Future Problems]

Problem 1

The present invention has no time-wise benefit when the following conditions occur simultaneously at S-1 (2000) or S-2 (5300):

Condition 1: T (4100) is not present on the network.

Condition 2: At D (1000), the mapped image of the pair of A and B is notified to T (4100). (In this case, as long as T (4100) is not present, there is an error in A. Moreover, the function of S is implemented at D (1000) and the mapped image indicating T (4100) has not also been deleted.)

Condition 3: T' (4200) is not present on the network. (That is, misidentification also has not occurred.)

When the above conditions occur simultaneously, there is no time-wise benefit of confirming reachability in that it merely waits for a timeout to occur as with ordinary communication from S to T (4100).

Problem 2

The interface should be standardized for each process including processing.

In this disclosure, subsequent processing at each constituent element (especially S) is implemented individually. Subsequent processing is related art. With disclosure of this specification alone, the connection between the present invention and related art must be created individually.

Consequently, reachability confirmation can be modularized by defining the communication in each processing. That is, the inter-program interface must be standardized. When the interface is standardized, further theorization is made possible by defining, for example, the program operating at S as the manager and the program operating at T (4100) as the agent.

By standardizing the interface instead of creating the said connection point individually, "the present invention can also be made to operate as preceding processing for any and all programs, just as when the resolver operates as preceding processing for any and all communication application software."

Problem 3

The communication port used by countersign should be standardized.

(Terminology)

Important terms not be explained in the body are explained below.

Encryption:

Translating an original character string according to a certain rule. The translated string needs to be decoded. The purpose of encryption does not matter here. That is, the purpose of encryption may not always be to prevent secrets leaking. For example, when a communication path itself or a disk itself is encrypted, it may mean that only a small part of encrypted information need be made secret, and most need not be made secret. Or, the encrypted information could contain only information that need not be made secret. In this case, the purpose of encrypting the information that need not be made secret is not to prevent secrets leaking. Whether or not information need be made secret is due to the nature of the information. In the present invention, even when it is assumed that the reply that should be made by T is a translation of B, the encryption (translation) cannot be said to aim to prevent secrets leaking, because in B itself is not information that need be made secret. As mentioned in the text, encryption (translation) is a contrivance incorporated in the fundamental concept to increase flexibility.

Authentication:

Authentication is the process of verifying that the user is a legitimate user (Principal). For example, the process of verifying the right to login to the system, or the process of obtaining the right to access the file system.

Password:

Password is a different concept from encryption. It is not based on any rule, and needs no decoding. It is merely secret string, and is used for performing authentication.

The fact that a password is a different concept from encryption is obvious from the fact that an encrypted password and plaintext password are distinguished from each other. A password belongs to what is called authentication based on knowledge; that is, using the fact that the user knows the password for the user ID, the user is determined to be the legitimate user. In other words, the purpose of a password is to be able to identify the Principal correctly. A password is usually used with an individual identifier to perform individual identification. The concept of authentication and of password are both created based on individual identification.

Incidentally, password here includes a password encrypted in the challenge-response format and a one-time password such as S/KEY.

Also, even for DNS, a password used for performing update includes TSIG (RFC2845) for the sake of convenience because since TSIG shares a private key at T (4100) and D (1000), it is correct to treat TSIG in the same way as knowledge-based authentication.

Host:

A host is any communication node that an address is assigned to, including terminals and routers. Consequently, in the present invention, host includes both computers and gateways.

Gateway:

In some theories, gateway refers to only an application gateway, but in this specification, elements configuring the IP-wise network border, such as router, application gateway, protocol converter, are collectively called gateway.

Customer:

Customer means the owner of T (4100). Customer network is a network managed by the owner of T (4100); it is not a public network.

Resolver:

Resolver is the function of performing name query to DNS. Viewed from DNS, resolver is the entity that performs name query.

Important concepts used frequently in the present invention that are other than technology, are defined.

Substitute:

Substitute means replacing one thing with another.*

Set:

Set means things in a certain range that are considered to be a single whole.*

In the present invention, a certain range is considered to be able to substitute a specific function. Set includes superordinate functions formed by assembling independent functions.

Representative:

Representative means a person chosen from the organization, to negotiate with others to reflects its opinion or will.*

Representative means something that enables an overview of the feature of the whole by just being taken from the whole.*

Typical:

Typical means something in a specific set that is most characteristic or that is outstanding.

So, something stated above does not necessarily reflect the nature of the set accurately.

Integration:

Integration means multiple functions integrated in a single specific device.

Association:

Normally, a static identifier and dynamically assigned network address that are associated by the mapping notification system should be associated on a one-on-one basis. However, association here also includes association on other than one-on-one basis and association of intermediate identifier.

*: Quoted from Shin-Meikai Japanese Dictionary.

Other terms are interpreted according to general technological common knowledge or according to the technological common knowledge of those skilled in the art.

BRIEF DESCRIPTION OF THE DRAWINGS

FIG. 20 is a diagram showing convergence 2 (measurement result 1) of cache TTL.

FIG. 21 is a diagram showing convergence 3 (continuation of measurement result 2) of cache TTL.

FIG. 25 is a diagram showing example of normal output of DIG command.

FIG. 26 is a diagram showing example of DIG command error output (when no DNS server).

FIG. 27 is a diagram showing example of DIG command error output (when no T).

FIG. 28 is a diagram showing example of SNMP normal output (when T has correct reachability).

FIG. 29 is a diagram showing example of SNMP error output (when host incorrect).

FIG. 30 is a diagram showing example of SNMP error output (when community name incorrect).

FIG. 31 is a diagram showing example of SNMP error output (when object ID specified incorrectly).

FIG. 32 is a diagram showing change in setting file to set BIND version information.

FIG. 33 is a diagram showing example of normal output of DIG command.

FIG. 34 is a diagram showing example of DIG command error output (when no T).

FIG. 35 is a diagram showing example of DIG command error output (when another name server referenced). The figure also shows an example of standard output (normal) with version information not set.

FIG. 36 is a diagram showing example message at the beginning for when a connection is made to the SMTP server (SENDMAIL).

FIG. 38 is a diagram showing positional relationship between each host and networks.

FIG. 39 is a diagram showing difference between operation of invention used as so-called ping substitute and operation of conventional ping.

FIG. 40 is a diagram showing DNS update script sample.

FIG. 41 is a diagram showing consolidation effect in client-server model.

EXPLANATION OF SIGNS

Figure 1:
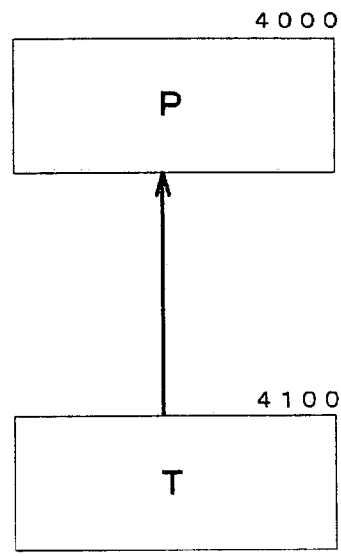
FIG. 1 is a diagram showing dial-up at T or on customer network.
Figure 2:
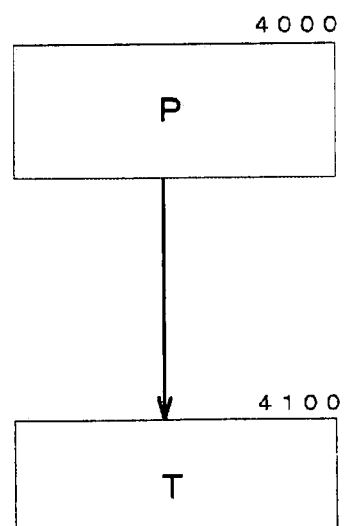
FIG. 2 is a diagram showing address assignment at T or on customer network.
Figure 3:
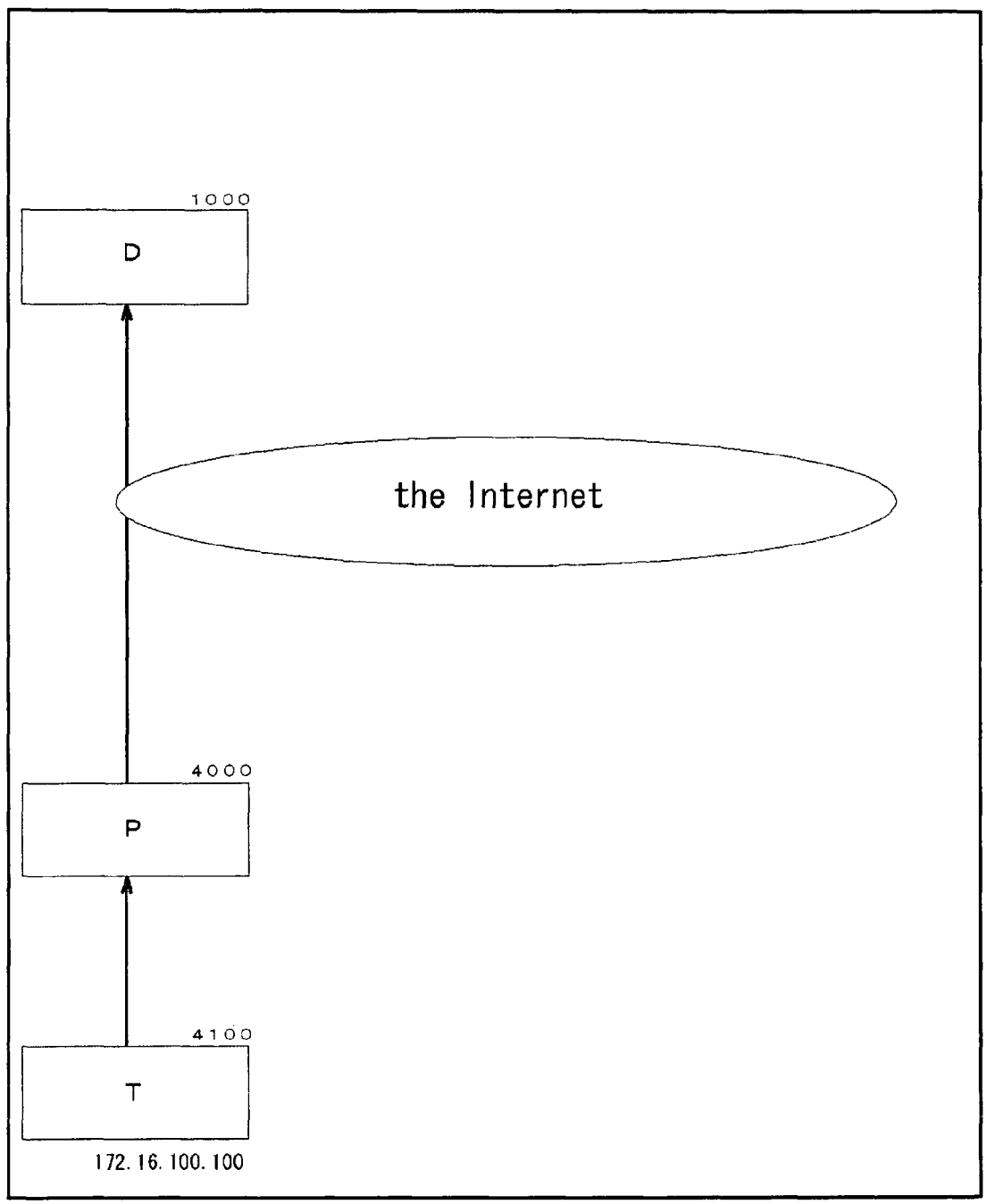
FIG. 3 is a diagram showing DNS update at T or on customer network.
Figure 4:
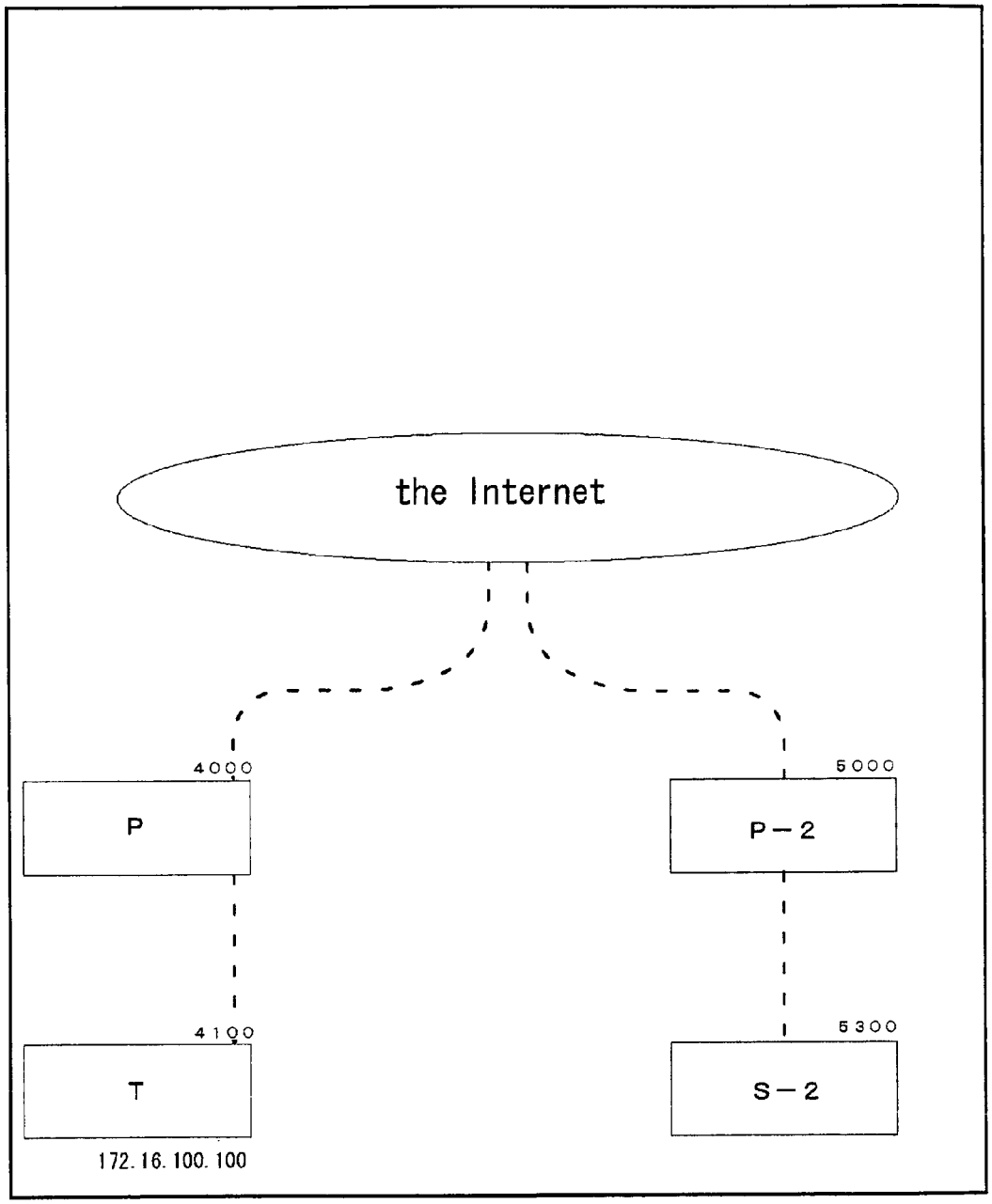
FIG. 4 is a diagram showing normal state at T or on customer network.
Figure 5:
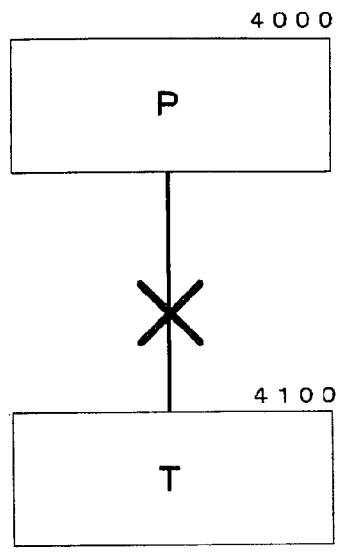
FIG. 5 is a diagram showing line disconnection at T or on customer network.
Figure 6:
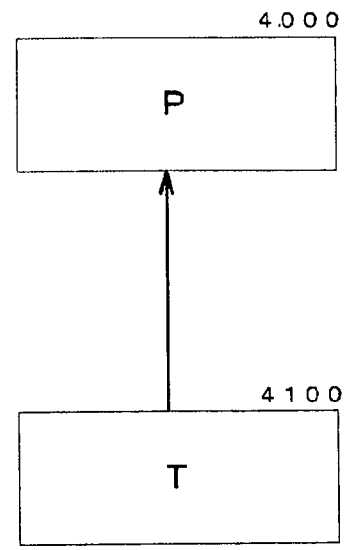
FIG. 6 is a diagram showing reconnection at T or on customer network.
Figure 7:
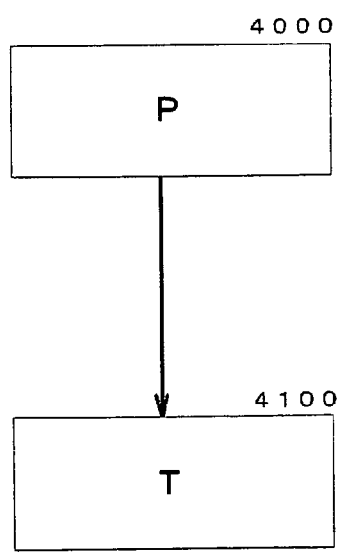
FIG. 7 is a diagram showing address reassignment at T or on customer network.
Figure 8:
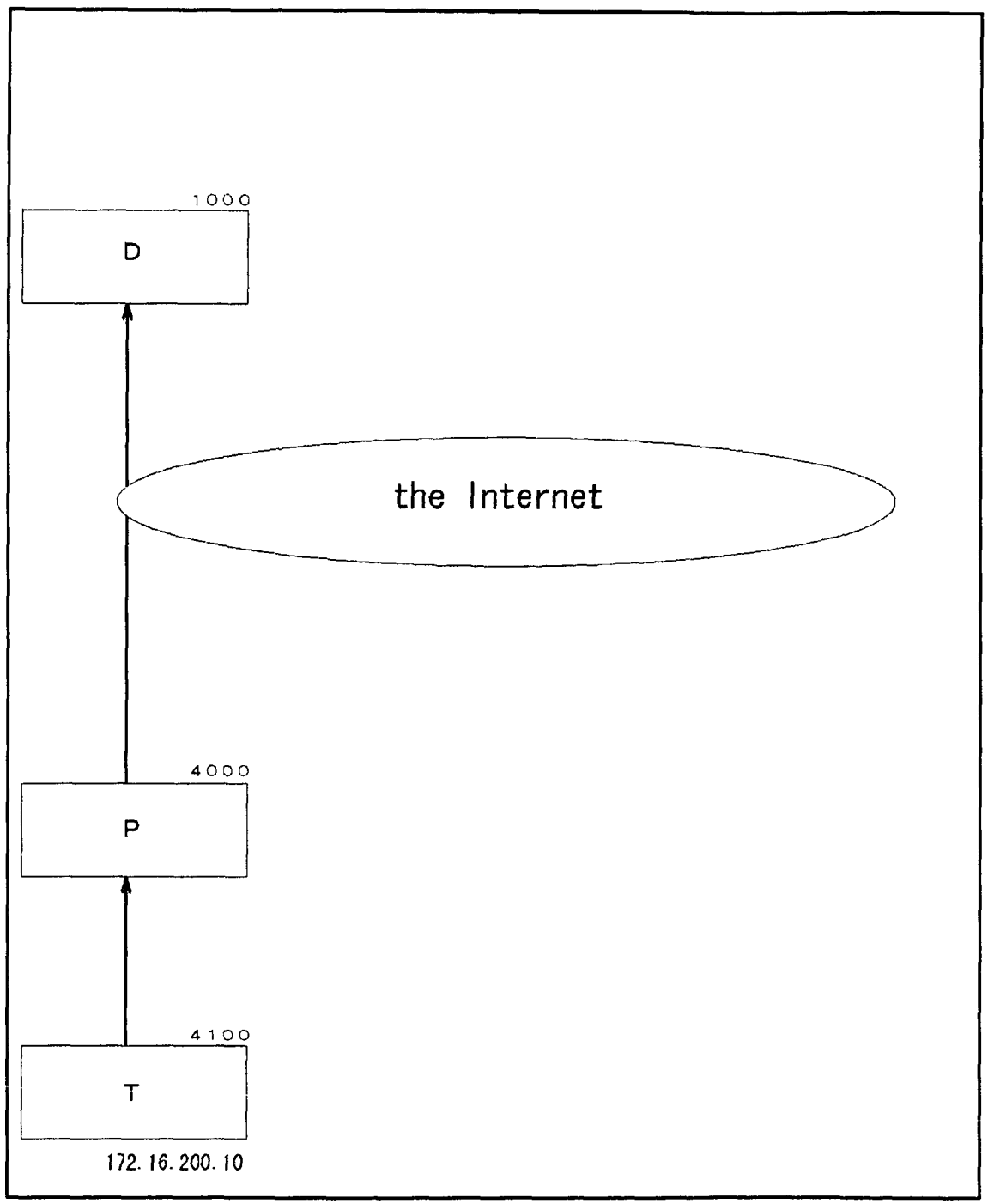
FIG. 8 is a diagram showing DNS re-update at T or on customer network.
Figure 9:
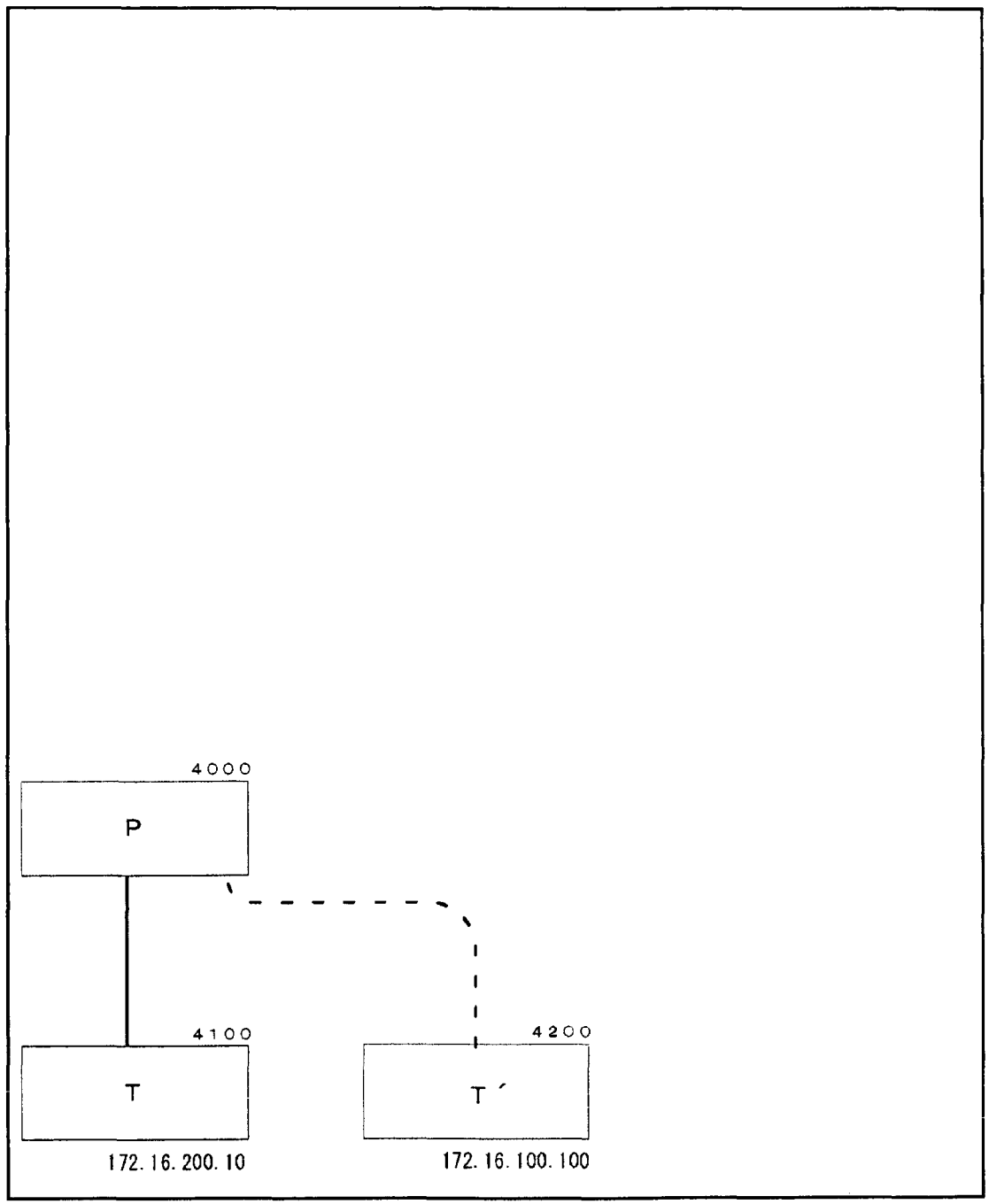
FIG. 9 is a diagram showing state in which host seems to be switched at T or on customer network.
Figure 10:
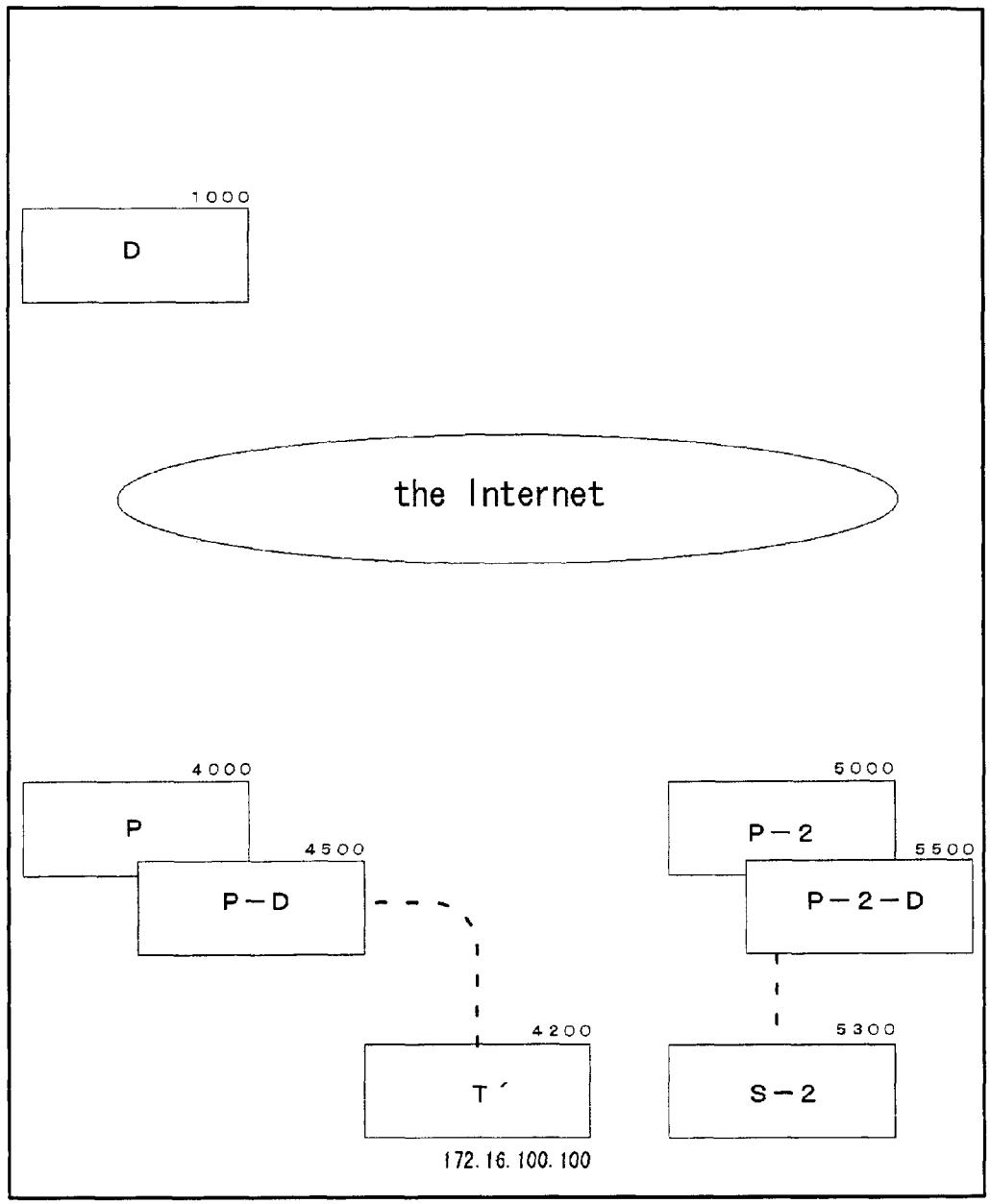
FIG. 10 is a diagram showing DNS to be referenced on each network.
Figure 11:
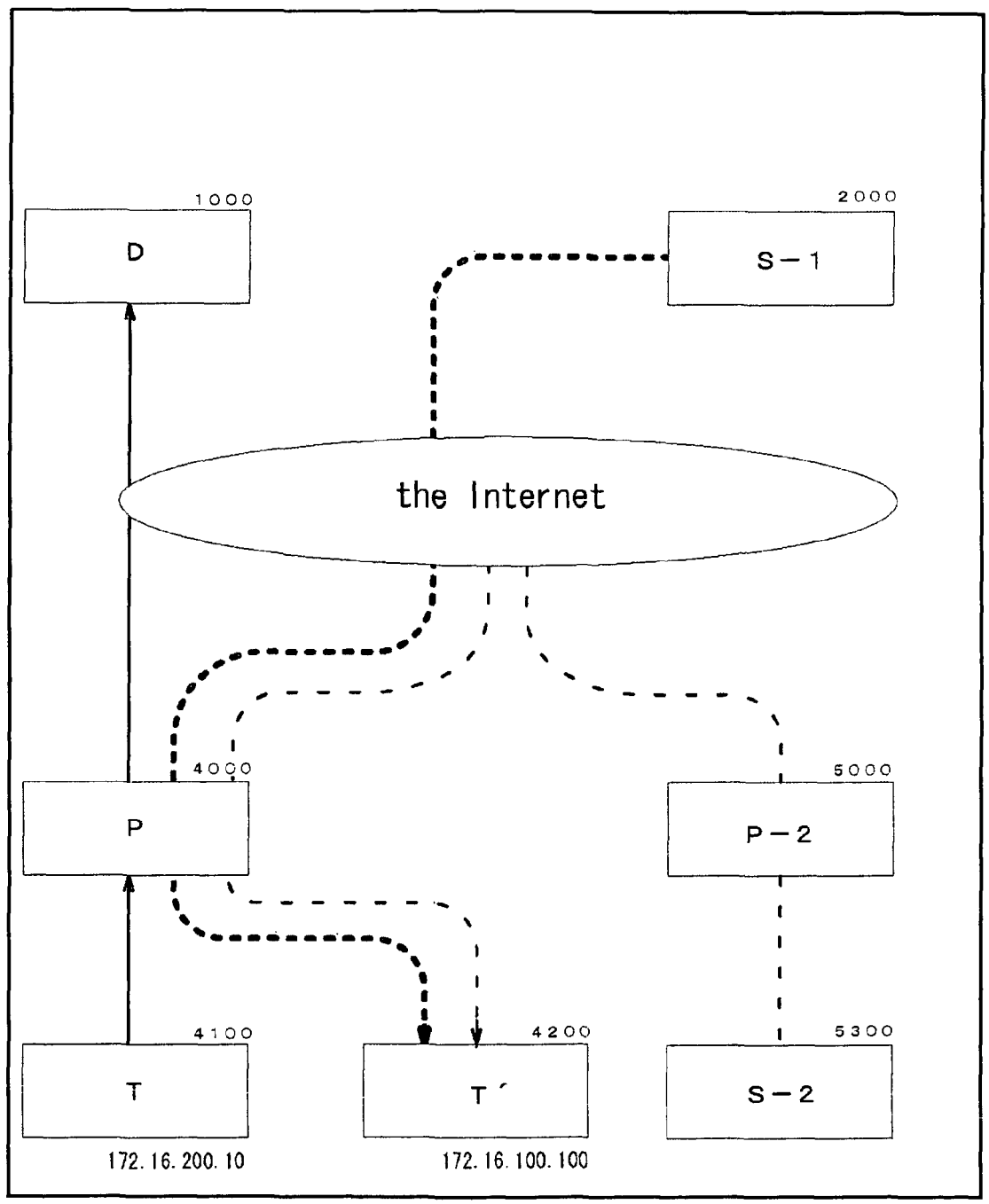
FIG. 11 is a diagram showing misidentification at T or on customer network.
Figure 12:
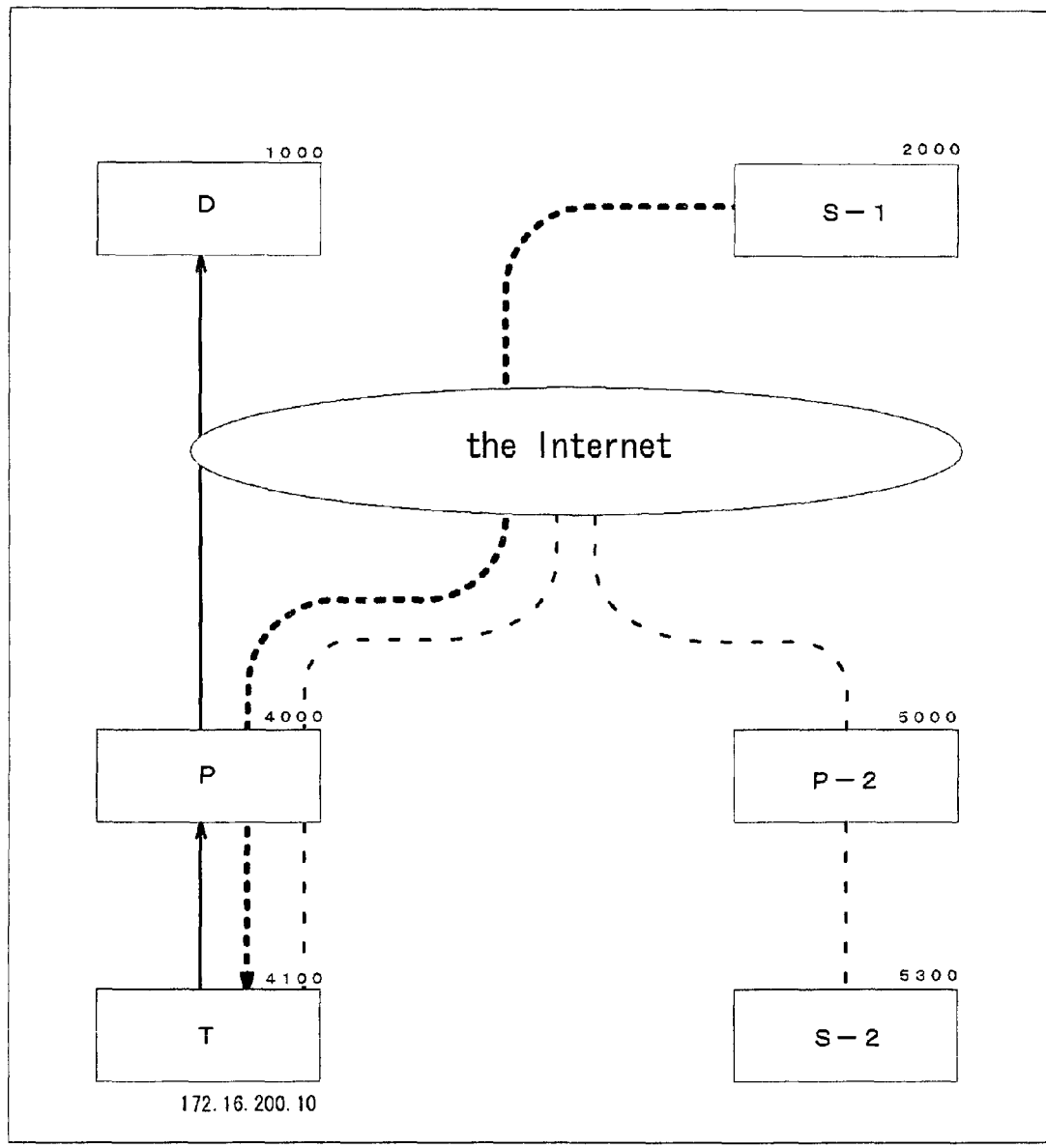
FIG. 12 is a diagram showing normal state (conversion) at T or on customer network.
Figure 13:
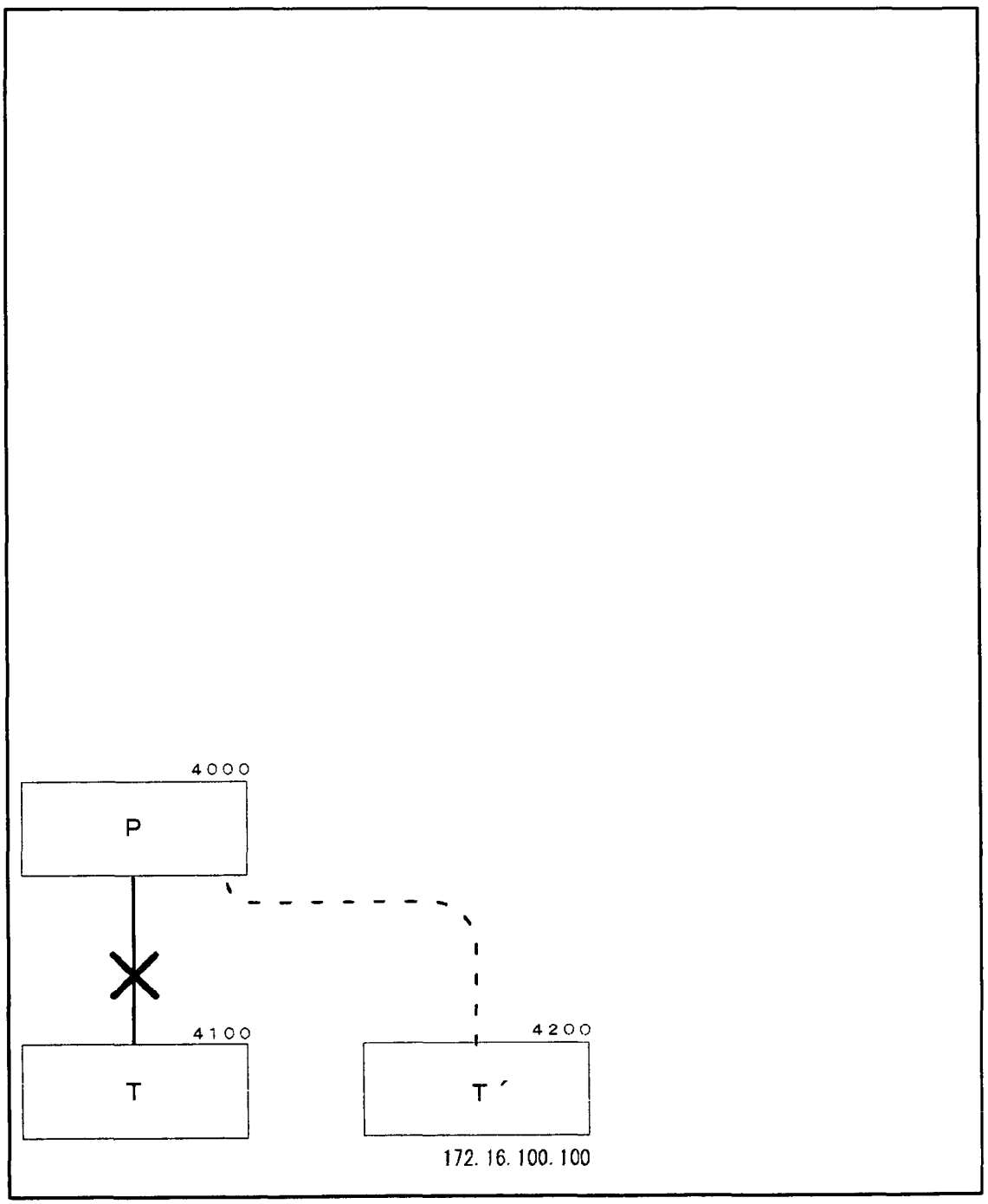
FIG. 13 is a diagram showing state in which line remains disconnected (another pattern in FIG. 6 and later) at T or on customer network.
Figure 14:
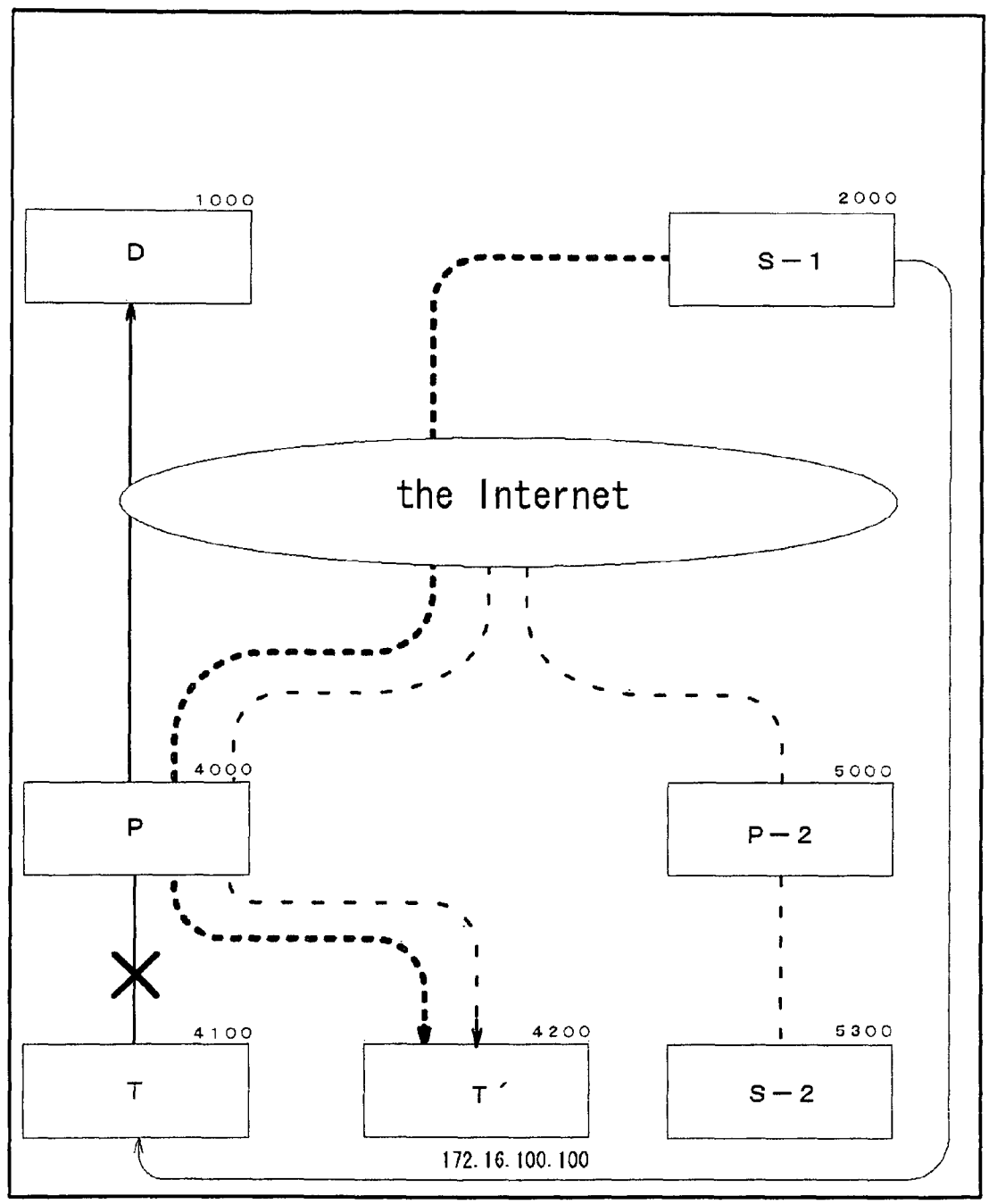
FIG. 14 is a diagram showing misidentification occurring when line remains disconnected or maintenance using second maintenance path, at T or on customer network.
Figure 15:
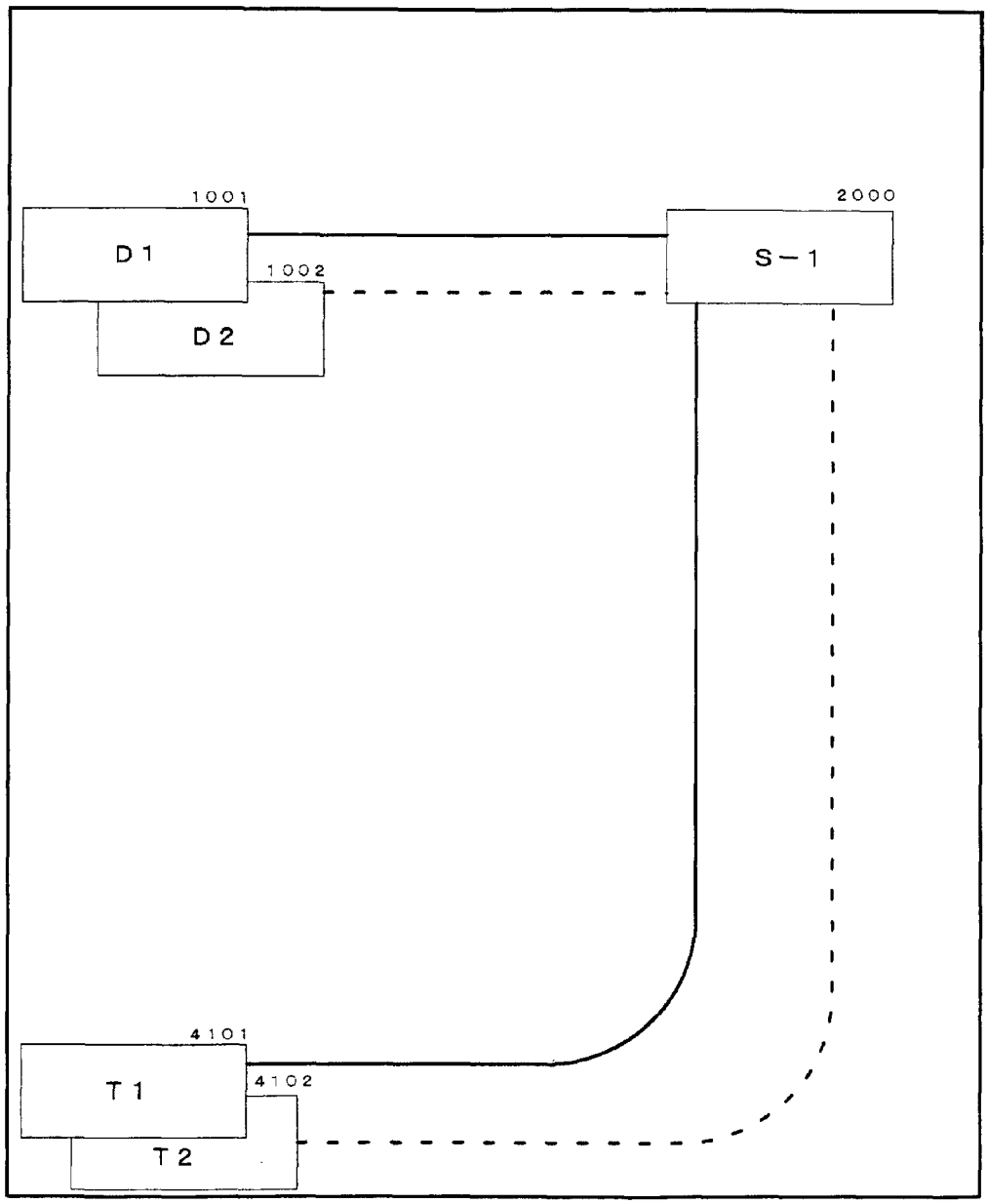
FIG. 15 is a diagram showing correspondence between T and D.
Figure 16:
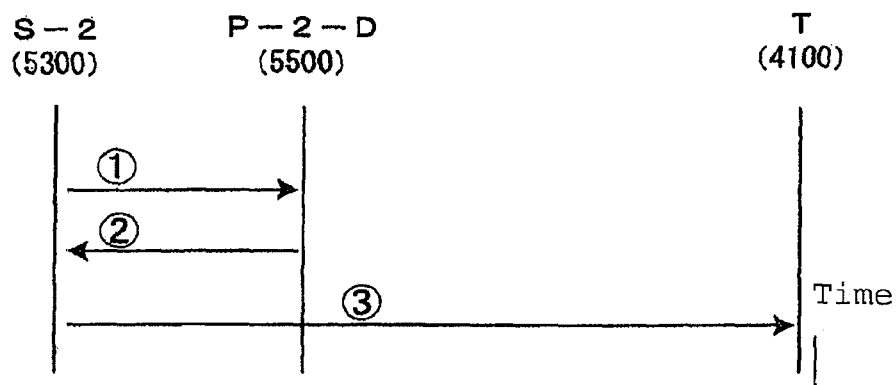
FIG. 16 is a diagram showing DNS search sequence at time of normal name query regarding T (when cache valid).
Figure 17:
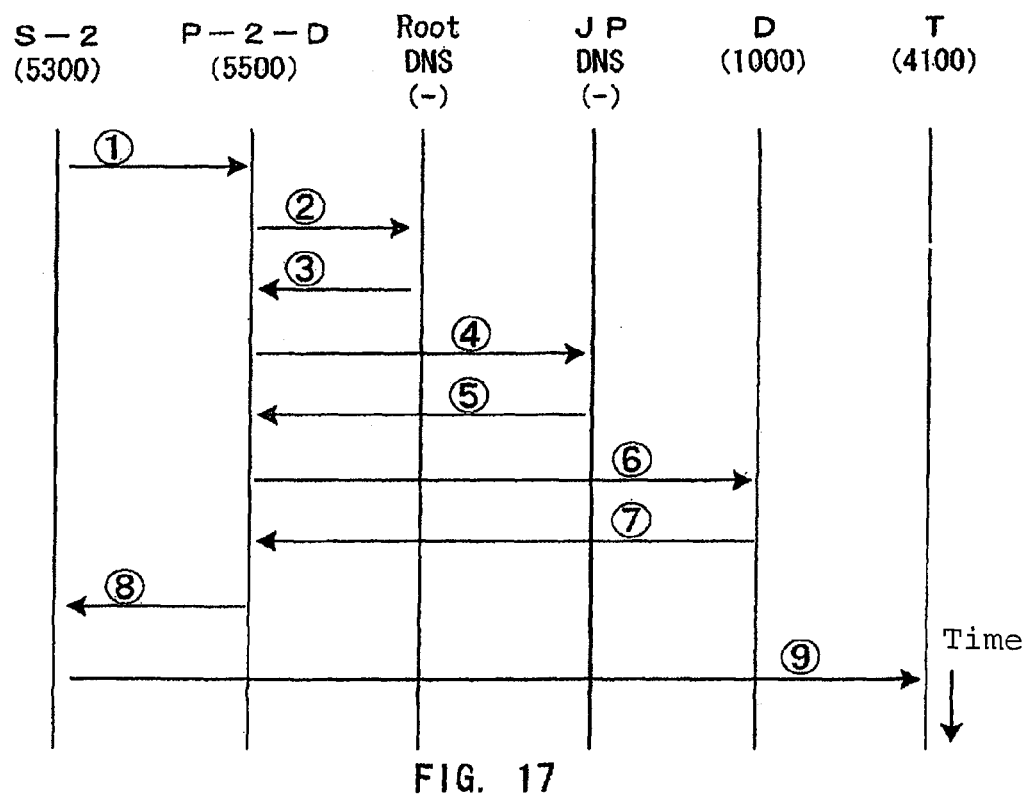
FIG. 17 is a diagram showing DNS search sequence at time of normal name query regarding T (when cache invalid).
Figures 18, 19:
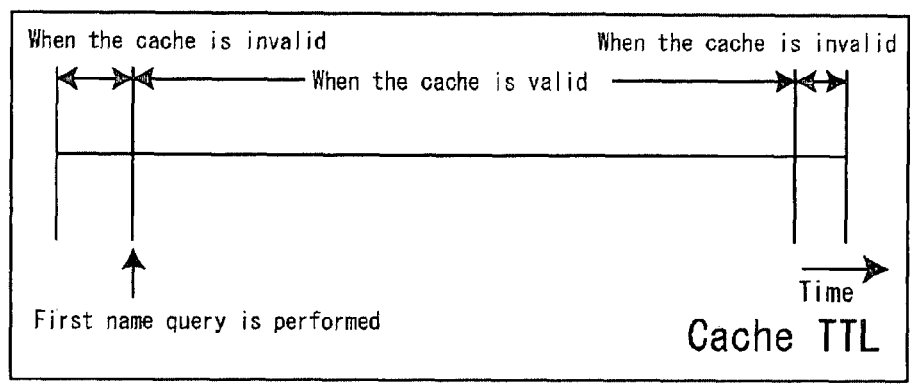
FIG. 18 is a diagram showing cache TTL.
FIG. 19 is a diagram showing convergence 1 (measurement program) of cache TTL.
Figure 22:
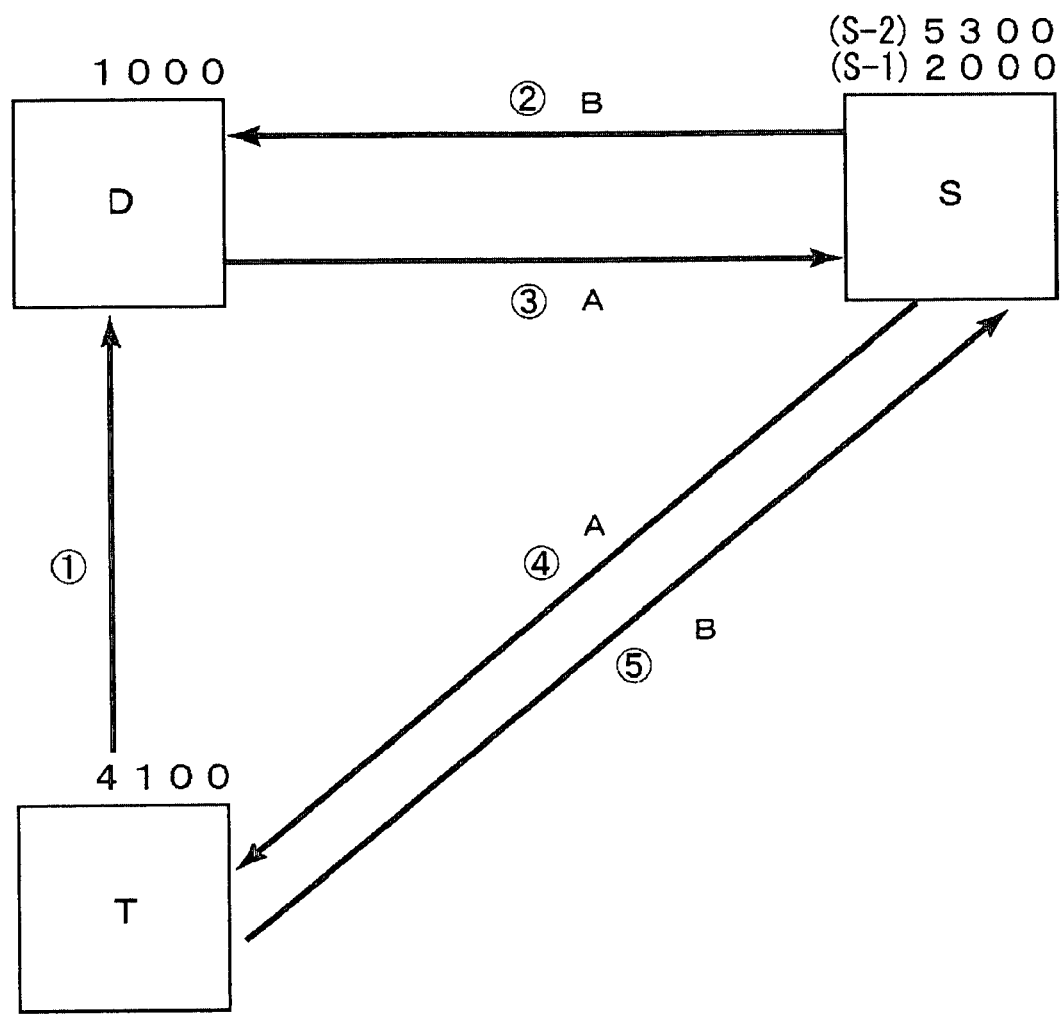
FIG. 22 is a diagram showing communication model.
Figure 23:
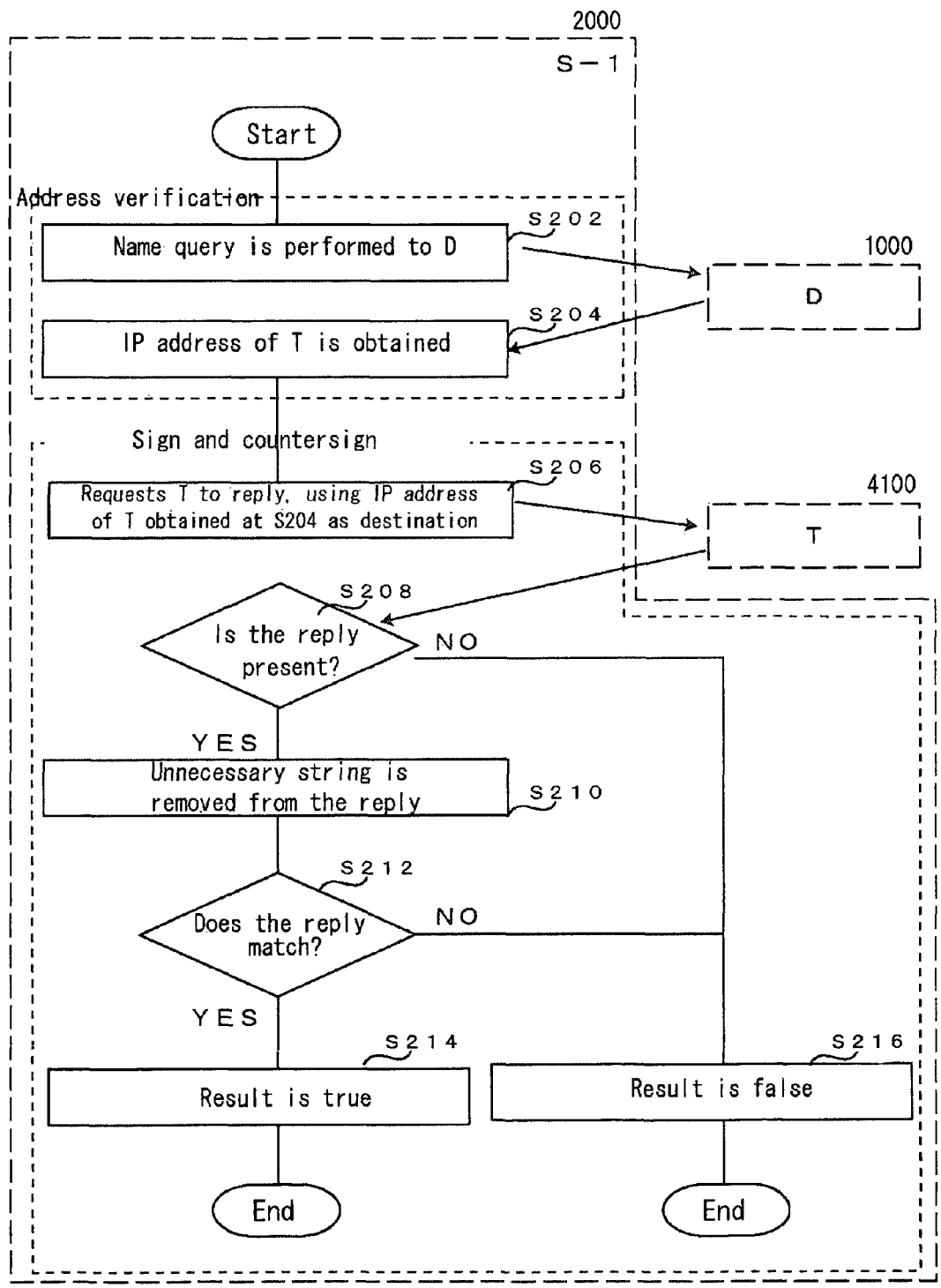
FIG. 23 is a flowchart showing means to solve challenge.
Figure 24:
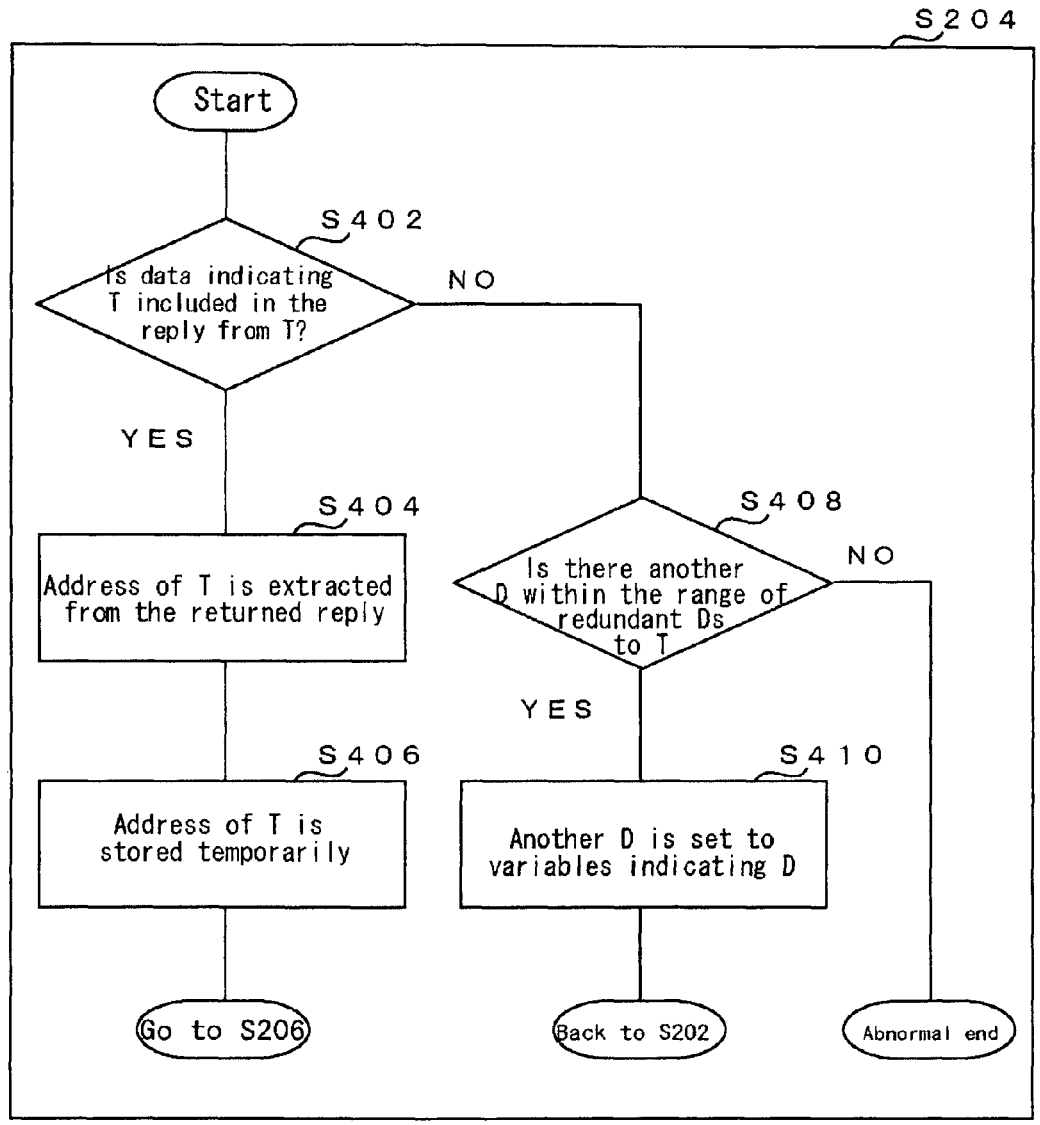
FIG. 24 is a flowchart showing means 2 (optional processing for S204) to solve challenge.
Figure 37:
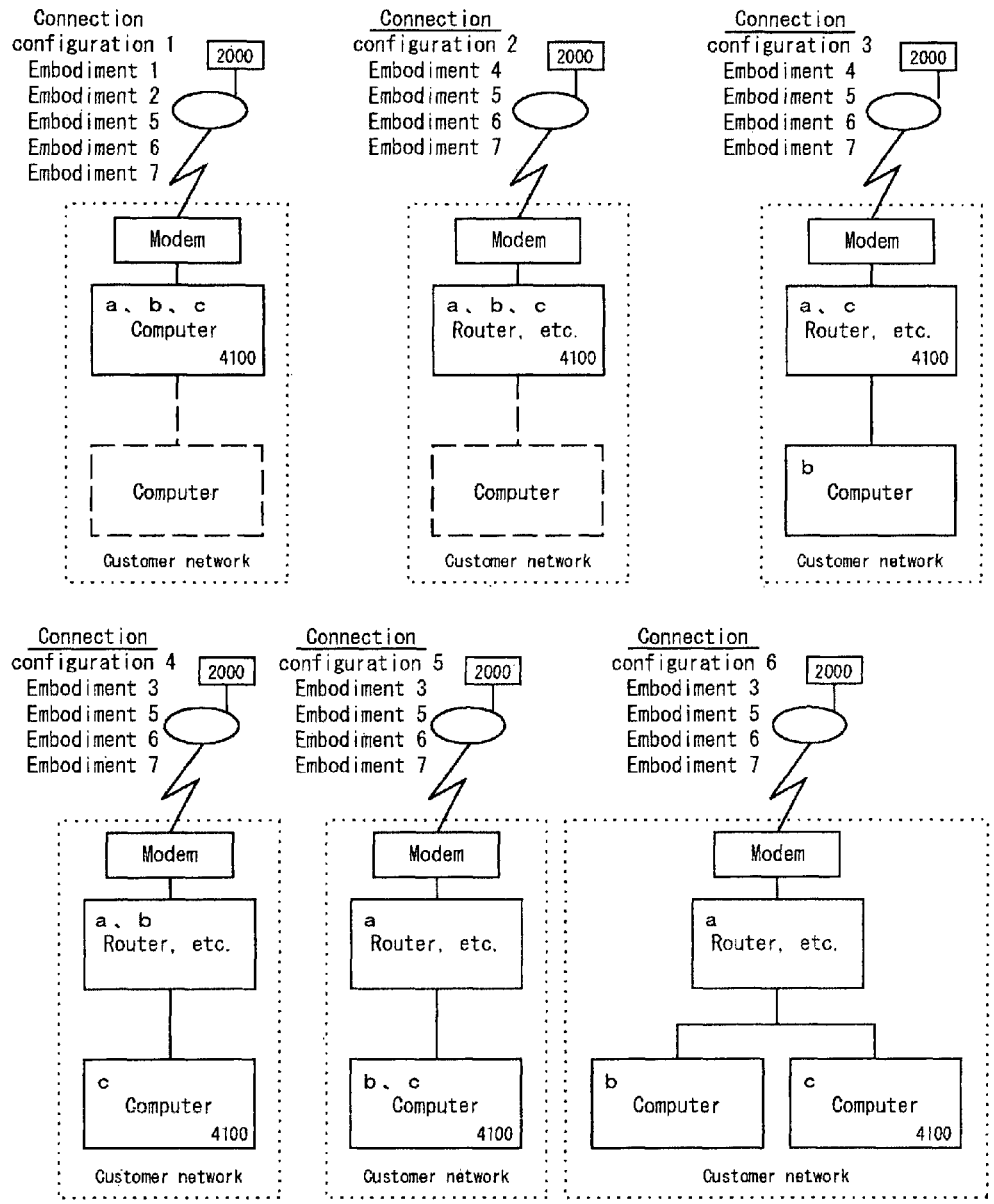
FIG. 37 is a diagram showing connection configuration of T on customer network.

Symbol Name
1000 D. Mapping notification system. DNS is the representative example, but the mapping notification system does not refer to only DNS; it also includes patent document 2. When the term DNS is used, there are two cases: one where it means only DNS, and the other where it is not DNS, but it notifies the mapped image of pair of A and B.
2000 S-1. Originator management server. It is abstracted together with S-2 (5300) into the concept of S, the originator. The originator here is the entity that tries to confirm the correctness of reachability to T.
4000 P. Provider to which management target equipment is connected. Or network having function of configuring upstream network (side on which DNS server exists) as viewed from customer network, and of assigning address dynamically to network border node connected to upstream network. The DHCP server and the network including it and the management target equipment may exist.
4100 T. Dial-up host intermittently connected and disconnected from network (includes connection and disconnection due to mobility or portability). It is the destination and is management target equipment.
4200 T'. Another user of provider P. User (or host) assigned address by provider P and that not management target equipment. Host that might be misidentified as management target equipment because of possibility that host may be assigned address previously assigned to management target equipment.
4500 P-D. DNS server of provider P.
5000 P-2. Provider other than provider P. Provider other than provider to which management target equipment connected. In other words, provider to which general Internet user (5300) connected. The concept is only valid when provider P is connected to the Internet or is interconnected to other networks.

5300 S-2 (5300). Originator and general user. General user (5300) of Internet. Third party as viewed from management server, DNS administrator, operator of management target equipment, or direct user of management target equipment (excluding reader) (The reader of management target equipment is the general user.) The general user concept (5300) is established at provider P-2 (viewed from management target equipment) only when provider P dynamically assigning an address to management target equipment (or boundary between customer network and provider P network) is connected to the Internet, and provider P-2 is connected to the Internet or provider P and provider P-2 are interconnected. That is, provider P-2 only need be another network (viewed from provider P) reached via routing. Node that tries to start communication to management target equipment.

5500 P-2-D. DNS server of provider P-2.

The invention claimed is:

1. A network-based communication system, comprising:
    at least one server containing a processor for connecting a plurality of processing modules including:
    a processing module embodied in hardware for obtaining a corresponding dynamic address by sending an identifier to a mapping notification system which stores a pair of an identifier and a dynamic address; and
    at least one additional processing module embodied in hardware for determining whether or not a dynamic address stored in the mapping notification system is correct by accessing other communication node to which the dynamic address obtained by the processing module is assigned,
    wherein when the determining means determines that the address is not correct,
    (i) said obtaining process and determination process are executed again,
    (ii) an execution of a process to be executed after said determination process is stopped, or
    (iii) a control process for preventing from sending back a reply of said address from the mapping notification system is executed.

2. The communication system of claim 1, wherein the determination means determines whether or not the communication node is a communication node to be communicated, based on the comparison of the identifier sent to the mapping notification system and a reply for the access to the communication node.

3. The communication system of claim 1, wherein the reply for the access to the communication node is identifiers assigned with the communication node, additional information, or specific character string including information based on the foregoing.

4. The communication system of claim 1, wherein at least either of the obtaining means and the determining means is provided on the communication node or an additional communication node other than this.

5. The communication system of claim 1, wherein access of the determining means is conducted under different condition for each communication node.

6. The communication system of claim 1, wherein the determining means is provided on a computer or a network connecting equipment.

7. The communication system of claim 1, wherein the obtaining means obtains an address corresponding to the identifier by forward name query.

8. The communication system of claim 1, wherein the communication node is a communication node where address is assigned dynamically, or a communication node referred to together with an external network.

9. The communication system of claim 1, wherein the communication node where the address is assigned replies after lapse of time where said change actually occurs after action that the address stored in the mapping notification system changes.

10. The communication system of claim 1, wherein the address of the mapping notification system is managed using SNMP (Simple Network Management Protocol).

11. The communication system of claim 1, wherein if the determining means determines that the address is not correct, it is prevented to send back a reply of said address from the mapping notification system by deleting the address from the mapping notification system.

12. The communication system of claim 1, providing given service to a communication node which notifies the identifier to storage exchange network.

13. The communication system of claim 1, wherein the identifier is FQDN (Fully Qualified Domain Name) or information based on it.

14. A communication node, comprising:
    an obtaining means for obtaining a corresponding dynamic address by sending an identifier to a mapping notification system which stores a pair of an identifier and a dynamic address; and
    a determination means for determining whether or not a dynamic address stored in the mapping notification system is correct by accessing other communication node to which the dynamic address obtained by the obtaining means is assigned, wherein when the determining means determines that the address is not correct,
    (i) said obtaining process and determination process are executed again,
    (ii) an execution of a process to be executed after said determination process is stopped, or
    (iii) a control process for preventing from sending back a reply of said address from the mapping notification system is executed.

* * * * *